United States Patent
Sakai et al.

(10) Patent No.: US 8,063,960 B2
(45) Date of Patent: Nov. 22, 2011

(54) SOLID-STATE IMAGING DEVICE AND APPARATUS WITH AN INCREASED SPEED OF ANALOG TO DIGITAL CONVERSION

(75) Inventors: Naofumi Sakai, Fukuoka (JP); Tomonori Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 744 days.

(21) Appl. No.: 12/029,035

(22) Filed: Feb. 11, 2008

(65) Prior Publication Data

US 2008/0192127 A1   Aug. 14, 2008

(30) Foreign Application Priority Data

Feb. 13, 2007   (JP) ................. 2007-031889

(51) Int. Cl.
*H04N 3/14* (2006.01)
*H01L 27/00* (2006.01)
(52) U.S. Cl. ............ 348/297; 348/308; 250/208.1
(58) Field of Classification Search .......... 348/345, 348/257, 297, 300–302, 207, 309, 310; 341/150, 341/156, 159, 163–165, 172
See application file for complete search history.

(56) References Cited

U.S. PATENT DOCUMENTS 6,518,910 B2 *   2/2003   Sakuragi et al. ............ 341/162
2005/0195304 A1 *   9/2005   Nitta et al. .................. 348/308
2006/0158541 A1 *   7/2006   Ichikawa .................... 348/308
2006/0219866 A1 *   10/2006   Egawa et al. ............. 250/208.1

FOREIGN PATENT DOCUMENTS

JP   2005-347932   12/2005
JP   2008-054256   3/2008

OTHER PUBLICATIONS

A Japanese Office Action dated Feb. 3, 2009 issued in connection with counterpart Japanese Patent Application No. 2007-031889.

* cited by examiner

*Primary Examiner* — David Ometz
*Assistant Examiner* — Carramah J Quiett
(74) *Attorney, Agent, or Firm* — SNR Denton US LLP

(57) ABSTRACT

A solid-state imaging device includes a reference-signal generating unit that generates plural kinds of reference signals for converting an analog pixel signal into digital data, a reference-signal selecting unit that selects any one of the plural kinds of reference signals, a comparing unit that compares the pixel signal and the selected reference signal, and a count unit that performs count processing in parallel with comparison processing in the comparing unit and stores a count value at a point when the comparison processing is completed. The count unit decides digital data of the pixel signal in a 1 LSB step by storing a count value at a point when the comparison processing is completed for any one of the plural kinds of reference signals and correcting the stored count value on the basis of results of the comparison processing for respective remaining reference signals of the plural kinds of reference signals.

6 Claims, 27 Drawing Sheets

<FIRST EMBODIMENT: FIRST EXAMPLE>

(FIRST EMBODIMENT: FIRST EXAMPLE)

<FIRST EMBODIMENT: FIRST EXAMPLE>

REFERENCE SIGNAL Vslop_1 IS SET HIGHER BY 1LSB COMPARED WITH REFERENCE SIGNAL Vslop_2
→ Vslop_1=Vslop_2+1IR

COMP → MAINTAINED AT L
D=2T−1

COMP → FROM L TO H
D=2T

PROBLEM THAT OCCURS WHEN THERE IS PROCESSING DELAY
(FIRST EMBODIMENT: FIRST EXAMPLE)

$1*Tad \leq Tdelay < 2*Tad$ (FIRST EMBODIMENT: SECOND EXAMPLE)

$3*Tad \leq Tdelay < 4*Tad$ (FIRST EMBODIMENT: SECOND EXAMPLE)

<FIRST EMBODIMENT: THIRD EXAMPLE>

Vslop_1 > Vslop_2 > Vslop_3 > Vslop_4

<FIRST EMBODIMENT: THIRD EXAMPLE>

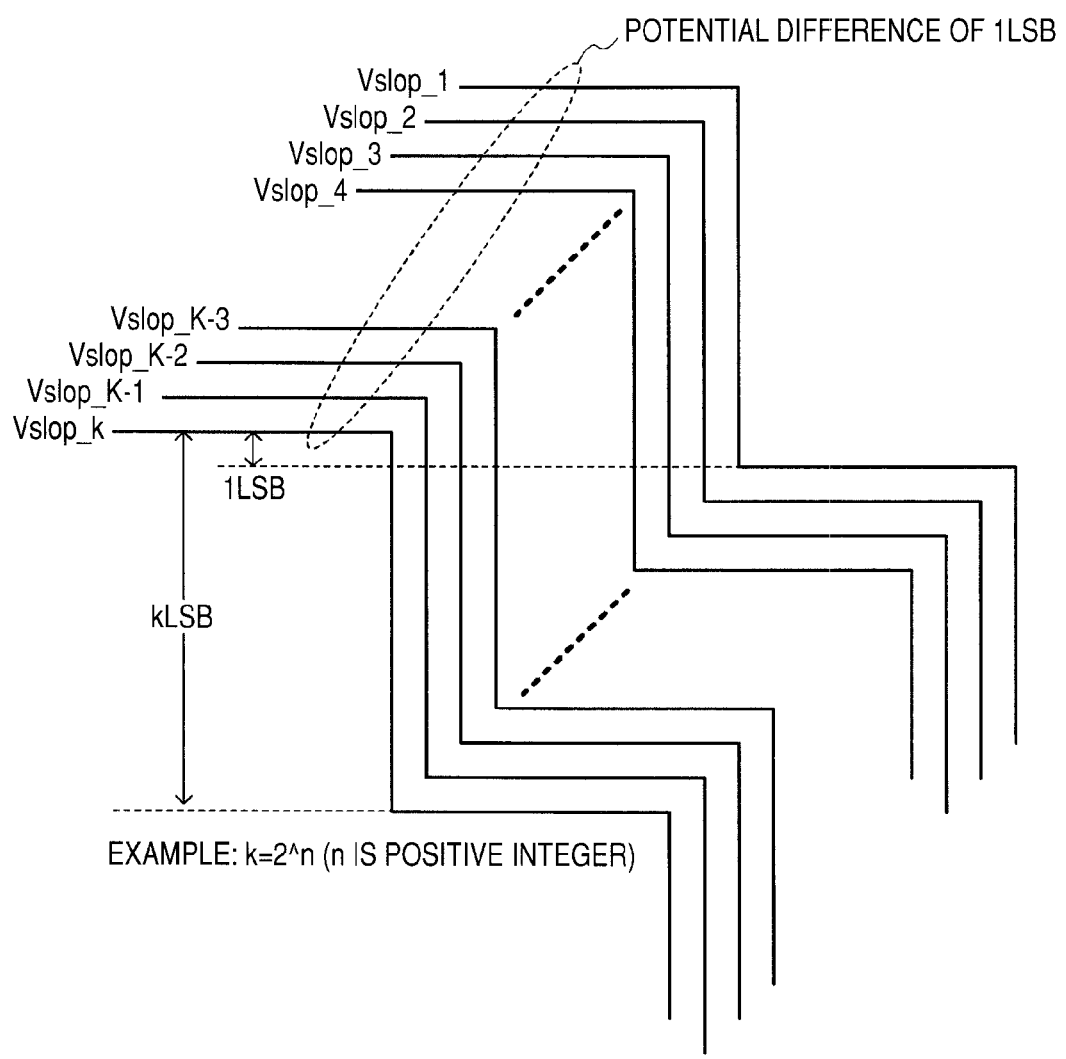

<THIRD EMBODIMENT>

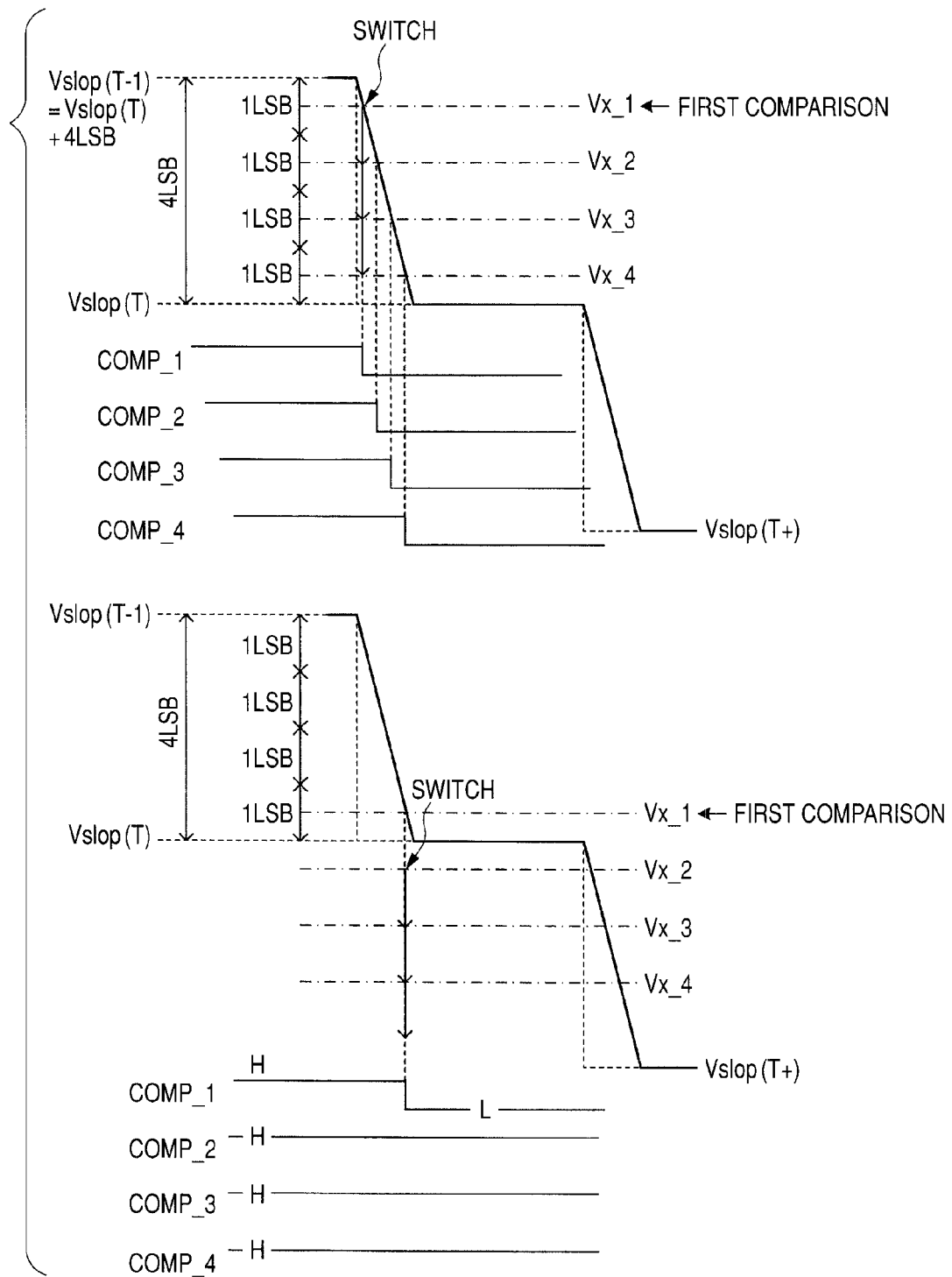

SOLID-STATE IMAGING DEVICE AND APPARATUS WITH AN INCREASED SPEED OF ANALOG TO DIGITAL CONVERSION

CROSS-REFERENCES TO RELATED APPLICATIONS

The present invention contains subject matter related to Japanese Patent Application JP 2007-031889 filed in the Japanese Patent Office on Feb. 13, 2007, the entire contents of which being incorporated herein by reference.

BACKGROUND OF THE INVENTION

1. Field of the Invention

The present invention relates to a solid-state imaging device, which is an example of a semiconductor device for detecting a physical quantity distribution, and an imaging apparatus. More specifically, the present invention relates to a mechanism that is formed by arraying plural unit components, which have sensitivity to electromagnetic waves inputted from the outside such as light and radiations, and outputs an electric signal indicating a physical quantity distribution converted into an electric signal by the unit components to the outside.

2. Description of the Related Art

In recent years, as examples of a solid-state imaging device, image sensors of a MOS (Metal Oxide Semiconductor) type and a CMOS (Complementary Metal-Oxide Semiconductor) type that can overcome various problems of a CCD (Charge Coupled Device) image sensor attract attention.

For example, the CMOS image sensor has, for each of pixels, an amplifier including a floating diffusion amplifier. In reading out a pixel signal, as an example of address control, a system of a so-called column parallel output type or column type is often used. This is a system for selecting one row in a pixel array section, simultaneously accessing pixels for the one row, and reading out pixel signals from the pixel array section in row units, i.e., all the pixels for the one row simultaneously and in parallel.

In the solid state imaging device, a system for converting an analog pixel signal read out from the pixel array section into digital data with an analog digital converter (an AD converter) and, then, outputting the digital data to the outside may be adopted.

The same applies to the image sensor of the column parallel output type. Various signal output circuits have been devised as a signal output circuit for the image sensor. As an example of a most advanced form of the image sensor, an image sensor of an AD conversion system that includes an AD converter for each of columns and extracts a pixel signal to the outside as digital data has been proposed (see, for example, JP-A-2005-347932).

As the AD conversion system, various systems have been devised from the viewpoints of a circuit size, processing speed (an increase in speed), resolution, and the like. As an example, there is an AD conversion system of a so-called slope integration type or ramp signal comparison type (in this specification, hereinafter referred to as reference signal comparison type). This is a system for comparing an analog unit signal and a so-called ramp-shaped reference signal (a ramp wave), a gradual value of which changes, for converting the unit signal into digital data, performing count processing in parallel with this comparison processing, and acquiring digital data of the unit signal on the basis of a count value at a point when the comparison processing is completed. JP-A-2005-347932 also discloses an example of an image sensor adopting the AD conversion system of the reference signal comparison type.

SUMMARY OF THE INVENTION

In solid-state imaging devices used as a device that converts light into an electric signal and outputs an image signal such as a digital still camera, there is a demand for faster AD conversion according to an increase in the number of pixels and an increase in a frame rate in recent years.

A MOS (CMOS)) type image sensor, which is one of the solid-state imaging devices, converts, for each of pixels, an electric charge into an electric signal making use of a characteristic that the image sensor can be manufactured in a process same as that for a MOS (CMOS) integrated circuit and processes, for each of columns and in parallel, the electric signal read out from the pixel. In this way, it is possible to improve processing speed compared with an image sensor that is not a column parallel type.

If AD conversion of the column parallel type is applied as processing for an electric signal, it is possible to improve AD conversion speed compared with speed of AD conversion that is not the column parallel type. In other words, to realize a further increase in speed of AD conversion, an increase in speed of a circuit for AD-converting the electric signal for each of columns is necessary.

However, in the case of the AD conversion system of the reference signal comparison type, an analog unit signal and a reference signal, which changes sequentially, for converting the unit signal into digital data are compared by a comparing unit called comparator or the like. Therefore, time necessary for comparison processing in the comparing unit poses a problem in AD conversion performance; in particular, an increase in speed of conversion processing and a frame rate is limited. As the number of pixels increases and there is a higher demand for an increase in speed, a request for the increase in speed of the conversion processing increases.

As an example of a method for solving the problem, JP-A-2005-347932 proposes a mechanism that provides plural AD conversion units for respective pixel rows of a pixel unit in which pixels including photoelectric conversion units are arrayed in a matrix shape, divides outputs from plural pixels of the pixel rows, and inputs the outputs to two or more AD conversion units to realize an increase in speed by parallel processing.

However, in such a mechanism, it is necessary to provide the AD conversion units in plural directions around pixel areas (typically, vertically up and down two directions). This is disadvantageous in terms of a circuit area.

Therefore, it is desirable to provide a mechanism that can realize, when the AD conversion system of the reference signal comparison type is adopted, an increase in speed of AD conversion processing and a reduction in power consumption by reducing time necessary for the comparison processing in the comparing unit while controlling an increase in the circuit area.

According to an embodiment of the present invention, there is provided a solid-state imaging device including a reference-signal generating unit that generates a reference signal, which changes sequentially, for converting a predetermined level (e.g., a reset level or a signal level) of an analog pixel signal obtained from a pixel into digital data, a comparing unit that compares the reference signal generated by the reference signal generating unit and the pixel signal, and a count unit that performs count processing in parallel with comparison processing by the comparing unit and stores a count value at a point when the comparison processing is completed to acquire digital data of the predetermined level. In other words, as a mechanism of AD conversion for the pixel signal, an AD conversion system of a so-called reference signal comparison type is adopted.

As a first mechanism, plural kinds of reference signals, a level difference between adjacent ones of which is fixed, are generated by the reference-signal generating unit. A reference-signal selecting unit that selects any one of the plural kinds of reference signals generated by the reference-signal generating unit is provided. The count unit stores a count value at a point when the comparison processing by the comparing unit for any one of the plural kinds of reference signals selected by the reference-signal selecting unit is completed. The count unit decides digital data of the pixel signal in a 1 LSB step by correcting the stored count value on the basis of a result of the comparison processing by the comparing unit for each of the remaining ones of the plural kinds of reference signals selected by the reference-signal selecting unit. In other words, AD conversion with resolution of 1 LSB maintained is performed by matching and comparing the plural kinds of reference signals that have different levels corresponding to an identical count value and one pixel signal and applying correction to the stored count value with reference to results of the comparison.

As a first example of a specific mechanism for this purpose, for example, the reference-signal generating unit generates M kinds of reference signals that change stepwise at a rate of change M times as large as 1 LSB, which is resolution of a least significant bit of the digital data, and a level difference between adjacent ones of which is 1 LSB. The count unit first stores a count value at a point when pre-comparison processing by the comparing unit for comparing a pre-reference signal, which is any one of the M kinds of reference signals selected by the reference-signal selecting unit, and the pixel signal is completed.

The count unit decides digital data of the pixel signal in the 1 LSB step by correcting, according to selection of each of the remaining M kinds of reference signals selected by the reference-signal selecting unit, the stored count value on the basis of a result of post comparison processing by the comparing unit for comparing each of the remaining reference signals and the pixel signal.

In other words, AD conversion with resolution of 1 LSB maintained is performed by switching in order the M kinds of reference signals that change stepwise in an M LSB step and a level difference between adjacent ones of which is 1 LSB, and comparing the reference signal and an identical pixel signal and applying correction corresponding to a result of the post comparison processing to the stored count value.

Alternatively, as a second example of the first mechanism, the reference-signal generating unit generates k kinds of reference signals that correspond to respective areas obtained by dividing a full range of digital data into k areas (ranges) and change stepwise at a rate of change of 1 LSB. First, the comparing unit specifies a reference signal corresponding to a range to which the pixel signal belongs by, while the k kinds of reference signals are switched by the reference-signal selecting unit, comparing initial values of the respective reference signals and the pixel signal in the comparing unit.

Thereafter, the comparing unit compares a reference signal that changes stepwise at a rate of change of 1 LSB corresponding to the specified range and the pixel signal. The count unit stores a count value at a point when comparison processing by the comparing unit using a reference signal corresponding to the specified range is completed. The count unit decides digital data of the pixel signal in the 1 LSB step by correcting the stored count value on the basis of a result of the range to which the pixel signal belongs. In other words, AD conversion with resolution of 1 LSB maintained is performed by preparing reference signals by area obtained by dividing a full range into k areas, selecting a reference signal corresponding to a pixel signal level of a conversion object and comparing the reference signal with the pixel signal, and applying correction corresponding to an area to the stored count value.

By combining the first example and the second example of the first mechanism, it is possible to enjoy advantages of both the examples.

As a second mechanism, the reference-signal generating unit generates a reference signal that changes stepwise at a rate of change k times as large as 1 LSB, which is resolution of a least significant bit of digital data. Means that can generate k kinds of pixel signals, a level difference between adjacent ones of which is 1 LSB, by relatively changing a level of a pixel signal and a pixel-signal selecting unit that selects any one of the k kinds of pixel signals are provided.

The count unit stores a count value at a point when comparison processing by the comparing unit for any one of k kinds of pixel signals selected by the pixel-signal selecting unit is completed. The count unit decides digital data of the pixel signal in a 1 LSB step by correcting the stored count value on the basis of a result of the comparison processing by the comparing unit for each of the remaining pixel signals of the k kinds of pixel signals selected by the pixel signal selecting unit.

In other words, AD conversion with resolution of 1 LSB maintained is performed by dividing pixel signals into k kinds, a level difference between adjacent ones of which is 1 LSB, comparing the pixel signals with one reference signal that changes steps wise in a k LSB step while switching the pixel signals, and applying correction corresponding to results of comparison processing to the stored count value.

The solid-state imaging device may be formed as one chip or may be a module having an imaging function in which an imaging unit and a signal processing unit or an optical system are collectively packaged.

The present invention is applicable not only to the solid-state imaging device but also to an imaging apparatus. In this case, the imaging apparatus has effects same as those of the solid-state imaging device. The imaging apparatus indicates a camera and a portable device having an imaging function. "Imaging" includes not only image capturing during normal camera photographing but also fingerprint detection and the like in a broader sense.

In the first mechanism of the present invention, AD conversion with resolution of 1 LSB maintained is performed by preparing plural kinds of reference signals, a level difference between adjacent ones of which is fixed, comparing the reference signals with an identical pixel signal, and correcting, on the basis of results of the comparison, a count value stored during the comparison of any one of the reference signals. The plural kinds of reference signals having different levels corresponding to an identical count value are matched and compared with one pixel signal. Therefore, it is possible to reduce comparison processing time in performing AD conversion with resolution of 1 LSB secured to time obtained by dividing processing time of comparison processing for one reference signal and one pixel signal by the number of reference signals. Since time necessary for the comparison processing in the comparing unit is reduced, it is possible to realize an increase in speed of AD conversion processing and a reduction in power consumption.

In the second mechanism of the present invention, AD conversion with resolution of 1 LSB maintained is performed by dividing pixel signals from pixels into k kinds of pixel signals, a level difference between adjacent ones of which is 1 LSB, comparing the pixel signals with one reference signal that changes stepwise at a rate of change of k LSB, and correcting, on the basis of results of the comparison, a count value stored during the comparison of any one of the pixel signals. The plural kinds of pixel signals, a level difference between adjacent ones of which is 1 LSB, are matched and compared with one reference signal. Therefore, it is possible to reduce comparison processing time in performing AD conversion with resolution of 1 LSB secured to time obtained by dividing processing time of comparison processing of one reference signal and one pixel signal by the number of reference signals. Since time necessary for the comparison processing in the comparing unit is reduced, it is possible to realize an increase in speed of AD conversion processing. Conversely, when processing speed same as that when the first or second mechanism is not applied is maintained, it is possible to reduce power consumption if the first or second mechanism is applied.

In both the first and second mechanisms, rather than providing plural AD conversion units, it is sufficient to prepare plural reference signals or pixel signals and provide a selecting unit that switches the reference signals or the pixel signals and a mechanism for controlling operations of the respective units in association with one another. Therefore, it is possible to realize an increase in speed of AD conversion processing and a reduction in power consumption.

A reduction in an AD conversion period is realized by switching plural reference signals and using the reference signals as reference signals for the comparing unit or setting plural levels as input levels to the comparing unit determined by a pixel signal.

BRIEF DESCRIPTION OF THE DRAWINGS

FIG. 12 is a diagram for explaining AD conversion processing of a reference signal comparison type according to a fourth example of the first embodiment and shows M kinds of reference signals;

FIG. 25 is a diagram for explaining a principle of AD conversion processing of a reference signal comparison type according to the fourth embodiment (including not only the first example but also other examples described later);

DESCRIPTION OF THE PREFERRED EMBODIMENTS

Embodiments of the present invention will be hereinafter explained in detail with reference to the accompanying drawings. In an example explained below, a CMOS solid-state imaging device, which is an example of a solid-state imaging device of an X-Y address type, is used as a device. It is assumed that, in the CMOS solid-state imaging device, all pixels include NMOSs.

However, this is only an example and an object device is not limited to a solid-state imaging device of a MOS type. All the embodiments described below can be applied in the same manner to all semiconductor devices for detecting a physical quantity distribution in which plural unit components having sensitivity to electromagnetic waves inputted from the outside such as light and radiations are arrayed in a line shape or a matrix shape.

Overview of a Solid-State Imaging Device

Figure 1:
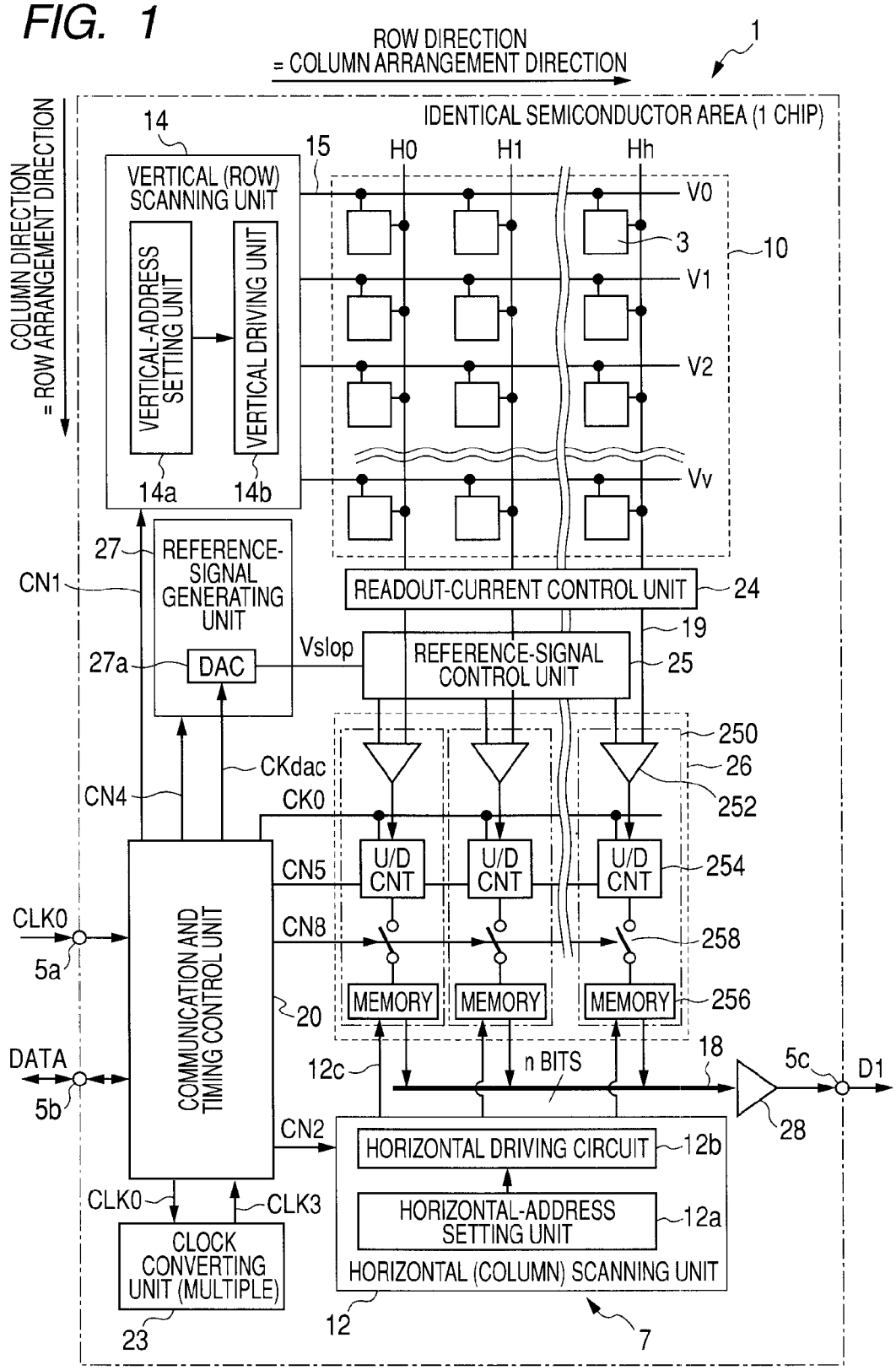
FIG. 1 is a schematic diagram of a solid-state imaging device, which is a CMOS solid-state imaging device, according to an embodiment of the present invention.

FIG. 1 is a schematic diagram of a solid-state imaging device, which is a CMOS solid-state imaging device (a CMOS image sensor), according to an embodiment of the present invention.

A solid-state imaging device 1 includes a pixel unit (a two-dimensional matrix shape) in which plural pixels including light receiving elements (an example of a charge generating unit) that output signals corresponding to an incident light amount are arrayed in rows and columns. Signal outputs from the respective pixels are voltage signals. CDS (Correlated Double Sampling) processing function units, digital conversion units (ADCs; Analog Digital Converters), and the like are provided in column parallel in the solid-state imaging device 1.

"The CDS processing function units and the digital conversion units are provided in column parallel" means that plural CDS processing function unit and digital conversion units are provided substantially in parallel with vertical signal lines (an example of column signal lines) 19 in vertical columns.

The plural functional units may be arranged only on one end edge side (an output side arranged on a lower side in the figure) in a column direction with respect to a pixel array unit 10 when the device is viewed in plan. Alternatively, the plural functional units may be dividedly arranged on one end edge side (an output side arranged on a lower side of the figure) and the other end edge side (an upper side in the figure) on the opposite side of one end edge side in a column direction with respect to the pixel array unit 10. In the latter case, it is desirable to also dividedly arrange horizontal scanning units that perform readout scanning in a row direction (horizontal scanning) on the respective end edge sides such that the horizontal scanning units can operate independently from each other.

For example, as a typical example of a solid-state imaging device in which CDS processing function units and digital conversion units are provided in column parallel, there is a solid-state imaging device of a column type in which CDS processing function units, analog signal processing units, and digital conversion units are provided for respective vertical columns and read out to an output side in order, and the vertical columns, the CDS processing function units, the digital conversion units, and the like are connected in one to one relation. The solid-state imaging device is not limited to the column type (a column parallel type). It is also possible to adopt a form for allocating one CDS processing function unit and one digital conversion unit to adjacent plural (e.g., two) vertical signal lines 19 (vertical columns) and a form for allocating one CDS processing function unit and one digital conversion unit to N vertical signal lines 19 (vertical columns) at intervals of four lines (N is a positive integer; N−1 vertical signal lines 19 are arranged between CDS processing function units and between digital conversion units).

In all the forms except the column type, the plural vertical signal lines 19 (vertical columns) use one CDS processing function unit and one digital conversion unit in common. Therefore, a switching circuit (a switch) that supplies pixel signals for plural columns supplied from the pixel array unit 10 side to one CDS processing function unit and one digital conversion unit is provided. Depending on processing at a post stage, it is necessary to separately provide a memory that stores an output signal.

In any case, by adopting, for example, the form for allocating one CDS processing function unit and one digital conversion unit to the plural vertical signal lines 19 (vertical columns), signal processing for respective pixel signals is performed after the pixel signals are read out in pixel row units. Therefore, compared with a form for performing the same signal processing in respective unit pixels, it is possible to simplify the structure in the respective unit pixels and realize an increase in the number of pixels, a reduction in size, and a reduction in cost of an image sensor.

Pixel signals for one row can be simultaneously processed in parallel in the plural signal processing units arranged in column parallel. Therefore, compared with a case in which processing is performed in one CDS processing function unit and one digital conversion unit on an output circuit side or the outside of the device, it is possible to cause the signal processing units to operate at low speed. This is advantageous in terms of power consumption, band performance, noise, and the like. In other words, when power consumption, band performance, and the like are set the same, high-speed operation of the entire sensor is possible.

In the case of the structure of the column type, since it is possible to cause the signal processing units to operate at low speed, there is an advantage in terms of power consumption, band performance, noise, and the like. In addition, there is also an advantage that a switching circuit (a switch) is unnecessary. In the embodiments described below, the solid-state imaging device of the column type is explained unless specifically noted otherwise.

As shown in FIG. 1, the solid-state imaging device 1 according to this embodiment includes the pixel array unit 10 also referred to as a pixel unit, an imaging unit, and the like in which plural unit pixels 3 are arrayed in rows and columns, a driving control unit 7 provided on an outer side of the pixel array unit 10, a readout-current control unit 24 that supplies an operation current (a readout current) for reading out a pixel signal to unit pixels 3 of the pixel array unit 10, a reference-signal control unit 25 that controls a reference signal Vslop, a column processing unit 26 that has column AD circuits 250 arranged for the respective vertical columns, a reference-signal generating unit 27 that supplies a reference signal Vslop for AD conversion to the column processing unit 26 through the reference-signal control unit 25, and output circuits 28. These functional units are provided on an identical semiconductor substrate.

When an AD conversion system of a reference signal comparison type is adopted, it is also conceivable to provide the reference-signal generating unit 27 in column parallel (for each of pixel rows). For example, comparators and reference signal generators are provided on respective pixel rows and, on the basis of a comparison result of a comparator in a column, values of reference signals are changed in order by the reference signal generator on the column. However, this increases a circuit size and power consumption. Therefore, in this embodiment, the reference-signal generating unit 27 is used in common for all the columns, the column AD circuits 250 in the respective pixel rows share the reference signal Vslop generated by the reference-signal generating unit 27, and, in the respective pixel rows, AD conversion is performed by storing a counter value as AD conversion results of the respective pixel rows when the comparators are inverted.

Details of the internal structure of the readout-current control unit 24 are different according to the embodiments as described later in detail. In some of the embodiments, the reference-signal control unit 25 is not provided. The reference signal Vslop from the reference-signal generating unit 27 may be directly supplied to the column processing unit 26.

The reference signal Vslop only has to have a waveform that generally changes linearly at a certain tilt. The reference signal Vslop may change in a gentle slope shape or may sequentially change stepwise.

The column AD circuit 250 according to this embodiment has functions of an AD conversion unit that converts a reset level Srst, which is a reference level of a pixel signal So, and a signal level Ssig into digital data independently from each other and a difference processing unit that acquires digital data of a signal component indicated by a difference between the reset level Srst and the signal level Ssig by executing difference processing between an AD conversion result of the reset level Srst and an AD conversion result of the signal level Ssig.

The driving control unit 7 has a control circuit function for reading out signals of the pixel array unit 10 in order. For example, the driving control unit 7 includes a horizontal scanning unit (a column scanning circuit) 12 including a horizontal-address setting unit 12a and a horizontal driving unit 12b that control a column address and column scanning, a vertical scanning unit (a row scanning circuit) 14 including a vertical-address setting unit 14a and a vertical driving unit 14b that control a row address and row scanning, and a communication and timing control unit 20 that has a function of, for example, generating an internal clock.

In the figure, as indicated by a dotted line near the communication and timing control unit 20, a clock converting unit 23 that is an example of a high-speed clock generating unit and generates a pulse of a clock frequency higher than an inputted clock frequency may be provided. The communication and timing control unit 20 generates an internal clock on the basis of an input clock (a master clock) CLK0 inputted via a terminal 5a and a high-speed clock generated by the clock converting unit 23.

It is possible to cause AD conversion processing and the like to operate at high speed by using a signal generated from the high-speed clock generated by the clock converting unit 23. It is possible to perform motion extraction and compression processing, which need high-speed calculation, using the high-speed clock. It is also possible to convert parallel data outputted from the column processing unit 26 into serial data and output video data D1 to the outside of the device. Consequently, it is possible to output AD-converted digital data in a high-speed operation using terminals smaller in number than bits of the digital data.

The clock converting unit 23 incorporates a multiply circuit that generates a pulse of a clock frequency higher than an inputted clock frequency. The clock converting unit 23 receives a low-speed clock CLK2 from the communication and timing control unit 20 and generates a clock of a frequency twice or more higher than the low-speed clock CLK2 on the basis of the low-speed clock CLK2. As the multiply circuit of the clock converting unit 23, when k1 is a multiple of a frequency of the low-speed clock CLK2, k1 multiply circuits only have to be provided. It is possible to use various well-know circuits.

In FIG. 1, a part of rows and columns are omitted for simplification of illustration. However, actually, several tens to several thousands unit pixels 3 are arranged in respective pixel rows and respective pixel rows. Each of the unit pixels 3 typically includes a photodiode as a light-receiving element (a charge generating unit), which is an example of a detecting unit, and an in-pixel amplifier (an example of the pixel-signal generating unit) that has a semiconductor element (e.g., transistor) for amplification.

The in-pixel amplifier only has to be capable of outputting a signal charge, which is generated and accumulated by the charge generating unit of the unit pixel 3, as an electric signal. It is possible to adopt various kinds of structure for the in-pixel amplifier. In general, a floating diffusion amplifier is used. As an example, it is possible to use an in-pixel amplifier configured by general-purpose four transistors as CMOS sensors including, with respect to the charge generating unit, a transfer unit that has a readout selecting transistor as an example of a charge readout unit (a transfer gate unit/a readout gate unit), an initializing unit that has a reset transistor as an example of a reset gate unit, a vertical selection transistor, and an amplification transistor of source follower structure as an example of a detection element that detects a potential change in floating diffusion (also referred to as a floating node).

Alternatively, it is also possible to use an in-pixel amplifier configured by three transistors including an amplification transistor connected to a drain line (DRN) for amplifying a signal voltage corresponding to a signal charge generated by the charge generating unit, a reset transistor for resetting the charge generating unit, and a readout selection transistor (a transfer gate unit) scanned from a vertical shift resistor via a transfer wire (TRF).

In the solid-state imaging device 1, the pixel array unit 10 can be adapted to color imaging by using a color separation filter. The pixel array unit 10 is adapted to imaging of color images by providing, for example, in a so-called Bayer array, any one of color filters of a color separation filter including a combination of color filters of plural colors for imaging a color image on a light-receiving surface, on which electromagnetic waves (in this example, light) of the respective charge-generating units (photodiodes, etc.) are made incident, in the pixel array unit 10.

The pixel units 3 are connected to the vertical scanning unit 14 through row control lines 15 for row selection and connected to the column processing unit 26, in which the column AD circuits 250 are provided for the respective vertical columns, through the vertical signal lines 19. The row control lines 15 indicate all wires that enter the pixels from the vertical scanning unit 14.

The horizontal scanning unit 12 has a function of a readout scanning unit that reads out a count value to horizontal signal lines 18 from the column processing unit 26.

Respective elements of the driving control unit 7 such as the horizontal scanning unit 12 and the vertical scanning unit 14 are integrally formed with a semiconductor area of single crystal silicon or the like using a technique same as a semiconductor integrated circuit manufacturing technique. The elements are configured as a solid-state imaging device, which is an example of a semiconductor system, together with the pixel array unit 10.

The respective functional units are configured to form a part of the solid-state imaging device 1 according to this embodiment as a so-called one-chip device (provided on an identical semiconductor substrate) integrally formed in a semiconductor area of single crystal silicon or the like, i.e., as a CMOS image sensor, of a semiconductor system, using the technique same as the semiconductor integrate circuit manufacturing technique.

The solid-state imaging device 1 may be formed as one chip in which the respective units are integrally formed in the semiconductor area in this way. Although not shown in the figure, the solid-state imaging device 1 may be a module having an imaging function obtained by packaging optical systems such as an imaging lens, an optical low-pass filter, and an infrared cut filter besides the various signal processing units such as the pixel array unit 10, the driving control unit 7, and the column processing unit 26.

The horizontal scanning unit 12 and the vertical scanning unit 14 include, for example, decoders and start a shift operation (scanning) in response to control signals CN1 and CN2 given from the communication and timing control unit 20. Therefore, for example, the row control lines 15 include various pulse signals for driving the unit pixels 3 (e.g., a pixel reset pulse RST for defining an initialization control potential, a transfer pulse TRG for defining a transfer control potential, and vertical selection pulse VSEL).

Although not shown in the figure, the communication and timing control unit 20 includes two function blocks. One function block is a function block of a timing generator TG (an example of a readout address control device) that supplies a clock necessary for operations of the respective units and a pulse signal of a predetermined timing. The other function block is a function block of a communication interface that receives a master clock CLK0 supplied from a main control unit on the outside through the terminal 5a, receives data instructing an operation mode and the like supplied from the main control unit on the outside through a terminal 5b, and outputs data including information on the solid-state imaging device 1 to the main control unit on the outside.

For example, the communication and timing control unit 20 outputs a horizontal address signal to the horizontal-address setting unit 12a and outputs a vertical address signal to the vertical-address setting unit 14a. The address setting units 12a and 14a receive the horizontal address signal and the vertical address signal and select rows or columns corresponding thereto, respectively.

The unit pixels 3 are arranged in a two-dimensional matrix shape. Therefore, (vertical) scan reading for accessing the unit pixels 3 and capturing an analog pixel signal, which is generated by the pixel-signal generating unit 5 and outputted in a column direction through the vertical signal line 19, in row units (in column parallel) is performed. Then, (horizontal) scan reading for accessing the unit pixels 3 in a row direction, which is a vertical column arrangement direction, and reading out a pixel signal (in this example, digitized pixel data) to an output side is performed. It is desirable to realize an increase in speed of readout of the pixel signal and the pixel data in this way. It goes without saying that it is possible to perform not only the scan reading but also random access for reading out only necessary information of the unit pixels 3 by directly designating addresses of the unit pixels 3 from which a pixel signal or pixel data is desired to be read out.

The communication and timing control unit 20 supplies a clock CLK1 of a frequency same as that of the input clock (the master clock) CLK0 inputted via the terminal 5a and a clock obtained by dividing the frequency of the clock CLK1 by two or a low-speed clock obtained by further dividing the clock to, for example, the horizontal scanning unit 12, the vertical scanning unit 14, and the column processing unit 26. The clock obtained by dividing the frequency of the clock CLK1 by two and the clock of the frequency lower than that are collectively referred to as low-speed clock CLK2 as well.

The vertical scanning unit 14 selects a row of the pixel array unit 10 and supplies a necessary pulse to the row. The vertical scanning unit 14 includes, for example, the vertical-address setting unit 14a that defines a readout row in the vertical direction (selects a row of the pixel array unit 10) and the vertical driving unit 14b that supplies a pulse to the row control line 15 corresponding to the unit pixel 3 on a readout address (in the row direction) defined by the vertical-address setting unit 14a and drives the row control line 15. The vertical-address setting unit 14a selects a row for an electronic shutter and the like besides a row from which a signal is read out (a readout row: also referred to as selection row and signal output row).

The horizontal scanning unit 12 selects the column AD circuits 250 of the column processing unit 26 in order in synchronization with the low-speed clock CLK2 and guides signals of the column AD circuits 250 to the horizontal signal lines (horizontal output lines) 18. For example, the horizontal scanning unit 12 includes the horizontal-address setting unit 12a that defines a readout column in the horizontal direction (selects the respective column AD circuits 250 in the column processing unit 26) and the horizontal driving unit 12b that guides respective signals of the column processing unit 26 to the horizontal signal lines 18 in accordance with the readout address defined in the horizontal-address setting unit 12a. The number of horizontal signal lines 18 is equal to the number of bits n (n is a positive integer) treated by the column AD circuits 250. For example, when the number of bits is 10 (=n), ten horizontal signal lines 18 are arranged in association with the number of bits.

In the solid-state imaging device 1 having such structure, pixel signals outputted from the unit pixels 3 are supplied, for each of the vertical rows, to the column AD circuits 250 of the column processing unit 26 through the vertical signal lines 19.

Each of the column AD circuits 250 of the column processing unit 26 receives an analog signal So of the unit pixel 3 of a column corresponding thereto and processes the analog signal So. For example, the column AD circuit 250 has an ADC (Analog Digital Converter) circuit that converts the analog signal So into a 10-bit digital signal using, for example, the low-speed clock CLK2.

As the AD conversion processing in the column processing unit 26, a method of AD-converting, for each of the rows, analog signals So stored in parallel in row units using the column AD circuits 250 provided for the respective columns. In this case, a method of AD conversion of a reference signal comparison type is used. This method has a characteristic that, since AD converters can be realized with the simple structure, a circuit size does not increase even if the AD converters are provided in parallel.

In the AD conversion of the reference signal comparison type, an analog processing object signal is converted into a digital signal on the basis of time from the start of conversion until the reference signal Vslop and a processing object signal voltage coincide with each other. As a mechanism for the conversion, in principle, the reference signal Vslop of a ramp shape is supplied to a comparator (a voltage comparator), count in a clock signal is started, and analog pixel signals inputted through the vertical signal lines 19 are compared with the reference signal Vslop. Consequently, the AD conversion is performed by counting the number of clocks until a pulse signal indicating a comparison result is obtained.

Further, in this case, by contriving a circuit configuration, it is possible to perform, together with the AD conversion, processing (equivalent to so-called CDS processing) to the pixel signal in the voltage mode inputted via the vertical signal line 19 for calculating a difference between a signal level immediately after pixel reset (referred to as noise level or reset level) and a true signal level (corresponding to an amount of received light). Consequently, it is possible to remove a noise signal component called fixed pattern noise (FPN) and reset noise.

Details of the Reference-Signal Generating Unit and the Column AD Circuits

The reference-signal generating unit 27 includes a DA converter (DAC; Digital Analog Converter) 27a. The reference-signal generating unit 27 generates a stepwise sawtooth wave (a ramp waveform; hereinafter also referred to as reference signal Vslop) from an initial value indicated by control data CN4 from the communication and timing control unit 20 in synchronization with a count clock CKdac. The reference-signal generating unit 27 supplies the reference signal Vslop of the generated stepwise sawtooth wave to the respective column AD circuits 250 of the column processing unit 26 through the reference-signal control unit 25 as a reference signal for AD conversion (an ADC reference signal). Although not shown in the figure, it is desirable to provide a filter for noise prevention.

When the reference signal Vslop is generated with respect to, for example, a high-speed clock generated on the basis of a multiply clock generated by a multiplying circuit, the reference signal Vslop can be changed at higher speed than that generated on the basis of the master clock CLK0 inputted through the terminal 5a.

The control data CN4 supplied from the communication and timing control unit 20 to the DA converter 27a of the reference-signal generating unit 27 includes information for equalizing a rate of change of digital data with respect to time such that the reference signal Vslop in every comparison processing basically has the same tilt (rate of change). Specifically, a count value is changed by 1 at every unit time in synchronization with the count clock CKdac and converted into a voltage signal by a DA converter of a current addition type.

The column AD circuits 250 include voltage comparing units (comparators) 252 that compare the reference signal Vslop generated by the DA converter 27a of the reference-signal generating unit 27 and analog pixel signals obtained through the vertical signal lines 19 (H0, H1, ..., Hh) from the unit pixels 3 for the respective row control lines 15 (V0, V1, V2, ..., Vv) and counter units 254 that count time until completion of comparison processing by the voltage comparing units 252 and hold a result of the counting. The column AD circuits 250 have an n-bit AD conversion function.

In this embodiment, the reference signal Vslop is supplied from the DA converter 27a in common to the voltage comparing units 252 arranged in the respective columns. The respective voltage comparing units 252 apply comparison processing to a pixel signal voltage Vx, which is processed by the voltage comparing units 252, using the common reference signal Vslop.

The communication and timing control unit 20 has a function of a control unit that switches a mode of count processing in the counter units 254 according to which of a reset level Vrst and a signal component Vsig of a pixel signal the voltage comparing units 252 apply comparison processing. The communication and timing control unit 20 inputs, to the counter units 254 of the respective column AD circuits 250, a control signal CN5 for indicating in which of a down-count mode and an up-count mode the counter units 254 operate and indicating other control information.

The stepwise reference signal Vslop generated by the reference-signal generating unit 27 is inputted to one input terminal RAMP of the voltage comparing unit 252 in common with input terminals RAMP of the other voltage comparing units 252. The vertical signal lines 19 of the vertical columns corresponding to the voltage comparing units 252, respectively, are connected to the other input terminals and pixel signal voltage from the pixel array unit 10 are inputted to the other input terminals, respectively. Output signals (comparison pulses COMP) from the voltage comparing units 252 are supplied to the counter units 254.

A clock CK0 is inputted to a clock terminal CK of the counter unit 254 in common with clock terminals CK of the other counter units 254 from the communication and timing control unit 20.

Although the structure of the counter units 254 is not shown in the figure, the counter units 254 can be realized by changing a wiring form of data storing units formed by latches to a synchronous counter form. The counter units 254 perform internal count with an input of one count clock CK0. As the count clock CK0, like the reference signal Vslop, a multiply clock (a high-speed clock) generated by the multiplying circuit can be used. In this case, resolution can be set higher than that obtained by using the master clock CLK0 inputted via the terminal 5a.

The counter units 254 are characterized in that the counter units 254 can perform count processing by switching (specifically, alternately) a down-count operation and an up-count operation using a common up-down counter (U/D CNT) regardless of the count mode.

As the counter units 254 according to this embodiment, it is preferable to use asynchronous counters from which count output values are outputted not in synchronization with the count clock CK0. Basically, synchronous counters can be used. However, in the case of the synchronous counters, operations of all flip-flops (counter basic elements) are limited by the count clock CK0. Therefore, when a higher-frequency operation is requested, it is preferable to use, as the counter units 254, the asynchronous counters suitable for a high-speed operation because an operation limit frequency thereof depends only on a limit frequency of a first flip-flop (counter basic element).

A control pulse is inputted to the counter units 254 from the horizontal scanning unit 12 through control lines 12c. The counter units 254 have a latch function for storing a count result and store counter output values until an instruction by the control pulse is received through the control lines 12c.

On output sides of the respective column AD circuits 250, for example, outputs of the counter units 254 can be connected to the horizontal signal lines 18. Alternatively, as shown in the figure, data storing units 256 as n-bit memory devices that store count results stored by the counter units 254 and switches 258 arranged between the counter units 254 and the data storing units 256 can be provided at a post stage of the counter units 254.

When the data storing units 256 are provided, a memory transfer instruction pulse CN8 as a control pulse is supplied to the switch 258 from the communication and timing control unit 20 at predetermined timing in common with the other switches 258 of the vertical columns. When the memory transfer instruction pulse CN8 is supplied to the switches 258, the switches 258 transfer count values of the counter units 254 corresponding thereto to the data storing units 256. The data storing units 256 store the transferred count values.

A mechanism for causing the data storing units 256 to store the count values of the counter units 254 at the predetermined timing is not limited to the arrangement of the switches 258 between the counter units 254 and the data storing units 256. For example, the mechanism can be realized by controlling output enable of the counter units 254 with the memory transfer instruction pulse CN8 while directly connecting the counter units 254 and the data storing units 256. Further, the mechanism can be realized by using the memory transfer instruction pulse CN8 as a latch clock for determining data capturing timing of the data storing units 256.

A control pulse is inputted to the data storing units 256 from the horizontal scanning unit 12 through the control lines 12c. The data storing unit 256 store count values captured from the counter units 254 until an instruction by the control pulse is received through the control lines 12c.

The horizontal scanning unit 12 has a function of a readout scanning unit that reads out the count values stored by the respective data storing units 256 in parallel with the processing performed by the voltage comparing units 252 and the counter units 254 of the column processing unit 26.

Outputs of the data storing units 256 are connected to the horizontal signal lines 18. The horizontal signal lines 18 have signal lines for n-bit width, which is a bit width of the column AD circuits 250, and are connected to the output circuits 28 through n sense circuits corresponding to not-shown output lines thereof.

In particular, when the data storing units 256 are provided, the count results stored by the counter units 254 can be transferred to the data storing units 256. Therefore, it is possible to control a count operation of the counter units 254, i.e., AD conversion processing, and a readout operation for reading out the count results to the horizontal signal lines 18 independently from each other. It is possible to realize a pipeline operation for performing the AD conversion processing and a readout operation for reading out signals to the outside in parallel with each other.

In such structure, the column AD circuits 250 perform count operations in a predetermined pixel signal readout period and output count results at predetermined timing. In other words, the voltage comparing units 252 compare the reference signal Vslop from the reference-signal generating unit 27 and the pixel signal voltage Vx inputted through the vertical signal lines 19. When both the voltages are the same, the comparison pulses COMP (comparate outputs) of the voltage comparing units 252 are inverted. For example, the voltage comparing unit 252 sets an H level of a power supply potential or the like as an inactive state and, when the pixel signal voltage Vx and the reference signal Vslop coincide with each other, shifts to an L level (an active state).

The counter units 254 have started count operations in the down-count mode or the up-count mode in synchronization with a ramp waveform voltage generated from the reference-signal generating unit 27. When information on the inverted comparate outputs is notified to the counter units 254, the counter units 254 stop the count operations and latch (store) count values at that point as pixel data to complete the AD conversion.

Thereafter, the counter units 254 output, on the basis of a shift operation according to a horizontal selection signal CH(i) inputted from the horizontal scanning unit 12 through the control lines 12c at predetermined timing, the stored pixel data in order to the outside of the column processing unit 26 and the outside of the chip including the pixel array unit 10 from output terminals 5c.

Other various signal processing circuits may be included in the components of the solid-state imaging device 1, although not shown in the figure because the signal processing circuits are not directly related to the explanation of this embodiment.

Operations of the Solid-State Imaging Device; Basic Operation

Figure 2:
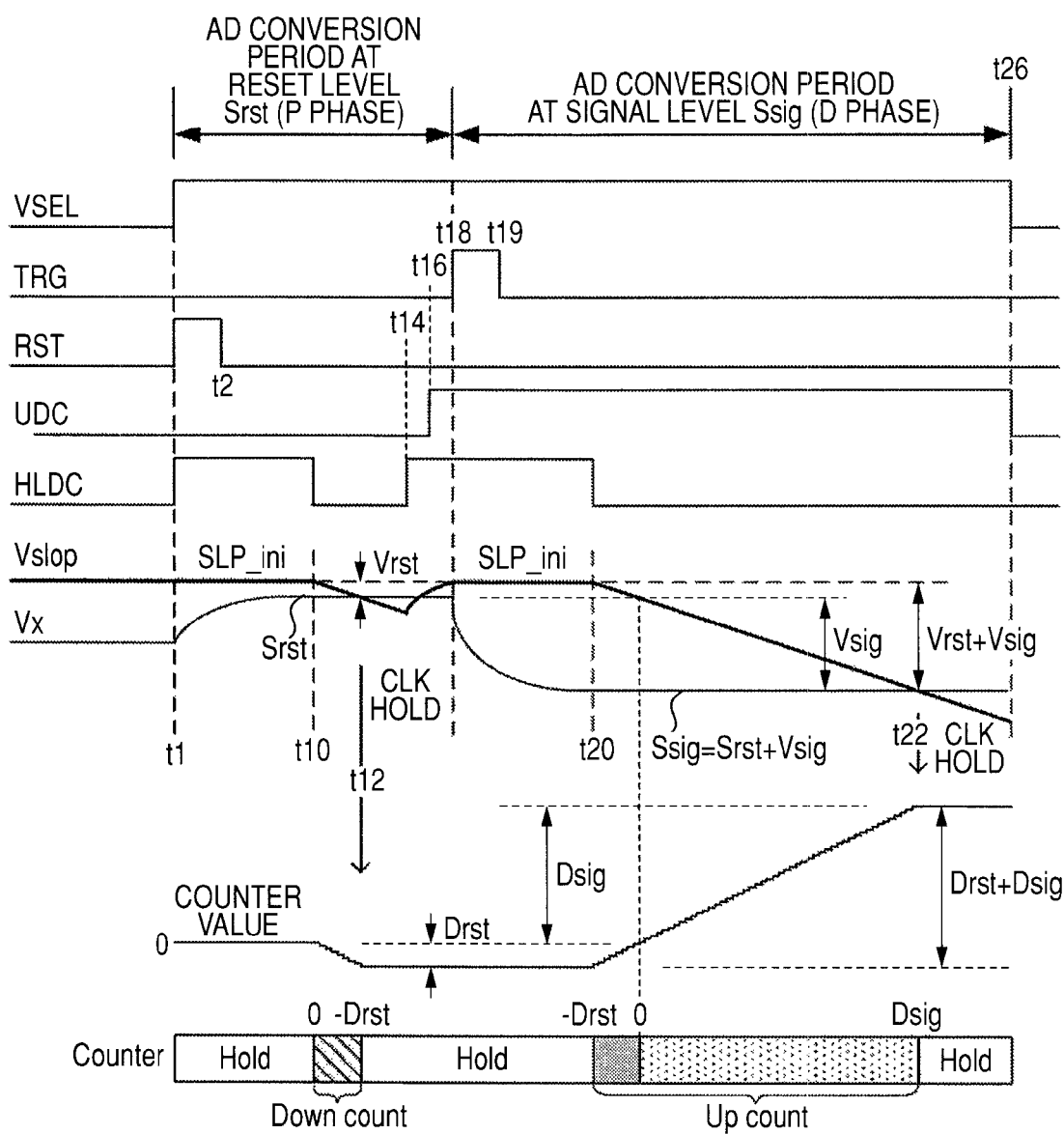
FIG. 2 is a timing chart for explaining signal acquisition difference processing that is a basic operation in a column AD circuit of the solid-state imaging device shown in FIG. 1.

FIG. 2 is a timing chart for explaining signal acquisition difference processing that is a basic operation in the column AD circuits 250 of the solid-state imaging device 1 shown in FIG. 1. To facilitate understanding of characteristics of column AD conversion processing to which the AD conversion processing of the reference signal comparison type according to this embodiment is applied, a general processing method of the AD conversion processing of the reference signal comparison type is described. Then, the characteristics of the processing according to this embodiment are specifically explained with reference to plural embodiments.

As a mechanism for converting analog pixel signals detected by the respective unit pixels 3 of the pixel array unit 10 into digital signals, for example, a method of obtaining count values of pixel signal levels corresponding to levels of reference components and signal components is adopted. In the method, the count values are obtained by finding a point where the reference signal Vslop of a ramp waveform shape that falls at a predetermined tilt (or falls stepwise) and voltages of the reference components and the signal components in the pixel signals from the unit pixels 3 coincide with each other and counting, with a count clock, time from a point when the reference signal Vslop used in this comparison processing is generated (when a change in the reference signal Vslop starts) to a point when electric signals corresponding to the reference components and the signal components in the pixel signals and the reference signal Vslop coincide with each other.

The analog pixel signal voltage Vx read out to the vertical signal line 19 is compared with the reference signal Vslop in the voltage comparing unit 252 of the column AD circuit 250 arranged for each of the columns. The counter unit 254 arranged for each of the columns in the same manner as the voltage comparing unit 252 is actuated in advance. The pixel signal voltage Vx of the vertical signal line 19 is converted into digital data by changing a certain potential of the reference signal Vslop and the counter unit 254 while associating the potential and the counter unit 254 in a one to one relation. Here, the change in the reference signal Vslop converts a voltage change into a time change. The pixel signal voltage Vx is converted into digital data by counting the time with the counter unit 254 while quantizing the time at a certain period (clock). Assuming that the reference signal Vslop changes by $\Delta V$ in certain time $\Delta t$, when the counter unit 254 is actuated at a period of $\Delta t$, a counter value at the time when the reference signal Vslop changes by $N \times \Delta V$ is N.

In the pixel signal So (the pixel signal voltage Vx) outputted from the vertical signal line 19, in time series, the signal level Ssig appears after the reset level Srst including noise of a pixel signal as a reference level. When P-phase processing is applied to the reference level (a reset level Srst; in practice, equivalent to the reset level Vrst), D-phase processing is processing for the signal level Ssig obtained by adding the signal component Vsig to the reset level Srst.

Although detailed explanation is omitted, first, when a signal acquired in a pre-charge phase (also abbreviated as P phase) that is an AD conversion period for the reset level Srst, the down-count mode is set. At this point, the unit pixels 3 are reset to a reset potential (t1 to t2). The reset potential is outputted to the vertical signal line 19 as the pixel signal So. Consequently, the reset level Srst appears on the vertical signal line 19 as the pixel signal voltage Vx.

The reset level Srst on the vertical signal lines 19 (H0, H1, ... ) converges and stabilizes. The communication and timing control unit 20 uses a data storage control pulse HLDC as the control data CN4 and sets the data storage control pulse HLDC inactive L (t10) such that the reference signal Vslop starts to change simultaneously with the start of a count operation in the counter unit 254.

In response, the reference-signal generating unit 27 inputs, as the reference signal Vslop that is a comparison voltage to one input terminal RAMP of the voltage comparing unit 252, a stepwise or linear voltage waveform that is changed with time in a sawtooth shape (RAMP shape) as a whole with an initial voltage SLP_ini set as a start point. The voltage comparing unit 252 compares the reference signal Vslop and the pixel signal voltage Vx of the vertical signal line 19 supplied from the pixel array unit 10.

Simultaneously with the input of the reference signal Vslop to the input terminal RAMP of the voltage comparing unit 252, the counter unit 254 arranged for each of the rows measures comparison time in the voltage comparing unit 252 in synchronization with the reference signal Vslop generated from the reference-signal generating unit 27. Actually, the data storage control pulse HLDC is set to inactive L for generation of the reference signal Vslop. Consequently, a storage operation of the data storing unit 512 is released. Therefore, the counter unit 254 starts down-count from an initial value "0" as a P-phase count operation. In other words, the counter unit 254 starts count processing in a negative direction.

The voltage comparing unit 252 compares the reference signal Vslop from the reference-signal generating unit 27 and the pixel signal voltage Vx inputted via the vertical signal line 19. When both the voltages are the same, the voltage comparing unit 252 inverts a comparate output from the H level to the L level. In other words, the voltage comparing unit 252 compares a voltage signal (the reset level Srst) corresponding to the reset level Vrst and the reference signal Vslop, generates a pulse signal of active low (L) having a magnitude in a time axis direction corresponding to a magnitude of the reset level Vrst, and supplies the pulse signal to the counter unit 254.

In response to a result of the comparison, the counter unit 254 stops the count operation substantially simultaneously with inversion of the comparate output and latches (stores) a count value (set as "−Drst" when a sign is taken into account) at that point as pixel data to complete AD conversion. In other words, the counter unit 254 counts, with the count clock CK0, the width of the pulse signal of active low (L) having a magnitude in the time axis direction obtained by the comparison processing in the voltage comparing unit 252 to obtain a count value indicating a digital value Drst (indicating −Drst when a sign is taken into account) corresponding to a magnitude of the reset level Vrst.

When a predetermined down-count period elapses, the communication and timing control unit 20 sets the data storage control pulse HLDC to active H (t14). Consequently, the reference-signal generating unit 27 stops the generation of the reference signal Vslop of a ramp shape (t14) and returns to the initial voltage SLP_ini.

During the P-phase processing, the reset level Vrst at the pixel signal voltage Vx is detected by the voltage comparing unit 252 and a count operation is performed by the counter unit 254. Therefore, the communication and timing control unit 20 reads out the reset level Vrst of the unit pixels 3 to carry out AD conversion of the reset level Vrst.

During signal acquisition in a data phase (which may be abbreviated as D phase) that is the following AD conversion period for the signal level Ssig, in addition to the reset level Vrst, the communication and timing control unit 20 reads out the signal component Vsig corresponding to an amount of incident light for each of the unit pixels 3 and performs an operation same as P-phase readout. First, the communication and timing control unit 20 sets a count mode control signal UDC to a high level and sets the counter unit 254 in the up-count mode (t16).

In this case, in the unit pixels 3, the communication and timing control unit 20 sets a transfer signal φTRG to active H while keeping a vertical selection signal φVSEL of a readout object row Vn in active H and reads out the signal level Ssig to the vertical signal line 19 (t18 to t19). When the signal level Ssig on the vertical signal lines 19 (H0, H1, ... ) converges and stabilizes, the communication and timing control unit 20 uses the data storage control pulse HLDC as the control data CN4 and sets the data storage control pulse HLDC to inactive L such that the reference signal Vslop starts to change simultaneously with the start of the count operation in the counter unit 254 (t20).

In response, the reference-signal generating unit 27 inputs, as the reference signal Vslop that is a comparison voltage to one input terminal RAMP of the voltage comparing unit 252, a stepwise or linear voltage waveform that is changed with time in a sawtooth shape (a RAMP shape) as a whole with an initial voltage SLP_ini set as a start point and having a tilt same as that in the P phase. The voltage comparing unit 252 compares the reference signal Vslop and the pixel signal voltage Vx of the vertical signal line 19 supplied from the pixel array unit 10.

Simultaneously with the input of the reference signal Vslop to the input terminal RAMP of the voltage comparing unit 252, the counter unit 254 arranged for each of the rows measures comparison time in the voltage comparing unit 252 in synchronization with the reference signal Vslop generated from the reference-signal generating unit 27. As described above, actually, the data storage control pulse HLDC is set to inactive L for generation of the reference signal Vslop. Consequently, a storage operation of the data storing unit 512 is released. Therefore, the counter unit 254 starts, as a D-phase count operation, up-count, which is opposite to the down-count in the P phase, from the digital value Drst (here, a negative value) of the reset level Srst of the pixel signal voltage Vx acquired during P-phase readout and AD conversion. In other words, the counter unit 254 starts count processing in a positive direction.

The voltage comparing unit 252 compares the reference signal Vslop of a ramp shape from the reference-signal generating unit 27 and the pixel signal voltage Vx inputted via the vertical signal line 19. When both the voltages are the same, the voltage comparing unit 252 inverts a comparate output from the H level to the L level (t22). In other words, the voltage comparing unit 252 compares a voltage signal (the signal level Ssig of the pixel signal voltage Vx) corresponding to the signal component Vsig and the reference signal Vslop, generates a pulse signal of active low (L) having a magnitude in a time axis direction corresponding to a magnitude of the signal component Vsig, and supplies the pulse signal to the counter unit 254.

In response to a result of the comparison, the counter unit 254 stops the count operation substantially simultaneously with inversion of the comparate output and latches (stores) a count value at that point as pixel data to complete AD conversion (t22). In other words, the counter unit 254 counts, with the count clock CK0, the width of the pulse signal of active low (L) having a magnitude in the time axis direction obtained by the comparison processing in the voltage comparing unit 252 to obtain a count value corresponding to the signal level Ssig at the pixel signal voltage Vx.

When a predetermined up-count period elapses, in the unit pixels 3, the communication and timing control unit 20 sets the vertical selection signal φVSEL of the readout object row Vn to inactive L, prohibits output of the pixel signal So to the vertical signal line 19, and sets, for the next readout object row Vn+1, the vertical selection signal φVSEL to active H (t26). In this case, the communication and timing control unit 20 prepares for processing for the next readout object row Vn+1. For example, the communication and timing control unit 20 sets the count mode control signal UDC to a low level and sets the counter unit 254 in the down-count mode.

During the D-phase processing, the signal level Ssig at the pixel signal voltage Vx is detected by the voltage comparing unit 252 and a count operation is performed by the counter unit 254. Therefore, the communication and timing control unit 20 reads out the signal component Vsig of the unit pixels 3 to carry out AD conversion of the signal level Ssig.

The signal level Ssig is a level obtained by adding the signal component Vsig to the reset level Srst. Therefore, a count value as a result of AD conversion of the signal level Ssig is basically "Drst+Dsig". However, since a start point of up-count is "−Drst" as a result of AD conversion of the reset level Srst, a count value actually stored is "−Drst+(Dsig+Drst)=Dsig.

A count operation in the counter unit 254 is down-count during P-phase processing and is up-count during D-phase processing. Therefore, in the counter unit 254, difference processing (subtraction processing) is automatically performed between the count value "−Drst" as the result of AD conversion of the reset level Srst and the count value "Drst+Dsig" as the result of AD conversion of the signal level Ssig. The count value Dsig corresponding to a result of the difference processing is stored in the counter unit 254. The count value Dsig stored in the counter unit 254 corresponding to the result of the difference processing corresponds to the signal component Vsig.

As described above, according to the difference processing in the counter unit 254 by the readout and the count processing performed twice, i.e., the down-count during the P-phase processing and up-count during the D-phase processing, it is possible to remove the reset level Vrst including fluctuation for each of the unit pixels 3. It is possible to acquire, with the simple structure, an AD conversion result of only the signal component Vsig corresponding to an amount of incident light for each of the unit pixels 3. Therefore, the column AD circuit 250 operates not only as a digital conversion unit that converts an analog pixel signal into digital pixel data but also as a CDS (Correlated Double Sampling) processing function unit.

The column AD circuit 250 includes the data storing unit 256 at a post stage of the counter unit 254. The column AD circuit 250 can transfer, before an operation of the counter unit 254, a count result of the preceding row Hx−1 to the data storing unit 256 on the basis of the memory transfer instruction pulse CN8 from the communication and timing control unit 20. In other words, after an AD conversion period ends, the column AD circuit 250 saves data in the counter unit 254 in the data storing unit 256 and starts AD conversion for the next row Vx+1. The data in the data storing unit 256 is selected by the horizontal scanning unit 12 in order in the background of the AD conversion and can be read out using the output circuit 28.

Details of Column AD Conversion Processing

As it is understood from the explanation, in the AD conversion system called the reference signal comparison type or the like, the analog unit signal (the pixel signal voltage Vx) and the reference signal Vslop of the ramp shape for converting the analog unit signal into digital data are compared by the voltage comparing unit 252. Therefore, time necessary for comparison processing in the voltage comparing unit 252 regulates AD conversion performance, in particular, an increase in speed of conversion processing Taking the above into account, in the reference-signal generating unit 27, it is possible to adopt a method of increasing a frequency of the count clock CKdac to accurately increase the tilt of the reference signal Vslop and reduce time necessary for the comparison processing. However, in this case, to prevent resolution during AD conversion from being affected, a frequency of the count clock CK0 served for count processing in the counter unit 254 has to be changed to be high to increase speed of a frequency dividing operation in the counter unit 254.

In this case, the entire counter unit 254 operates at high speed and power consumption increases. When a frequency of the count clock CKdac is increased to increase the tilt of the reference signal Vslop, as in the above case, power consumption increases in the reference-signal generating unit 27. However, since the counter units 254 are arranged in the respective pixel rows in the column processing unit 26, a degree of an "increase in power consumption" is incomparably larger in the column processing unit 26 than in the reference-signal generating unit 27.

In this embodiment, taking this point into account, when the AD conversion system called the reference signal comparison type or the like is adopted, a mechanism that can realize an increase in speed of AD conversion processing while controlling an increase in power consumption in the counter units 254 is adopted. The mechanism is specifically explained below.

The count clock CK0 and the count clock CKdac do not have to have an identical frequency in principle. However, to facilitate understanding, in the following explanation, it is assumed that the count clock CK0 and the count clock CKdac have an identical frequency and synchronize with each other and, specifically, are completely identical.

Figure 3A:
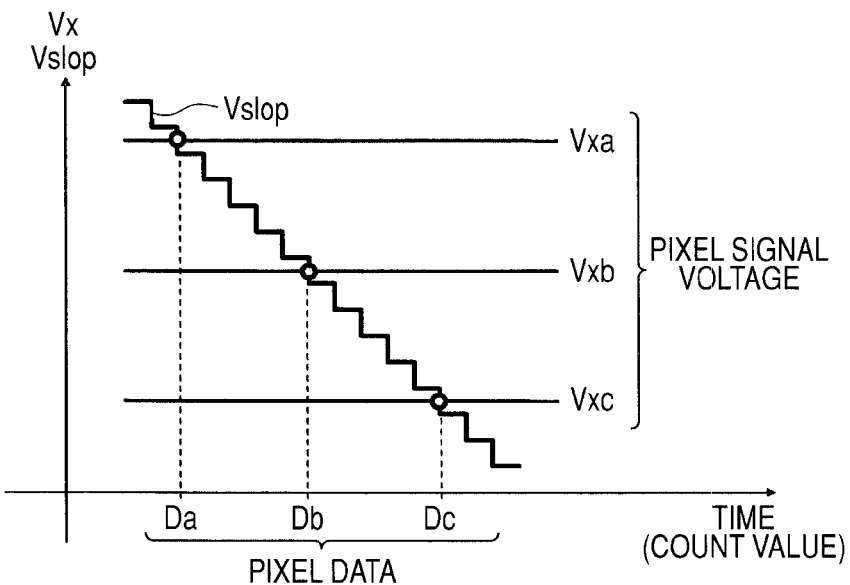
FIGS. 3A and 3B are diagrams for explaining an overview of operations of a voltage comparing unit and a counter unit at a point when comparison processing in AD conversion processing of a reference signal comparison type is completed.
Figure 3B:
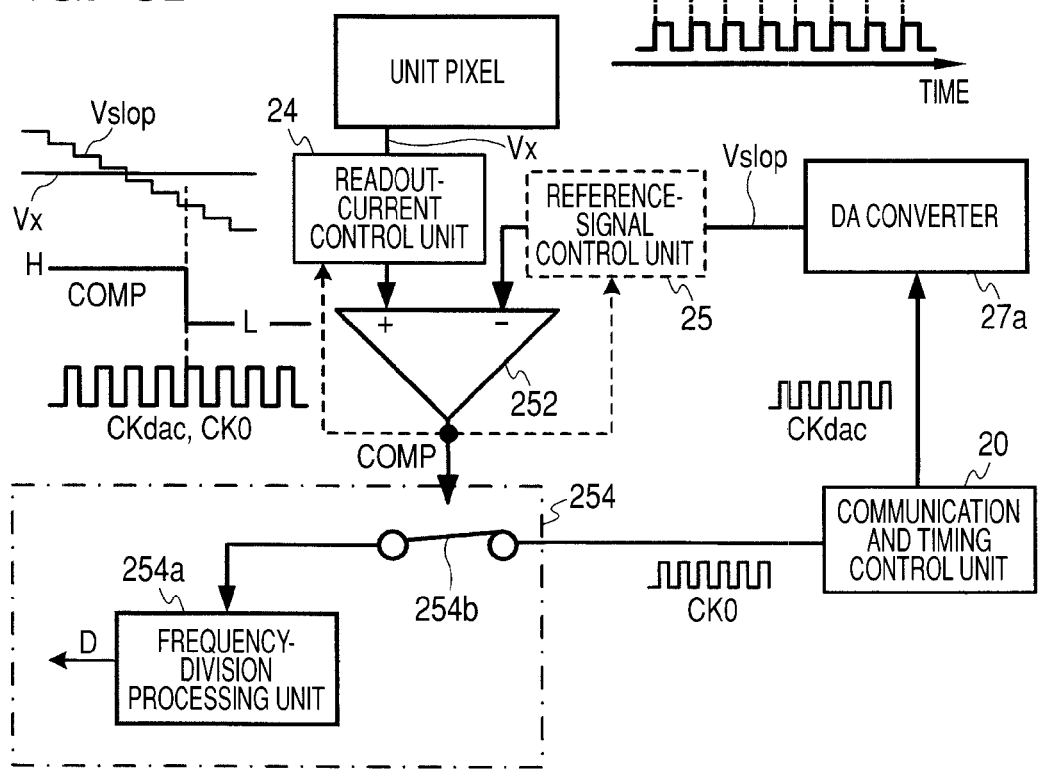

FIGS. 3A and 3B are diagrams for explaining an overview of operations of the voltage comparing unit 252 and the counter unit 254 at a point when comparison processing in the AD conversion processing of the reference signal comparison type is completed. FIG. 3A is a diagram showing a relation between the reference signal Vslop and the pixel signal voltage Vx in enlargement. FIG. 3B is a diagram showing, together with a circuit block diagram, a flow until the pixel signal voltage Vx from the pixel array unit 10 is converted into digital data by the counter unit 254.

As in the premise described above, from the communication and timing control unit 20, the count clock CKdac is supplied to the DA converter 27a and the count clock CK0 having a frequency identical with and synchronizing with the count clock CKdac is supplied to the counter unit 254. The counter unit 254 includes, as internal circuits, a frequency-division processing unit 254a formed by multi-stage connection of a flip-flop that performs a count operation (a frequency dividing operation) on the basis of the count clock CK0 and a switch 254b of an ON/OFF type that controls the supply of the count clock CK0 to the frequency-division processing unit 254a.

When comparison processing for AD conversion is started, the voltage comparing unit 252 sets a comparison pulse COMP to an H level. The comparison pulse COMP is supplied to a control input terminal of the switch 254b from the voltage comparing unit 252. The switch 254b is turned on when the comparison pulse COMP is at the H level and transfers the count clock CK0 from the communication and timing control unit 20 to the frequency-division processing unit 254a. On the other hand, when the comparison pulse COMP is at an L level, the switch 254b is turned off and stops the transfer of the count clock CK0 to the frequency-division processing unit 254a. When the count clock CK0 is supplied, the frequency-division processing unit 254a performs a count operation (a frequency dividing operation). When the supply of the count clock CK0 is stopped, the frequency-division processing unit 254a stores and outputs a count value up to that point.

When AD conversion processing (comparison processing) starts, the clocks CKdac and CK0 having an identical frequency are inputted to the DA converter 27a and the frequency-division processing unit 254a and synchronize with each other. First, the reference signal Vslop that is stepwise but linearly changes with time according to the count clock CKdac (here, a voltage value thereof gradually falls) as shown in FIGS. 3A and 3B is supplied to the voltage comparing unit 252 from the DA converter 27a of the reference-signal generating unit 27. In embodiments described later, the reference-signal control unit 25 that switches a voltage level of the reference signal Vslop on the basis of the comparison pulse COMP from the voltage comparing unit 252 may be interposed or may not be interposed. In the embodiments, the readout-current control unit 24 may flow a constant operation current Id to the vertical signal line 19 or may change the operation current Id on the basis of the comparison pulse COMP from the voltage comparing unit 252 to switch a voltage level of the pixel signal voltage Vx.

As shown in FIGS. 3A and 3B, at a point when the pixel signal voltage Vx (an analog value) and the reference signal Vslop coincide with each other, the voltage comparing unit 252 switches the comparison pulse COMP from the H level to the L level. Consequently, since the switch 254b is turned off, the frequency-division processing unit 254a that have been operating according to the input of the count clock CK0 stops the count operation and outputs a count value (comparison time/clock frequency) at this point as a value of pixel data D.

Therefore, as shown in FIG. 3A, pixel data Da of a unit pixel 3A, the pixel signal voltage Vx of which is Vxa, pixel data Db of a unit pixel 3B, the pixel signal voltage Vx of which is Vxb (<Vxa), and pixel data Dc of a unit pixel 3C, the pixel signal voltage Vx of which is Vxc (<Vxb) are obtained. The pixel signal voltage Vx includes the reset level Srst, which is a reference level of the pixel signal So, and the signal level Ssig (<) Srst. Concerning the signal component Vsig (=|Ssig−Srst|) and the pixel data D corresponding thereto, the pixel data D is larger as a value of the pixel signal voltage Vx is smaller.

First Example of First Embodiment

Figure 4:
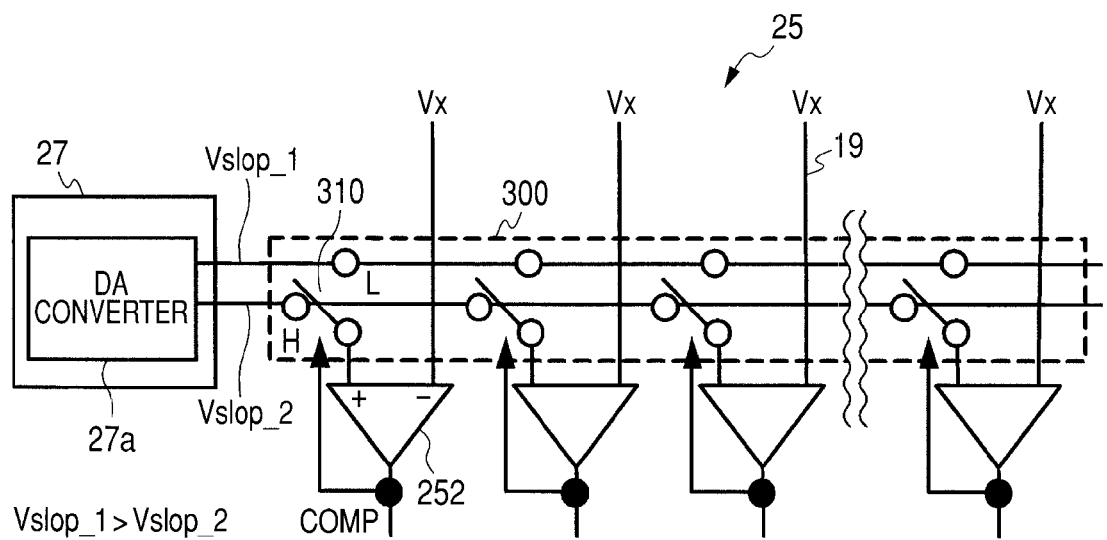
FIG. 4 is a circuit block diagram for explaining an example of the structure around a reference-signal control unit applied to AD conversion processing of a reference signal comparison according to a first example of a first embodiment of the present invention.
Figure 5A:
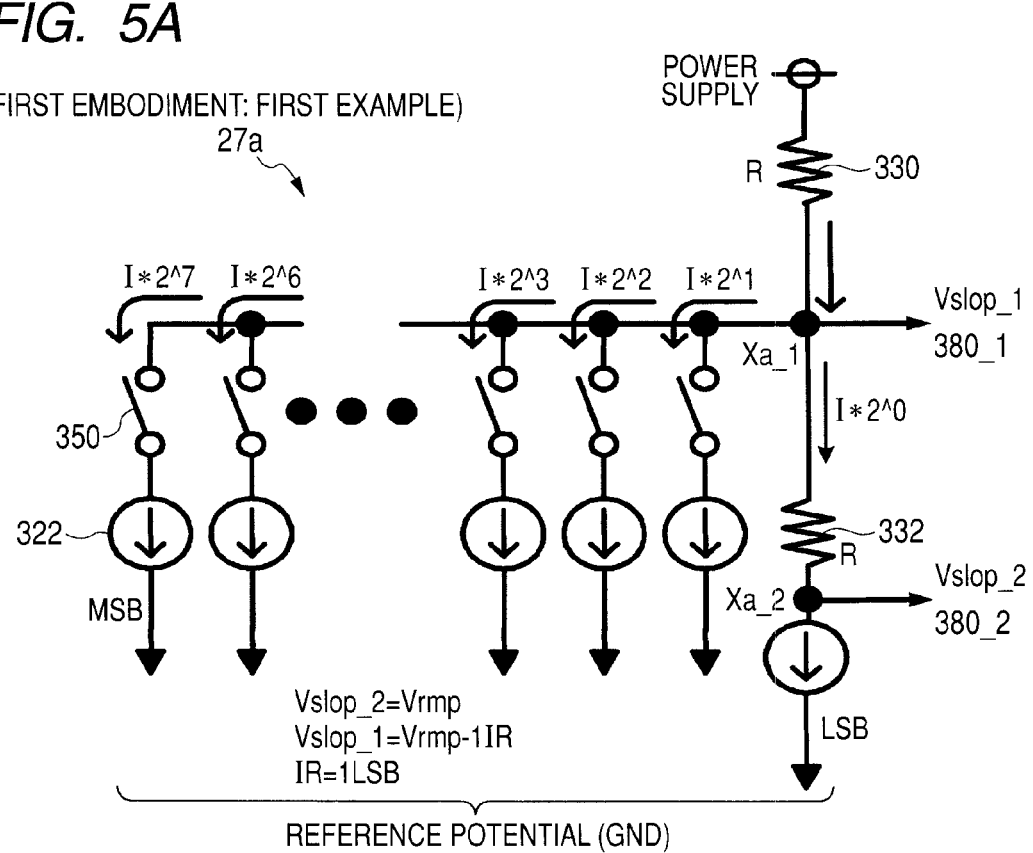
FIGS. 5A and 5B are functional block diagrams for explaining details of a DA converter applied to respective kinds of AD conversion processing of the reference signal comparison type according to the first example of the first embodiment and a comparative example.
Figure 5B:
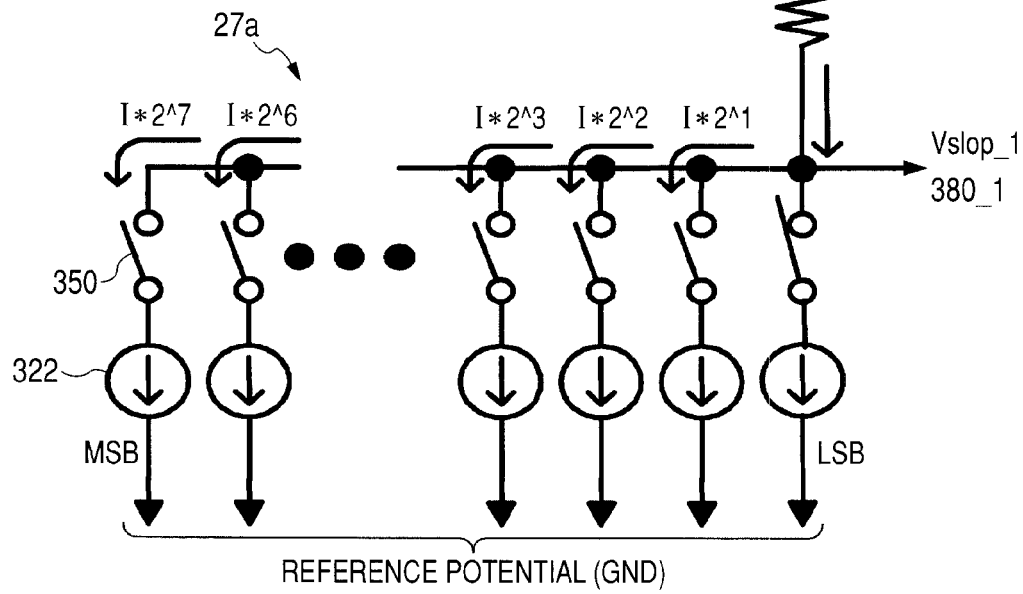
Figure 6:
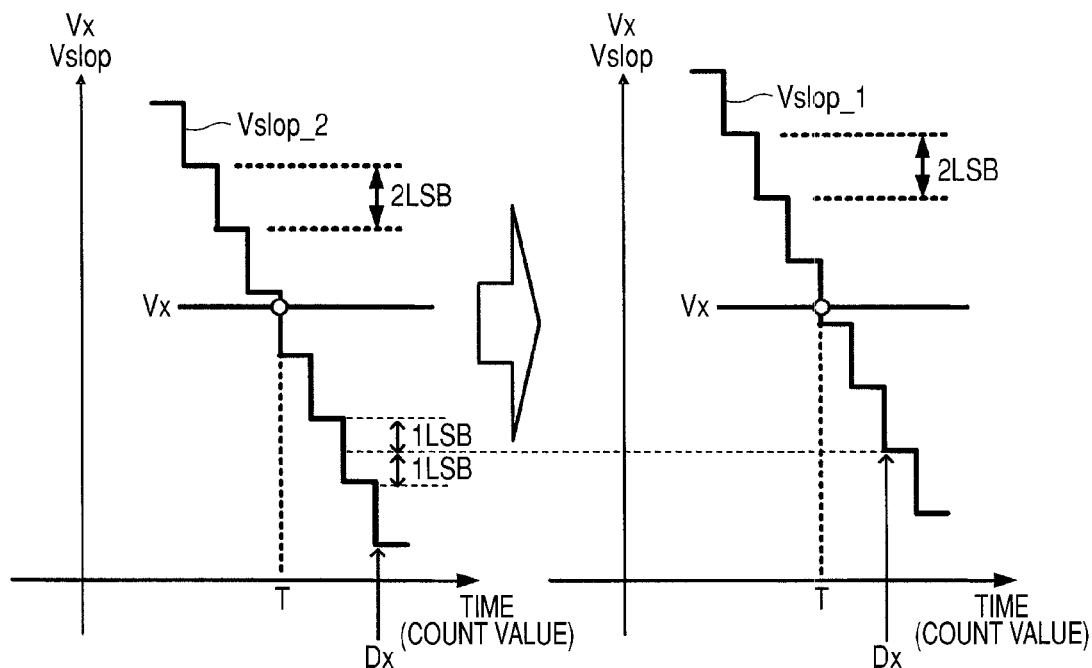
FIG. 6 is a diagram for explaining an operation principle of the AD conversion processing of the reference signal comparison type according to the first example of the first embodiment and shows a relation between two kinds of reference signals and a pixel signal voltage.

FIGS. 4 to 6 are diagrams for explaining AD conversion processing of a reference signal comparison type according to a first example of a first embodiment of the present invention. FIG. 4 is a circuit block diagram for explaining an example of the structure around the reference-signal control unit 25 applied to the AD conversion processing of the reference signal comparison type according to the first example of the first embodiment. FIGS. 5A and 5B are functional block diagrams for explaining details of the DA converter 27a applied to respective kinds of AD conversion processing of the reference signal comparison type according to the first example of the first embodiment and a comparative example. FIG. 6 is a diagram for explaining an operation principle of the AD conversion processing of the reference signal comparison type according to the first example of the first embodiment and shows a relation between two kinds of reference signals Vslop_1 and Vslop_2 and the pixel signal voltage Vx.

As shown in FIG. 4, the solid-state imaging device 1 to which the AD conversion processing of the reference signal comparison type according to the first example of the first embodiment is applied includes the reference-signal control unit 25 interposed for transfer of the reference signal Vslop between the reference-signal generating unit 27 and the column processing unit 26. As explained with reference to FIGS. 5A and 5B later, the DA converter 27a can generate two kinds of reference signals Vslop_1 and Vslop_2 (Vslop_1>Vlop_2), a voltage difference between which is 1 LSB. "LSB" is an analog amount equivalent to a quantization unit of AD conversion, i.e., one digital unit.

As shown in FIG. 4, the reference-signal control unit 25 according to the first example of the first embodiment includes a reference-signal selecting unit 300 that switches the two kinds of reference signals Vslop_1 and Vslop_2 outputted from the DA converter 27a. The reference-signal selecting unit 300 includes a switch 310 of two-input and one-output type for each of pixel rows.

The comparison pulse COMP is supplied to a control input terminal of the switch 310 from the voltage comparing unit 252 in the same column. The switch 310 selects the reference signal Vslop_2 and transfers the reference signal Vslop_2 to the voltage comparing unit 252 when the comparison pulse COMP is at the H level. On the other hand, the switch 310 selects the reference signal Vslop_1 and transfers the reference signal Vslop_1 to the voltage comparing unit 252 when the comparison pulse COMP is at the L level.

In the reference-signal control unit 25, since the switch 310 is also provided for each of the pixel rows in the reference-signal selecting unit 300, outputs (the comparison pulses COMP) of the voltage comparing units 252 in the column AD circuits 250 in the respective pixel rows are fed back to the switches 310 in the pixel rows corresponding thereto. The switches 310 are switched at timing when the outputs of the voltage comparing units 252 are inverted. The reference-signal control unit 25 controls the reference signal Vslop, which is referred to by the voltage comparing units 252, independently for the respective pixel rows.

As shown in FIG. 5A in detail, the DA converter 27a according to the first example of the first embodiment functionally includes N (N corresponds to the number of bits of pixel data; in the figure, 8 bits) sync current sources 322 corresponding to respective bits, output switches 350 of an ON/OFF type for selectively combining outputs of the respective sync current sources 322, and a resistive element 330 for current and voltage conversion. In the figure, the sync current source 322 and the output switch 350 for only a most significant bit MSB are shown.

In the structure according to the first embodiment shown in FIG. 5A, the output switch 350 is not provided for a least significant bit LSB. Instead, a resistive element 332 is provided between an output node 380_1 and an output node 380_2. An output of the sync current source 322 is connected to the resistive element 330 via the resistive element 332. On the other hand, in the comparative example shown in FIG. 5B, the output of the sync current source 322 is connected to the resistive element 330 via the output switch 350.

A resistance value of the resistive element 332 provided between the output node 380_1 for the reference signal Vslop_1 and the output node 380_2 for the reference signal Vslop_2 and a resistance value of the resistive element 330 provided between the output node 380_1 for the reference signal Vslop_1 and a power supply node are set to the same value R.

Although not shown in the figure, switching units that control ON/OFF operations of the output switches 350 of the respective sync current sources 322 are connected to control input terminals of the output switches 350.

The respective sync current sources 322 are connected a reference potential (a ground potential GND) on one side and connected to the output switches 350 (excluding the LSB) on the other sync side. The opposite side of the sync current sources 322 of the respective output switches 350 for the respective bits excluding the LSB and an output side of the synch current source 322 of the LSB are connected in common. A connection points Xa_1 of the opposite side and the output side is connected to the resistive element 330 for current and voltage control in common for all the bits. The opposite side of the resistive element 330 is connected to a power supply.

The sync current sources 322 for the respective bits synchronize current amounts corresponding to weights of the bits. For example, a current amount for the least significant bit LSB is a minimum current amount I. The current amount is increased, bit by bit, by the square of a scaling value x. When the current amount for the LSB is I, the current amount for the other bits are represented as I*{x^&} (& is 1, 2, ..., N−2, and N−1). In this example, the scaling x is set to 2 and the bits are weighted by the square of the scaling x.

At the connection point Xa_1, in both the structure according to the first example of the first embodiment shown in FIG. 5A and the structure according to the comparative example shown in FIG. 5B, a voltage value Vrmp corresponding to a product of a current value as a result of addition of currents of the respective bits and a resistance value of the resistive element 330 is outputted from the output node 380_1 as the reference signal Vslop_1 as a result of DA conversion. In the structure according to the first example of the first embodiment shown in FIG. 5A, at a connection point X_2 of the sync current source 322 and the resistive element 332 of the LSB, a voltage value (a voltage value for 1 LSB) corresponding to a product of the current value I of the sync current source 322 of the LSB and a resistance value of the resistive element 332 is set lower than the voltage value Vrmp of the reference signal Vslop_1 and outputted from the output node 380_2 as the reference signal Vslop_2 as a result of DA conversion. In other words, the reference signal Vslop_2 is typically lower than the reference signal Vslop_1 by 1 LSB (reference signal Vslop_2=Vrmp-1IR).

In the structure according to the first example of the first embodiment shown in FIG. 5A, resistance values of the resistive elements 330 and 332 are set to the same value R, whereby two kinds of reference signals Vslop_1 and Vslop_2, a potential difference between which is R×I, are outputted. The respective reference signals Vslop_1 and Vslop_2 change at a step voltage of R×2*I.

It is taken into account that R×I is equivalent to 1 LSB (a quantization unit of AD conversion) in the DA converter 27a according to the comparative example shown in FIG. 5B. Then, in the structure according to the first example of the first embodiment shown in FIG. 5A, in other words, it can be said that, as shown in FIG. 6, the two kinds of reference signals Vslop_1 and Vslop_2 have potentials different by 1 LSB (Vslop_1=Vslop_2+1 LSB) and change at a step voltage of 2 LSB per count clock CKdac.

In a relation with conversion of the pixel signal voltage Vx into the pixel data D, the reference-signal selecting unit 300 first selects, as a reference signal for pre-stage comparison processing, the reference signal Vslop_2, which coincides with the pixel signal voltage Vx first in the comparison of respective values at an identical count value and the pixel signal voltage Vx, in the two kinds of reference signals. When the comparison pulse COMP is inverted (to be the L level) in post-stage comparison processing of the reference signal Vslop_2 and the pixel signal voltage Vx, the reference-signal selecting unit 300 switches the reference signal Vslop_2 to the remaining reference signal Vslop_1.

M kinds of reference signals Vslop, a level difference between adjacent ones of which is resolution (1 LSB) of a least significant bit of digital data, and that change at a step (2 LSB) M times=twice as large as the level (1 LSB) of the resolution of the least significant bit and the pixel signal voltage Vx are compared to specify pixel data D of the pixel signal voltage Vx. In terms of a relation with the pixel data D as a result of AD conversion of the pixel signal voltage Vx, pixel data at the time when the comparison pulse COMP is inverted at a point of timing T of the count clock CK0 is specified. Therefore, in a relation with timing "T−1" immediately before the timing T, both a difference "Vslop_1(T)−Vslop_1(T−1)" and a difference "Vslop_2(T)−Vslop_2(T−1)" are 2 LSB. It is natural that respective reference signals are changed at a rate of change twice as large as 1 LSB (2LSB).

On the other hand, it is conceivable to specify the pixel data D on the basis of respective comparison results of the reference signals Vslop_1 and Vslop_2 and the pixel signal voltage Vx. In this case, it is possible to distinguish the pixel signal voltage Vx using a level difference (in this example, 1 LSB) of the reference signals Vslop_1 and Vslop_2 by forming the respective reference signals Vslop_1 and Vslop_2 stepwise in an input section of the voltage comparing unit 252. It is possible to improve resolution to be higher than a rate of change of the reference signals. Eventually, it is possible to decide the pixel data D in a 1 LSB step.

In the case of this example, it is taken into account that there is a relation of Vslop_1>Vslop_2, the comparison pulse COMP is inverted when the reference signals Vslop_1(T) and Vslop_2(T) fall below the pixel signal voltage Vx, and a count value at that point is stored. In other words, the fact that the comparison pulse COMP is inverted at Vslop_1(T) with respect to the pixel signal voltage Vx means Vslop_1(T−1) ≧pixel signal voltage Vx>Vslop_1(T). The fact that the comparison pulse COMP is inverted at Vslop_2(T) with respect to the pixel signal voltage Vx means that Vslop_2(T−1)≧pixel signal voltage Vx>Vslop_2(T). A difference between Vslop_1(T) and Vslop_1(T−1) and a difference between Vslop_2(T) and Vslop_2(T−1) are 2 LSB.

Taking into account a point that Vslop_1(T)>Vslop_2(T) and a difference between Vslop_1 and Vslop_2 is 1 LSB, Vslop_2(T−1)≧pixel signal voltage Vx>(or ≧) Vslop_1(T) (a difference between Vslop_1(T) and Vslop_2(T−1) is 1 LSB) and Vslop_1(T)≧(or >) pixel signal voltage Vx>Vslop_2(T) (a difference between Vslop_2(T) and Vslop_1(T) is 1 LSB). Consequently, it is possible to decide the pixel data D of the pixel signal voltage Vx at resolution of 1 LSB by referring to, while changing the two kinds of reference signals Vslop_1 and Vslop_2, a voltage difference between which is 1 LSB, at a rate of change of 2 LSB, comparison results of the two kinds of reference signals Vslop_1 and Vslop_2 and the pixel signal voltage Vx. A procedure of the processing is specifically explained below.

Processing Procedure According to the First Example of the First Embodiment: Basic FIGS. 7A and 7B are diagrams for explaining an AD conversion processing procedure of a reference signal comparison type according to the first example of the first embodiment and are diagrams for explaining a method of deciding the pixel data D corresponding to the pixel signal voltage Vx in the counter unit 254 after comparison processing by the voltage comparing unit 252.

In the first example, it is assumed that time necessary for switching of the switch 310 in the reference-signal control unit 25 and a comparison operation in the voltage comparing unit 252 is sufficiently short and is also sufficiently short compared with time Tad in which a potential of the reference signal Vslop changes 2 LSB. The time Tad is equivalent to time for one clock of the count clock CK0 (in this example, CK0=CKdac) and is hereinafter referred to as an AD unit Tad. In other words, a delay period Tdelay until comparison processing at the reference signal Vslop_1 is completed after comparison processing at the reference signal Vslop_2 is smaller than one clock of the count clock CK0 (in this example, CKdac). For example, in FIGS. 7A and 7B, the delay period Tdelay is about a half clock.

Before starting comparison processing, the voltage comparing unit 252 sets the comparison pulse COMP to the H level. Therefore, in the reference-signal control unit 25, the switch 310 in each of the pixel rows selects the reference signal Vslop_2 in the two kinds of reference signals Vslop_1 and Vslop_2 outputted from the DA converter 27a and supplies the reference signal Vslop_2 to the voltage comparing unit 252. The voltage comparing unit 252 in each of the pixel rows compares, in the beginning of the comparison processing, the reference signal Vslop_2 and the pixel signal voltage Vx supplied from the vertical signal line 19 of the pixel row corresponding thereto. At a point T when a pixel signal voltage Vxα (α is a and b) of an analog value and the reference signal Vslop_2 coincide with each other, the voltage comparing unit 252 switches the comparison pulse COMP from the H level to the L level. This comparison processing is referred to as pre-stage comparison processing for AD conversion.

Figure 7A:
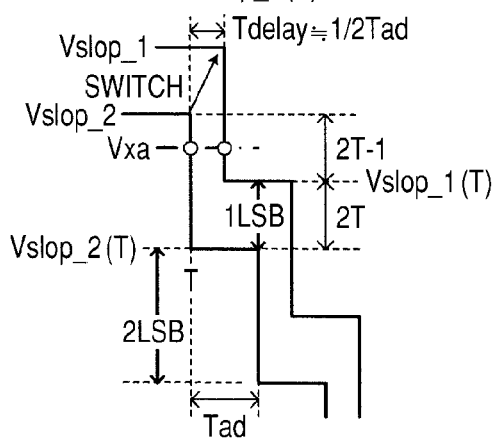
FIGS. 7A and 7B are diagrams for explaining an AD conversion processing procedure of a reference signal comparison type according to the first example of the first embodiment and explaining a method of deciding pixel data corresponding to a pixel signal voltage in a counter unit after comparison processing by a voltage comparing unit.
Figure 7B:
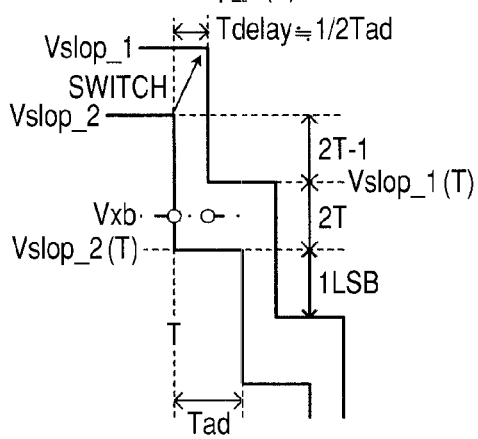

In the reference-signal control unit 25, the switch 310 in each of the pixel rows switches the reference signal Vslop_2 to the reference signal Vslop_1 as shown in FIG. 6 and FIGS. 7A and 7B when the comparison pulse COMP from the voltage comparing unit 252 in the pixel row is switched to the L level. The voltage comparing unit 252 immediately compares the pixel signal voltage Vxα with the reference signal Vslop_1(T) again. This comparison processing is referred to as post-stage comparison processing for AD conversion. The counter unit 254 stores a count value T at this point. In other words, the counter unit 254 stores a count value T at timing when a magnitude relation between the pixel signal voltage Vxα and the reference signal Vslop_1 is inverted.

When "pixel signal voltage Vxα>reference signal Vslop_1 (T)", the comparison pulse COMP is maintained at the L level. However, when "pixel signal voltage Vxα<reference signal Vslop_1(T)", the comparison pulse COMP is switched to the H level. Comparison results (the comparison pulse COMP) at this time are notified to the counter unit 254. The counter unit 254 decides the pixel data D as described below on the basis of the respective comparison results. The counter unit 254 stores the count value T at a point when comparison processing by the voltage comparing unit 252 with the reference signal Vslop_2 selected by the reference-signal selecting unit 300 in the two kinds of reference signals Vslop is completed. The counter unit 254 decides digital data of the pixel signal voltage Vx by correcting the stored count value T on the basis of a result of comparison by the voltage comparing unit 252 with the pixel signal voltage Vx corresponding to selection of the remaining reference signal Vslop_1 by the reference-signal selecting unit 300.

For example, when "pixel signal voltage Vxα>reference signal Vslop_1(T)", the counter unit 254 outputs "2T−1" as a final count value. This is because, as shown in FIG. 7A, during AD conversion processing in a 2 LSB step, the pixel signal voltage Vxa is higher than a voltage value equivalent to "2T−1" of the reference signal Vslop_2(T) but, actually, the pixel signal voltage Vxa has not reached a 2T level and is in a range of "2T−2" to "2T−1". On the other hand, when "pixel signal voltage Vxα<reference signal Vslop_1(T)", the counter unit 254 outputs 2T as a final count value. This is because, as shown in FIG. 7B, during AD conversion processing in the 2 LSB step, the pixel signal voltage Vxb is lower than a voltage value equivalent to 2T of the reference signal Vslop_2(T) but, actually, the pixel signal voltage Vxb has reached a level equivalent to 2T.

Consequently, compared with the case of the AD conversion processing of the reference signal comparison type performed by using the DA converter 27a according to the comparative example, AD conversion processing in 1 LSB units is realized by performing comparison at the two kinds of reference signals Vslop_1 and Vslop_2, a voltage difference between which is 1 LSB, in a predetermined order (in this example, comparison at the reference signal Vslop_2 having a low voltage level is performed earlier) while controlling the reference signal Vslop in the 2 LSB step. There is an advantage that, even if frequencies of the count clock CK0 and the count clock CKdac are not increased, time necessary for AD conversion is substantially halved. Since the time necessary for AD conversion can be halved, it is possible to double speed of AD conversion processing while maintaining bit resolution and controlling an increase in power consumption in the counter unit 254.

When it is attempted to simply double speed of AD conversion processing in the comparative example, for example, since respective clock speeds are doubled, power consumption increases. On the other hand, if the first example of the first embodiment is applied, it is possible to double processing speed with power consumption generally the same as that at the original processing speed. Conversely, when processing speed same as that in the comparative example is maintained, if the first example of the first embodiment is applied, it is possible to generally halve power consumption.

Processing Procedure According to a Second Example of the First Embodiment

Figure 8A:
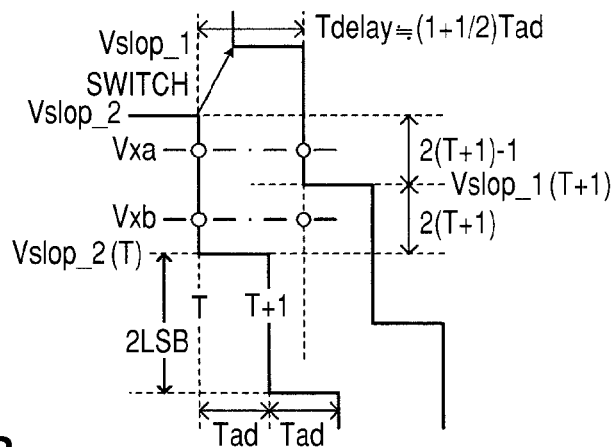
FIGS. 8A to 8C are diagrams for explaining an AD conversion processing procedure of a reference signal comparison type according to a second example of the first embodiment and explaining a problem of the first example and effects of the second example.
Figure 8B:
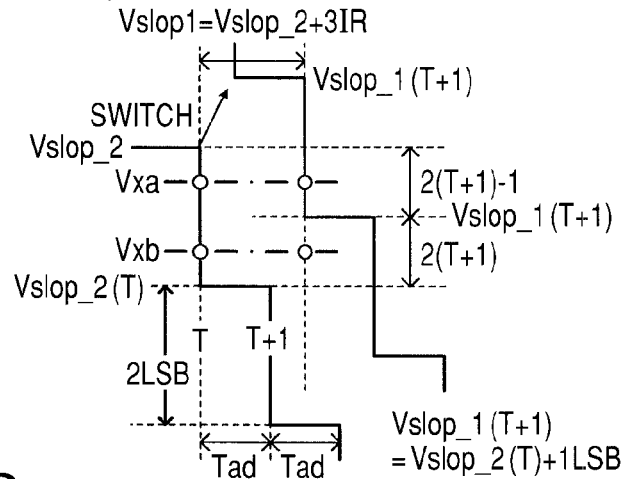
Figure 8C:
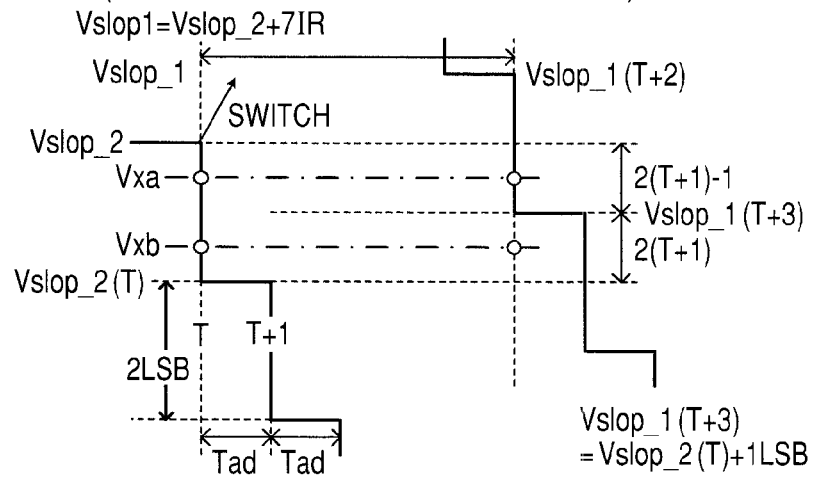

FIGS. 8A to 8C are diagrams for explaining an AD conversion processing procedure of a reference signal comparison type according to a second example of the first embodiment and are diagrams for explaining problems of the first example and effects of the second example.

In the first example, it is assumed that time necessary for switching of the switch 310 in the reference-signal control unit 25 and a comparison operation in the voltage comparing unit 252 is sufficiently short and is also sufficiently short compared with time in which a potential of the reference signal Vslop changes 2 LSB (equivalent to time for one clock of the count clock CK0 (in this example, CKdac). However, actually, in some case, the time is not short in this way.

For example, as shown in FIG. 8A, time equal to or longer than $\beta$ clocks and shorter than "$\beta+1$" clocks of the count clock CKdac ($\beta$ is referred to as a processing delay clock width); in the figure, $\beta=1$) is further necessary until comparison processing at the reference signal Vslop_1 is completed after comparison processing at the reference signal Vslop_2. In this case, in the processing in the first example, the counter unit 254 stores a count value "T+$\beta$". In processing for deciding pixel data, since the counter unit 254 outputs "2 (T+$\beta$)−1" or 2(T+$\beta$) as a final count value, an error occurs.

To solve this problem, it is sufficient to set, according to the processing delay clock width $\beta$, the reference signal Vslop_1 high by "1+2$\beta$" LSB compared with the reference signal Vslop_2 and perform an AD conversion operation in synchronization with a count operation in the counter unit 254 as described below.

In order to increase a potential of the reference signal Vslop_1 by "1+2$\beta$" LSB, a circuit configuration corresponding to the increase only has to be adopted. For example, a resistance value of the resistive element 332 provided between the output node 380_2 for the reference signal Vslop_2 and the output node 380_1 for the reference signal Vslop_1 in FIG. 5A only has to be set "1+2$\beta$" times as large as a resistance value of the resistive element 330 between the output node 380_1 for the reference signal Vslop_1 and the power supply node.

Specifically, as shown in FIGS. 8B and 8C, and as in the first example, the voltage comparing unit 252 in each of the pixel rows compares, in the beginning of the comparison processing, the reference signal Vslop_2 and the pixel signal voltage Vxα supplied from the vertical signal line 19 of the pixel row corresponding thereto. At a point when the pixel signal voltage Vxα and the reference signal Vslop_2 coincide with each other, the voltage comparing unit 252 switches the comparison pulse COMP from the H level to the L level. The counter unit 254 stores a count value T at this point. In the reference-signal control unit 25, the switch 310 in each of the pixel rows switches the reference signal Vslop_2 to the reference signal Vslop_1 when the comparison pulse COMP from the voltage comparing unit 252 in the column is switched to the L level.

Thereafter, the voltage comparing unit 252 starts comparison processing for the reference signal Vslop_1 and the pixel signal voltage Vxα. However, because of a problem of a circuit response, longer time is necessary for switching of the switch 310 in the reference-signal control unit 25 and a comparison operation in the voltage comparing unit 252. Therefore, actual comparison in the voltage comparing unit 252 is performed (completed) at timing when the count clock CKdac increases by $\beta$ clocks.

FIGS. 8B and 8C schematically show a state of the processing delay. A delay period Tdelay from an instruction for switching the reference signal Vslop based on a result of pre-stage comparison processing until comparison processing is completed is $\beta*Tdac \leq Tdelay < (\beta+1)*Tdac$ (in FIG. 8B, $\beta=1$; in FIG. 8C, $\beta=3$). Conceptually, it can be considered that a result of comparison by the voltage comparing unit 252 is obtained at timing when the count clock CKdac increases by $\beta$ clocks. Therefore, as shown in FIGS. 8B and 8C, it can be considered that, in practice, the voltage comparing unit 252 performs comparison at a reference signal Vslop_1(T+$\beta$) having a potential 1 LSB higher than the reference signal Vslop_2(T). The reference signal Vslop_1(T+$\beta$) is a reference signal Vslop_2(T)+1 LSB. Consequently, it can be considered that comparison in a voltage relation same as that in the first example of the first embodiment is performed.

As shown in FIGS. 8B and 8C, if "pixel signal voltage Vxα>reference signal Vslop_1(T+$\beta$), the comparison pulse COMP is maintained at the L level. However, if "pixel signal voltage Vxα<reference signal Vslop_1(T+$\beta$)", the comparison pulse COMP is switched to the H level. A comparison result (the comparison pulse COMP) at this point is notified to the counter unit 254. When "pixel signal voltage Vxα>reference signal Vslop_1(T+$\beta$), the counter unit 254 outputs "2T−1" as a final count value. On the other hand, when "pixel signal voltage Vxα<reference signal Vslop_1 (T+$\beta$)", the counter unit 254 outputs 2T as a final count value.

Even when there is a processing delay incidental to switching of the switch 310, a comparison operation in the voltage comparing unit 252, and the like, it is possible to gain switching time of the switch 310 in the reference-signal control unit 25 and an operation time margin in the voltage comparing unit 252 by applying processing using the reference signal Vslop_2 with the increased voltage level to the reference signal Vslop_1 taking into account the processing delay. Consequently, even when time equal to or longer than $\beta$ clocks and shorter than "$\beta+1$" clocks of the count clock CKdac is further necessary until comparison processing at the reference signal Vslop_1 is completed after comparison processing at the reference signal Vslop_2, it is possible to process the comparison without causing an error.

Third Example of First Embodiment

Figure 9:
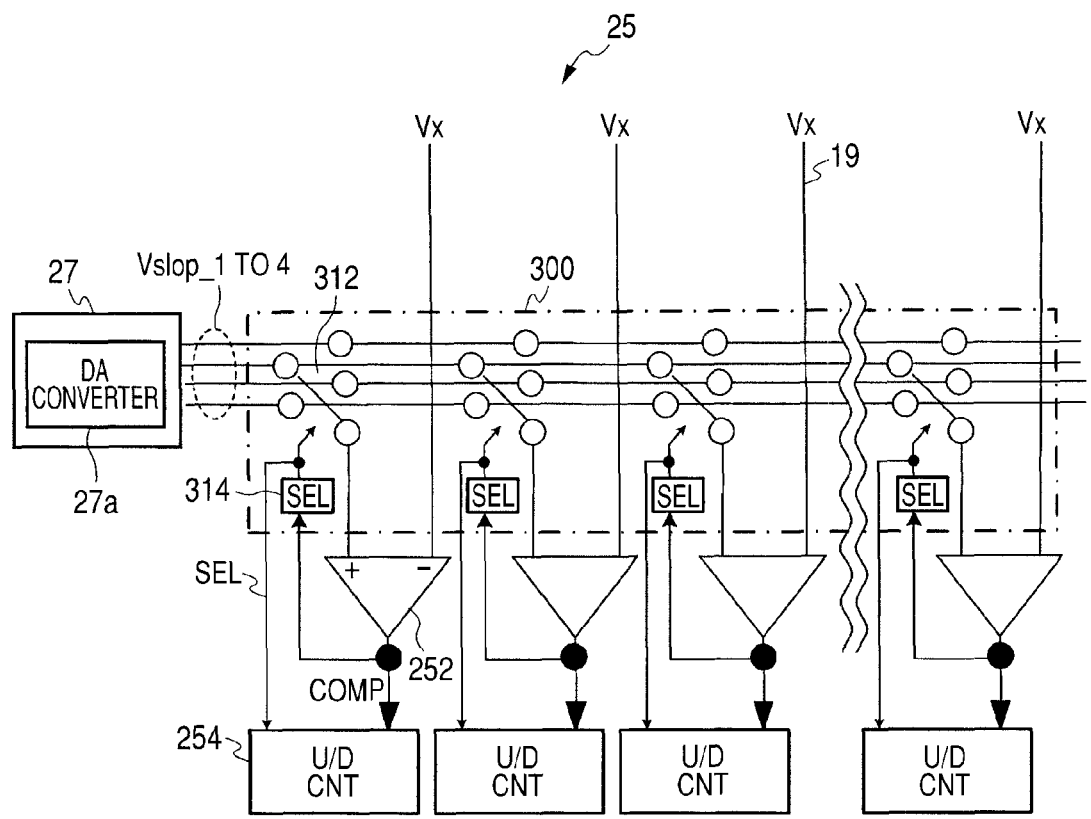
FIG. 9 is a circuit block diagram for explaining an example of the structure around a reference-signal control unit applied to AD conversion processing of a reference signal comparison type according to a third example of the first embodiment.
Figure 10:
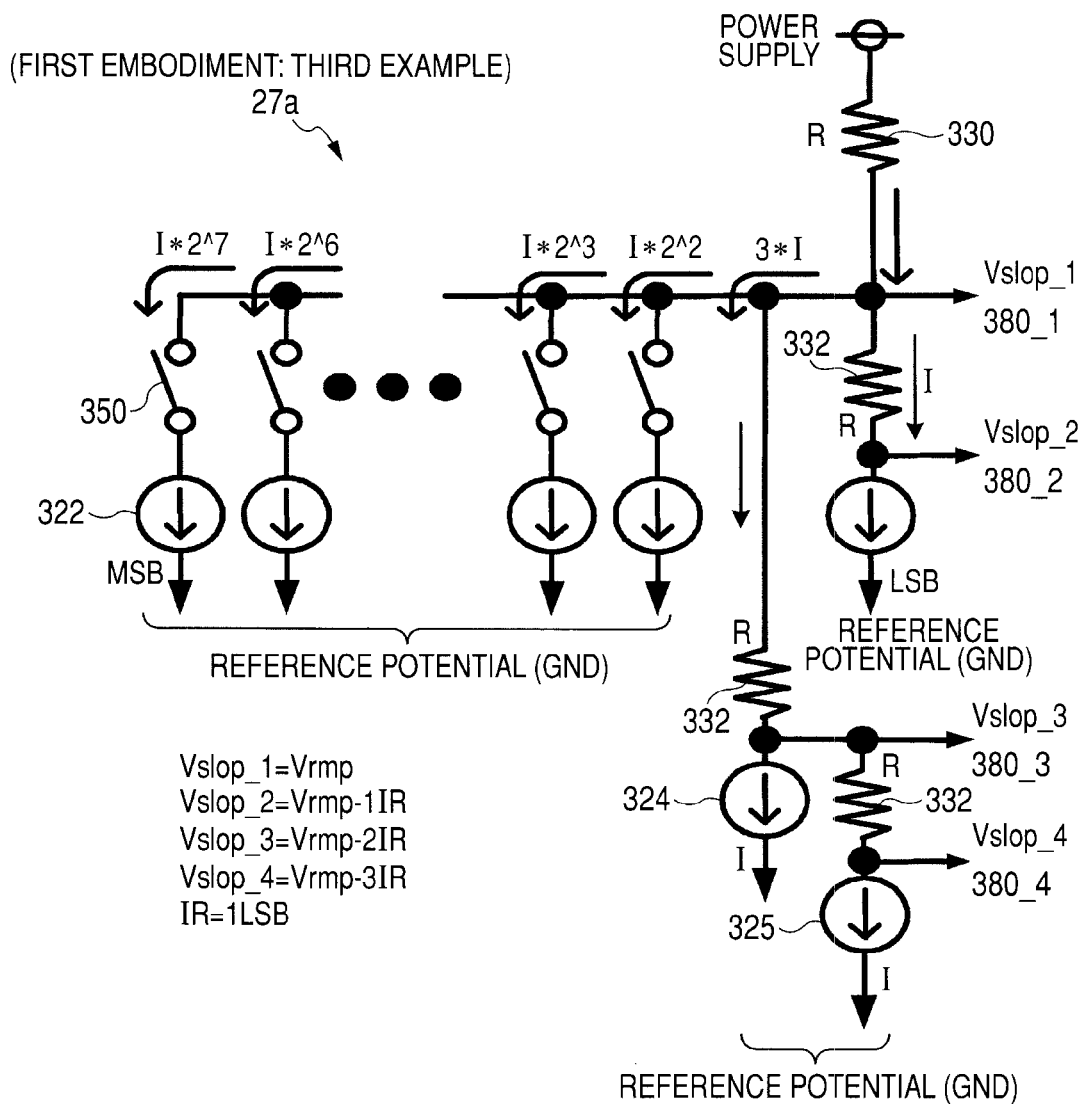
FIG. 10 is a functional block diagram for explaining details of a DA converter applied to the AD conversion processing of the reference signal comparison type according to the third example of the first embodiment.

FIG. 9 to FIGS. 11A and 11B are diagrams for explaining AD conversion processing of a reference signal comparison type according to a third example of the first embodiment. FIG. 9 is a circuit block diagram for explaining an example of the structure around the reference-signal control unit 25 applied to the AD conversion processing of the reference signal comparison type according to the third example of the first embodiment. FIG. 10 is a functional block diagram for explaining details of the DA converter 27a applied to the AD conversion processing of the reference signal comparison type according to the third example of the first embodiment.

Figure 11A:
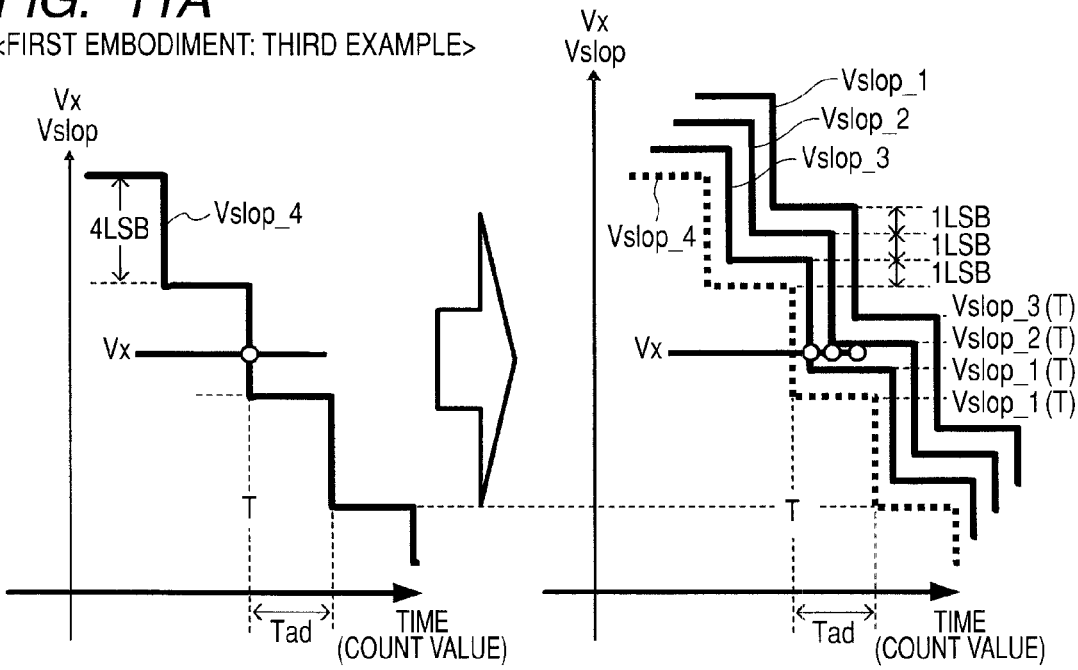
FIGS. 11A and 11B are diagrams for explaining an operation principle of the AD conversion processing of the reference signal comparison type according to the third example of the first embodiment and shows a relation between four kinds of reference signals and a pixel signal voltage.
Figure 11B:
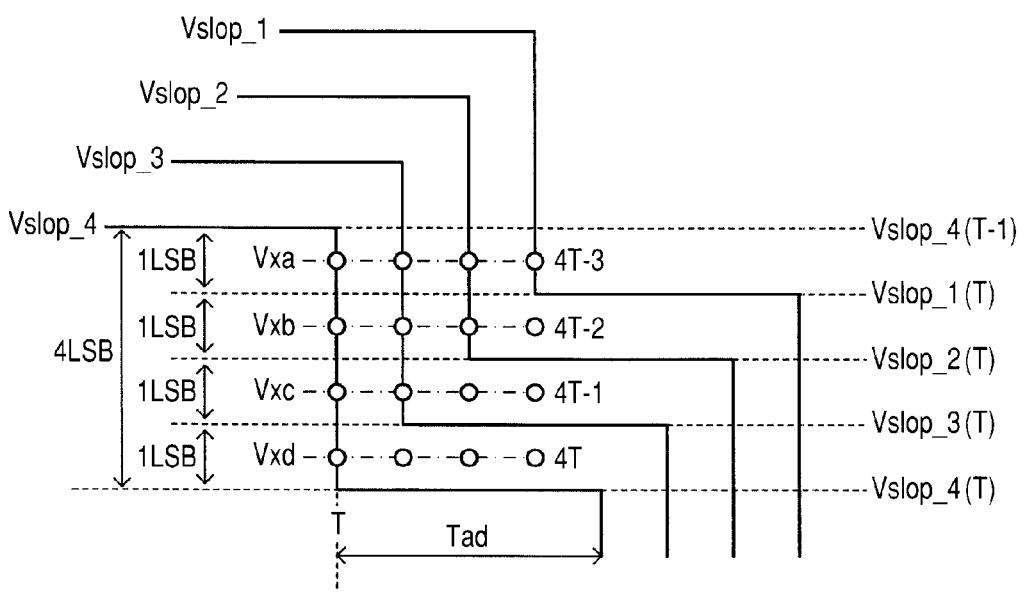

FIGS. 11A and 11B are diagrams for explaining an operation principle of the AD conversion processing of the reference signal comparison type according to the third example of the first embodiment and show a relation between four kinds of reference signals Vslop_1, Vslop_2, Vslop_3, and Vslop_4 and the pixel signal voltage Vx.

In the first example, time necessary for AD conversion is substantially halved compared with that in the comparative example by switching and processing the two kinds of reference signals Vslop_1 and Vslop_2, a voltage difference between which is 1 LSB. On the other hand, in the third example, time necessary for AD conversion is substantially quartered compared with that in the comparative example by using four kinds of reference signals Vslop_1, Vslop_2, Vslop_3, and Vslop_4, a voltage difference between adjacent ones of which is 1 LSB, first performing comparison processing at the reference signal Vslop_2 having a lowest voltage level and, after the pixel signal voltage Vx and the reference signal Vslop_2 coincide with each other, judging a magnitude relation between the pixel signal voltage Vx and the reference signals Vslop_1, Vslop_2, Vslop_3, and Vslop_4 in order while switching the reference signals Vslop_1, Vslop_2, Vslop_3, and Vslop_4.

As shown in FIG. 9, in the solid-state imaging device 1 to which the AD conversion processing of the reference signal comparison type according to the third example of the first embodiment is applied, the DA converter 27a can generate the four kinds of reference signals Vslop_1, Vslop_2, Vslop_3, and Vslop_4, a voltage difference between adjacent ones of which is 1 LSB (Vslop_1>Vslop_2>Vslp_3>Vslop_4).

The DA converter 27a prepares the four kinds of reference signals Vslop_1, Vslop_2, Vslop_3, and Vslop_4. Therefore, as shown in FIG. 9, there are four wires for the reference signal Vslop that connect the DA converter 27a and the reference-signal control unit 25 according to the third example. The reference-signal control unit 25 causes the reference-signal selecting unit 300 to switch the four kinds of reference signals Vslop_1, Vslop_2, Vslop_3, and Vslop_4 in order and supplies the reference signals to the voltage comparing units 252.

Specifically, the reference-signal selecting unit 300 according to the third example includes, for each of pixel rows, a switch 312 of a four-input and one-output type and a switching control unit (SEL) 314 that controls an operation for switching the switch 312. The comparison pulse COMP is supplied to the switching control unit 314 from the voltage comparing unit 252 in the column and the count clock CKdac is supplied to the switching control unit 314 from the communication and timing control unit 20 not shown in the figure. A control output SEL of the switching control unit 314 is supplied to the control input terminal of the switch 310 and the counter unit 254.

When pre-stage comparison processing in the voltage comparing unit 252 is started (the comparison pulse COMP is at the H level), the switching control unit 314 controls a switching operation of the switch 312 (an operation for selecting the reference signal Vslop) to select the reference signal Vslop_4 having a lowest voltage level among the four kinds of reference signals Vslop_1, Vslop_2, Vslop_3, and Vslop_4 and transfer the reference signal Vslop_4 to the voltage comparing unit 252. On the other hand, when the comparison pulse COMP is switched from the H level to the L level, the switching control unit 314 controls the switching operation of the switch 312 to selects the remaining three kinds of reference signals Vslop_3, Vslop_2, and Vslop_1 in order (order of the selection is arbitrary) within one clock (within Tdac) of the count clock CKdac and transfer the selected reference signal to the voltage comparing unit 252.

In post-stage comparison processing of the voltage comparing unit 252, the voltage comparing unit 252 compares the three kinds of reference signals Vslop_3, Vslop_2, and Vslop_1 supplied in order and the pixel signal voltage Vx of the column of the voltage comparing unit 252. The counter unit 254 stores a count value T at a point when the pre-stage comparison processing is finished (a point when the comparison pulse COMP is switched to the L level). The counter unit 254 decides pixel data corresponding to the pixel signal voltage Vx on the basis of the respective comparison pulses COMP at the time of the reference signals Vslop_3, Vslop_2, and Vslop_1 in the post-stage comparison processing in the voltage comparing unit 252 and the control output SEL from the switching control unit 314.

As shown in FIG. 10 in detail, in the DA converter 27a according to the third example of the first embodiment, the structure of a current cell for a second bit (I*2^2) in the DA converter 27a according to the first example is modified. Specifically, in the same manner as the sync current source 322 of the LSB, sync current sources 324 and 325, weighting of an electric current of which is I (=I*2^0) are prepared. An output of the sync current source 324 and an output of the sync current source 325 are connected to the resistive element 330 via a resistive element 334 and a resistive element 335, respectively. A connection point of the resistive element 334 and the sync current source 324 is an output node 380_3 for the reference signal Vslop_3. A connection point of the resistive element 335 and the sync current source 325 is an output node 380_4 for the reference signal Vslop_4. Resistance values of the resistive elements 330, 332, 334, and 335 are set to the same value R.

Consequently, in the output node 380_2, a voltage value (a voltage value for 1 LSB) corresponding to a product of the current value I of the sync current source 322 of the LSB and the resistance value R of the resistive element 332 is further reduced from the voltage value Vrmp of the reference signal Vslop_1. "Vrmp-1IR" is outputted from the output node 380_2 as the reference signal Vslop_2 as a DA conversion result. In the output node 380_3, a voltage value (a voltage value for 2 LSB) corresponding to a product of a combined current value 2*I of the sync current sources 324 and 325 and the resistance value R of the resistive element 334 is further reduced from the voltage value Vrmp of the reference signal Vslop_1. "Vrmp-2IR" is outputted from the output node 380_3 as the reference signal Vslop_3 as a DA conversion result.

In the output node 380_4, a voltage value (a voltage value for 1 LSB) corresponding to a product of the current value I of the sync current source 325 and the resistance value R of the resistive element 335 is further reduced from the voltage value "Vrmp-2IR" of the reference signal Vslop_3. "Vrmp-3IR" is outputted from the output node 380_4 as the reference signal Vslop_4 as a DA conversion result. Since IR is a voltage for 1 LSB, the reference signals Vslop_2, Vslop_3, and Vslop_4 are typically lower than the reference signal Vslop 1 by 1 LSB, 2 LSB, and 3 LSB.

In the structure according to the third example of the first embodiment shown in FIG. 10, since the resistance values of the resistive elements 330, 332, 334, and 335 are set to the same value R, the four kinds of reference signals Vslop_1, Vslop_2, Vslop_3, and Vslop_4, a potential difference between adjacent ones of which is R×I, are outputted. The respective reference signals Vslop_1, Vslop_2, Vslop_3, and Vslop_4 change at a step voltage of R×4*I. In other words, it can be said that, as shown in FIGS. 11A and 11B, adjacent ones of the four kinds of reference signals Vslop_1, Vslop_2, Vslop_3, and Vslop_4 have a potential difference of 1 LSB (Vslop_1>Vslop_2>Vslop_3>Vslop_4), and all the reference signals change at a step voltage of 4 LSB per count clock CKdac.

In a relation with conversion of the pixel signal voltage Vx into the pixel data D, the reference-signal selecting unit 300 first selects, as a reference signal for pre-stage comparison processing, the reference signal Vslop_4, which coincides with the pixel signal voltage Vx first in the comparison of respective values at an identical count value and the pixel signal voltage Vx, among the four kinds of reference signals. When the comparison pulse COMP is inverted (to be the L level) in post-stage comparison processing of the reference signal Vslop_4 and the pixel signal voltage Vx, the reference-signal selecting unit 300 switches the reference signal Vslop_4 to the remaining reference signals Vslop_3, Vslop_2, and Vslop_1.

M kinds of reference signals Vslop, a level difference between adjacent ones of which is resolution (1 LSB) of a least significant bit of digital data, and that change at step (4 LSB) M=four times as large as the level (1 LSB) of the resolution of the least significant bit and the pixel signal voltage Vx are compared to specify pixel data D of the pixel signal voltage Vx. In terms of a relation with the pixel data D as a result of AD conversion of the pixel signal voltage Vx, pixel data at the time when the comparison pulse COMP is inverted at a point of timing T of the count clock CK0 is specified. Therefore, in a relation with timing "T−1" immediately before the timing T, all differences "Vslop_@(T)-Vslop_@(T−1)" are 4 LSB. It is natural that respective reference signals Vslop_@ are changed at a rate of change four times as large as 1 LSB (4 LSB).

On the other hand, it is conceivable to specify the pixel data D on the basis of respective comparison results of the respective reference signals Vslop_@ and the pixel signal voltage Vx. In this case, it is possible to improve resolution to be higher than 4 LSB (in this example, improved to 1 LSB) by using the level differences of the respective reference signals Vslop_@ (in this example, 1 LSB).

In the case of this example, it is taken into account that there is a relation of Vslop_1>Vslop_2>Vslop_3>Vslop_4, the comparison pulse COMP is inverted when the reference signals Vslop_@(T) fall below the pixel signal voltage Vx, and a count value at that point is stored. In other words, the fact that the comparison pulse COMP is inverted at Vslop_@ (T) with respect to the pixel signal voltage Vx means Vslop_@(T−1)≧pixel signal voltage Vx>Vslop_@(T). A difference between Vslop_@(T) and Vslop_@(T−1) is 4 LSB. When it is taken into account that Vslop_1(T)>Vslop_2 (T)>Vslop_3(T)>Vslop_4(T) and a difference between adjacent signals is 1 LSB, Vslop_4 (T−1)≧pixel signal voltage Vx>(or ≧) Vslop_1(T) (a difference between Vslop_4 (T−1) and Vslop_1(T) is 1 LSB), Vslop_1(T)≧(or >) pixel signal voltage Vx>Vslop_2(T) (a difference between Vslop_1(T) and Vslop_2(T) is 1 LSB), Vslop_2(T)≧(or >) pixel signal voltage Vx>Vslop_3(T) (a difference between Vslop_2(T) and Vslop_3(T) is 1 LSB), or Vslop_3(T)≧(or >) pixel signal voltage Vx>Vslop_4 (a difference between Vslop_3(T) and Vslop_4(T) is 1 LSB).

Consequently, it is possible to decide the pixel data D of the pixel signal voltage Vx at resolution of 1 LSB by referring to, while changing the four kinds of reference signals Vslop_@, a voltage difference between adjacent ones of which is, 1 LSB at a rate of change of 4 LSB and stepwise, a result of comparison of the respective four kinds of reference signals Vslop_@ and the pixel signal voltage Vx. A procedure of this processing is specifically explained below.

Processing Procedure According to the Third Example of the First Embodiment

A method of deciding the pixel data D in the counter unit 254 after comparison processing by the voltage comparing unit 252 is explained with reference to FIGS. 11A and 11B. As in the first example of the first embodiment, basically, it is assumed that time necessary for switching of the switch 310 in the reference-signal control unit 25 and a comparison operation in the voltage comparing unit 252 is sufficiently short and is also sufficiently short compared with time in which a potential of the reference signal Vslop changes 4 LSB (equivalent to time for one clock of the count clock CK0 (in this example, CKdac).

Before starting comparison processing, the voltage comparing unit 252 sets the comparison pulse COMP to the H level. Therefore, in the reference-signal control unit 25, the switch 310 in each of the pixel rows selects the reference signal Vslop_4 having a lowest voltage level among the four kinds of reference signals Vslop_1, Vslop_2, Vslop_3, and Vslop_4 outputted from the DA converter 27a and supplies the reference signal Vslop_4 to the voltage comparing unit 252. The voltage comparing unit 252 in each of the pixel rows compares, in the beginning of the comparison processing, the reference signal Vslop_4 and the pixel signal voltage Vx supplied from the vertical signal line 19 of the pixel row corresponding thereto. At a point when the pixel signal voltage Vxα and the reference signal Vslop_4 coincide with each other, the voltage comparing unit 252 switches the comparison pulse COMP from the H level to the L level.

In the reference-signal control unit 25, the switch 310 in each of the pixel rows switches, when the comparison pulse COMP from the voltage comparing unit 252 in the column is switched to the L level, the reference signal Vslop_4 to, for example, the reference signals Vslop_3, Vslop_2, and Vslop_1 in this order as shown in FIG. 11A. In response, the voltage comparing unit 252 immediately compares the pixel signal voltage Vx with the respective reference signals Vslop_3, Vslop_2, and Vslop_1 in order again. The counter unit 254 stores a count value T at this point.

As shown in FIG. 11B, when "pixel signal voltage Vxα>reference signal Vslop_@(T)" (@ is 3 to 1) during comparison at the respective reference signals Vslop_3, Vslop_2, and Vslop_1, the comparison pulse COMP is at the L level. However, when "pixel signal voltage Vxα<reference signal Vslop_@(T)", the comparison pulse COMP is at the H level. Comparison results (the comparison pulse COMP) at this point are notified to the counter unit 254. The counter unit 254 decides the pixel data D as described below on the basis of the respective comparison results. The counter unit 254 stores the count value T at a point when comparison processing by the voltage comparing unit 252 at the reference signal Vslop_4 selected by the reference-signal selecting unit 300 among the four kinds of reference signals Vslop is completed. The counter unit 254 decides digital data of the pixel signal voltage Vx by correcting the stored count value T on the basis of a result of comparison by the voltage comparing unit 252 at the pixel signal voltage Vx corresponding to selection of the remaining three kinds of reference signal Vslop_3, Vslop_2, and Vslop_1 by the reference-signal selecting unit 300.

For example, when "pixel signal voltage Vxα>reference signal Vslop_1(T)", the counter unit 254 outputs "4T−3" as a final count value. This is because, during AD conversion processing in a 4 LSB step, a pixel signal voltage Vxa is higher than a voltage value equivalent to "4T−3" of the reference signal Vslop_4(T) but the pixel signal voltage Vxa has not reached a 4T level (a range of "4T−1" to "4T": the same applies in the following explanation) and is in a range of "4T−4" to "4T−3".

When reference signal Vslop_2(T)<pixel signal voltage Vxα<reference signal Vslop_1(T), the counter unit 254 outputs "4T−2" as a final count value. This is because a pixel signal voltage Vxb has not reached the 4T level and is in a range of "4T−3" to "4T−2". When reference signal Vslop_3 (T)<pixel signal voltage Vxα≦reference signal Vslop_2(T), the counter unit 254 outputs "4T−1" as a final count value. This is because a pixel signal voltage Vxc has not reached the 4T level and is in a range of "4T−2" to "4T−1". When reference signal Vslop_4(T)<pixel signal voltage Vxα≦reference signal Vslop_3(T), the counter unit 254 outputs "4T" as a final count value. This is because a pixel signal voltage Vxd has reached the 4T level.

Consequently, compared with the case of the AD conversion processing of the reference signal comparison type performed by using the DA converter 27a according to the comparative example, AD conversion processing in 1 LSB units is realized while the reference signal Vslop is controlled by 4 LSB every time the AD conversion processing is performed. There is an advantage that, even if frequencies of the count clock CK0 and the count clock CKdac are not increased, time necessary for AD conversion is substantially reduced to a quarter. Since the time necessary for AD conversion can be quartered, it is possible to quadruple speed of AD conversion processing while maintaining bit resolution and controlling an increase in power consumption in the counter unit 254.

In the basic example described above, it is assumed that time necessary for switching of the switch 310 in the reference-signal control unit 25 and a comparison operation in the voltage comparing unit 252 is sufficiently short and is also sufficiently short compared with time in which a potential of the reference signal Vslop changes 4 LSB. However, actually, time is not short in some case.

To solve this problem, as in the second example as a modification of the first example, since a processing delay occurs every time the reference signal Vslop is switched to perform comparison processing, it is sufficient to increase, according to the processing delay clock width β, a level difference between adjacent ones of the reference signals Vslop_4, Vslop_3, Vslop_2, and Vslop_1 to "1+2β" LSB rather than 1 LSB and perform an AD conversion operation in synchronization with a count operation in the counter unit 254. When the reference signal Vslop_4 is set as a reference, the reference signal Vslop_3 is set "1+2β" LSB higher, the reference signal Vslop_2 is set 2*(1+2β) LSB higher, and the reference signal Vslop_1 is set 3*(1+2β) LSB higher.

In order to increase a potential of the reference signal Vslop_1 by "k*(1+2β)" LSB, a circuit configuration corresponding to the increase only has to be adopted. For example, a resistance value of the resistive element 332 only has to be set "1+2β" times as large as a resistance value of the resistive element 330.

In the reference-signal selecting unit 300, when the comparison pulse COMP is inverted in comparison of the reference signal Vslop_4 as a pre-stage reference signal and the pixel signal voltage Vx (i.e., when the comparison pulse COMP becomes the L level), the reference signal Vslop_4 is switched to any one of the remaining reference signals. Thereafter, the remaining reference signals are switched in order with a timing difference of a count step of the counter unit 254. Consequently, it is possible to align a period from every switching of a reference signal to comparison processing to an AD unit Tad. It is also possible to set values at respective timing points of the reference signals Vslop, a level of each of which is different by "1+2β" LSB, practically the same as the reference signal Vslop(T) and compare the values.

Fourth Example of First Embodiment

Generalization

FIG. 12 is a diagram for explaining AD conversion processing of a reference signal comparison type according to a fourth example of the first embodiment and shows M kinds of reference signals Vslop.

Plural kinds of reference signals Vslop, a voltage difference between adjacent one of which is 1 LSB, are used. In the first example, an AD conversion period is reduced to a half by changing the reference signals Vslop in a 2 LSB step. In the third example, an AD conversion period is reduced to a quarter by changing the reference signals Vslop in a 4 LSB step. By developing the forms of these examples, eventually, as a processing form of the first embodiment, an AD conversion period can be reduced to ½^n by using plural kinds of reference signals Vslop, a voltage difference between adjacent ones of which is 1 LSB, and that change stepwise, and setting a minimum step width of the reference signals Vslop based on the count clock CKdac to 2^n LSB (n is a positive integer) such that the reference signals Vslop also change stepwise in the input section of the voltage comparing unit 252. For that purpose, first, 2^n kinds of reference signals Vslop, a voltage difference between adjacent ones of which is 1 LSB, and that change in a 2 n LSB step, are generated in the DA converter 27a.

The "2^n" kinds of reference signals Vslop are generated because, due to consistency with weighting of bits of digital data, it is easy to set a minimum step width and a circuit configuration is compact. The voltage difference of 1 LSB is given to each adjacent ones of the reference signals Vslop in order to set resolution of AD conversion to 1 LSB as in the past. In principle, when the fall in resolution is allowed, the resolution may be set to m LSB. However, since this deviates from the essence of the present invention, the setting of resolution to m LSB is not adopted in this embodiment. This is because, whereas an increase in speed of AD conversion is merely realized by the fall in resolution, in this embodiment, an increase in speed of AD conversion is realized without causing the fall in resolution.

The generation of the "2^n" kinds of reference signals Vslop is not indispensable. It is possible to reduce an AD conversion period to 1/k by, as shown in FIG. 12, generating k kinds of reference signals Vslop, a voltage difference between adjacent ones of which is 1 LSB, in the DA converter 27a and setting a minimum step width of the respective reference signals Vslop to k LSB (k is a positive integer).

With k=2^n, when a changing direction of the reference signals Vslop is set in a direction in which a voltage level gradually falls as in the first to third examples, it is advisable to first compare a reference signal Vslop_min having a lowest voltage level among the 2^n kinds of reference signals Vslop outputted from the DA converter 27a and the pixel signal voltage Vx and, at a point when both the voltages coincide with each other, and compare the reference signals Vslop with the pixel signal voltage Vx in order while switching the reference signal Vslop_min to the remaining reference signals Vslop having voltage levels higher than that of the reference signal Vslop_min by 1 LSB to (2^n−1) LSB. The counter unit 254 only has to store a count value T at this point and specify pixel data on the basis of a result of comparison of the respective reference signals Vslop and the pixel signal voltage Vx.

However, when the level difference between adjacent ones of the k kinds of reference signals is 1 LSB, it is necessary to complete comparison of all the k kinds of reference signals Vslop and the pixel signal voltage Vx within an AD unit Tad. Therefore, a processing delay is more often a problem as the number of reference signals Vslop is increased. When the processing delay is a problem, as in the second example, it is sufficient to increase (decrease) the level difference between adjacent ones of the k kinds of reference signals to "1+2β" LSB rather than 1 LSB according to the processing delay clock number β and perform an AD conversion operation in synchronization with a count operation in the counter unit 254. During comparison processing for the respective reference signals Vslop, the respective reference signals Vslop are switched with a timing difference of a count step of the counter unit 254.

First Example of Second Embodiment

Figure 13:
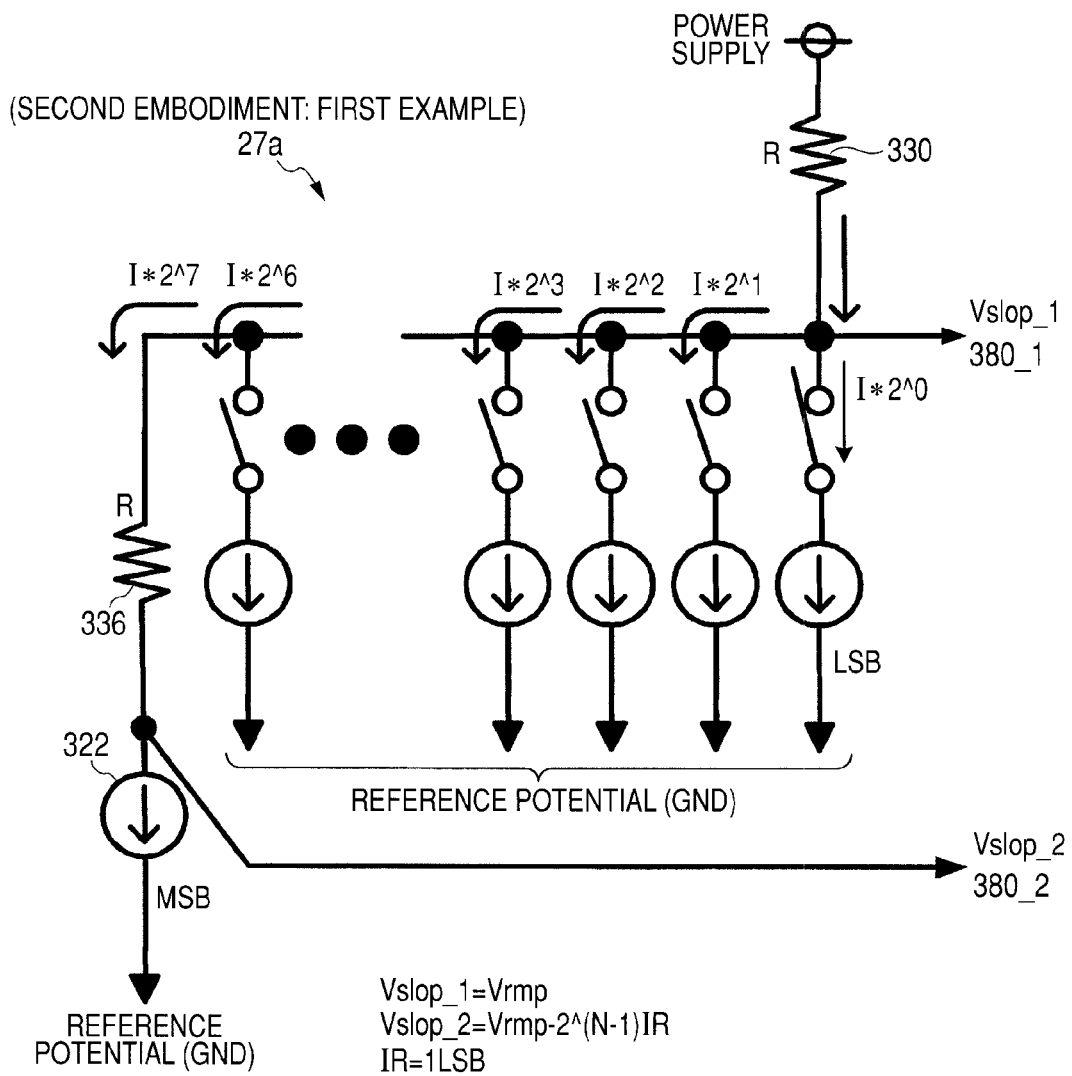
FIG. 13 is a functional block diagram for explaining details of a DA converter applied to AD conversion processing of a reference signal comparison type according to a first example of a second embodiment of the present invention.
Figure 14:
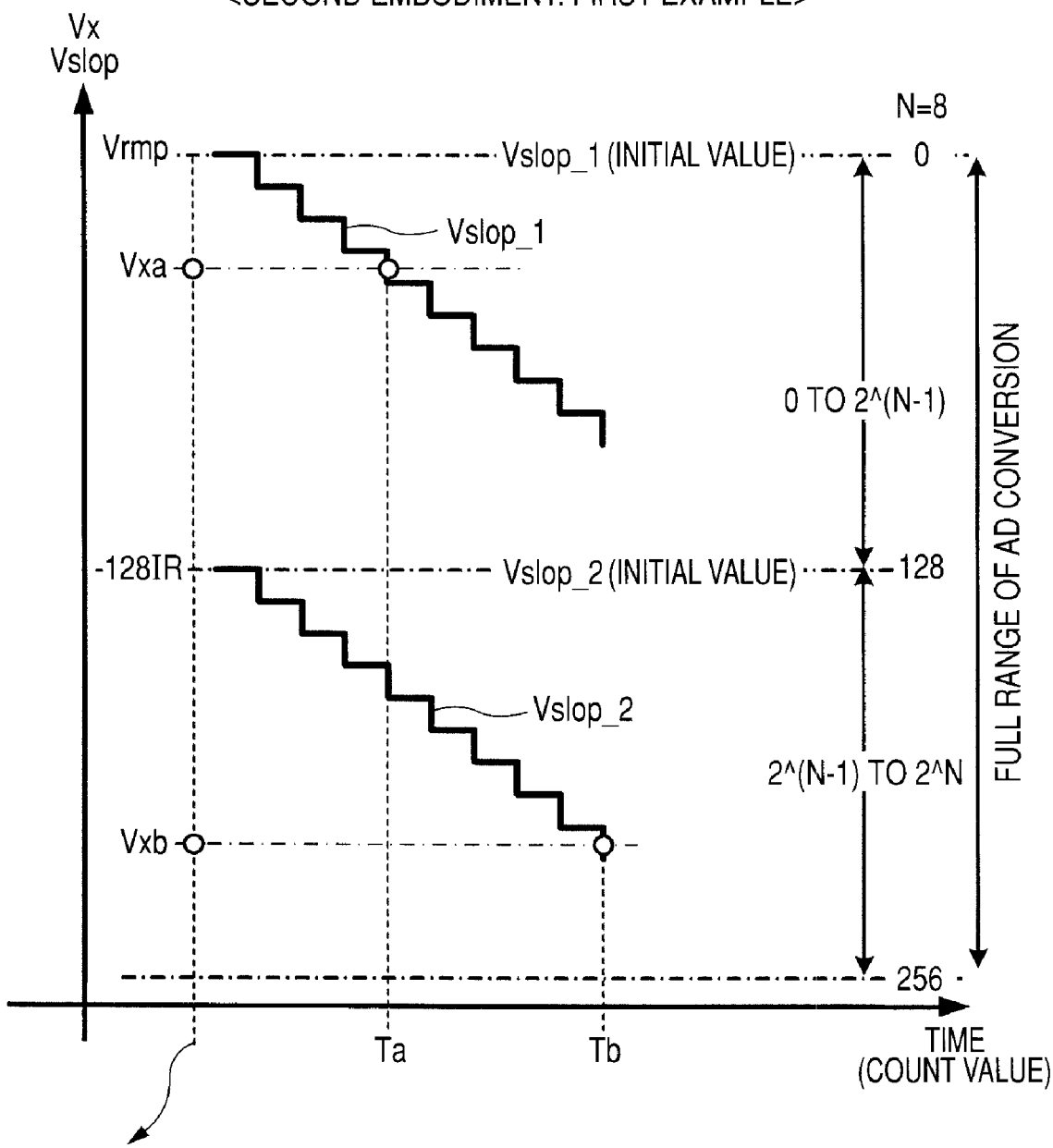
FIG. 14 is a diagram for explaining an operation principle of the AD conversion processing of the reference signal comparison type according to the first example of the second embodiment and shows a relation between two kinds of reference signals and a pixel signal voltage.

FIGS. 13 and 14 are diagrams for explaining AD conversion processing of a reference signal comparison type according to a first example of a second embodiment according to the present invention. FIG. 13 is a functional block diagram for explaining details of the DA converter 27a applied to the AD conversion processing of the reference signal comparison type according to the second embodiment (the first embodiment). FIG. 14 is a diagram for explaining an operation principle of the AD conversion processing of the reference signal comparison type according to the first example of the second embodiment and shows a relation between two kinds of reference signals Vslop_1 and Vslop_2 and the pixel signal voltage Vx.

In the respective examples of the first embodiment, time necessary for AD conversion is substantially reduced to $\frac{1}{2}^n$ compared with the comparative example by switching the $2^n$ kinds of reference signals Vslop, a voltage difference between adjacent ones of which is 1 LSB, in order and comparing the reference signals Vslop with the pixel signal voltage Vx. On the other hand, reference signals used in the first example of the second embodiment are a first reference signal Vslop_1 having a minimum step voltage of 1 LSB that covers a voltage level from a starting point side (a maximum value in comparison with the first embodiment) in a full range of the reference signals Vslop to at least ½ with respect to the full range (referred to as half range or ½ range) and a second reference signal Vslop_2 having a minimum step voltage of 1 LSB that covers at least from a voltage level of the half range to a voltage level of the full range. In other words, time necessary for AD conversion is substantially reduced to ½ compared with the comparative example by using the two kinds of reference signals Vslop_1 and Vslop_2 shifted by the half range.

Since comparison processing for a voltage level in a former half of the full range is performed with the reference signal Vslop_1 and comparison processing for a voltage level in a latter half of the full range is performed with the reference signal Vslop_2, an effect of a reduction in AD conversion processing time is the same as that in the first example of the first embodiment. The first example of the second embodiment is characterized in that the problem of time necessary for switching of the switch 310 in the reference-signal comparing unit 25 and a comparison operation in the voltage comparing unit 252 is solved by first specifying in which of the voltage level side in the former half and the latter half of the full range the pixel signal voltage Vx is present and, then, using the reference signal corresponding to the voltage level of the pixel signal voltage Vx in the reference signals Vslop_1 and Vslop_2.

As the structure of the DA converter 27a according to the first example of the second embodiment that generates the two kinds of reference signals Vslop_1 and Vslop_2, the structure of the current cell on the LSB side is changed in the DA converter 27a according to the comparative example shown in FIG. 5B. Specifically, as shown in FIG. 13, the output switch 350 is not provided for a most significant bit MSB (weighting of an electric current of the sync current source 324 is not changed). Instead, a resistive element 336 is provided between the output node 380_1 for the reference signal Vslop_1 and the output node 380_2 for the reference signal Vslop_2. An output of the sync current source 322 is connected to the resistive element 330 via the resistive element 336. A resistance value of the resistive element 336 and a resistance value of the resistive element 332 are set to the same value R.

Consequently, in the output node 380_2 for the reference signal Vslop_2, a voltage value (weighting of the most significant bit MSB with respect to the full range=½ range) corresponding to a product of the current value $2^{(N-1)}*I$ (N is a bit width of pixel data) of the sync current source 322 of the MSB and a resistance value of the resistive element 336 is further reduced from the voltage value Vrmp of the reference signal Vslop_1. The voltage value is outputted from the output node 380_2 as the reference signal Vslop_2 as a DA conversion result. The reference signal Vslop_2 is typically lower than the reference signal Vslop_1 by $2^{(N-1)}$ LSB (i.e., ½ range). In FIG. 13, an example corresponding to 8 bits (N=8) is shown. Since the full range is 256, the reference signal Vslop_2 is "Vrmp-128IR".

It is taken into account that, in the DA converter 27a according to the comparative example shown in FIG. 5B, R×I is equivalent to 1 LSB (a quantization unit of AD conversion). Then, in other words, in the first example of the second embodiment shown in FIG. 13, it can be said that, as shown in FIG. 14, potentials of the two kinds of reference signals Vslop_1 and Vslop_2 are different by $2^{(N-1)}$ LSB (½ of the full range) (Vslop_1>Vslop_2) and both the reference signals Vslop_1 and Vslop_2 change at a step voltage of 1 LSB per count clock CKdac.

The DA converter 27a prepares the two kinds of reference signals Vslop_1 and Vslop_2. Therefore, although not shown in the figure, there are two wires for the reference signals Vslop that connect the DA converter 27a and the reference-signal control unit 25 according to the first example of the first embodiment shown in FIG. 5A. The reference-signal control unit 25 is a two-input and one-output type that causes the switch 310 to switch the two kinds of reference signals Vslop_1 and Vslop_2 in order and supplies the reference signals to the voltage comparing units 252. In this regard, the first example of the second embodiment is the same as the first example of the first embodiment in which the two kinds of reference signals Vslop_1 and Vslop_2 are prepared.

Processing Procedure According to the First Example of the Second Embodiment

A basic example of an AD conversion processing procedure of the reference signal type according to the first example of the second embodiment is explained with reference to FIG. 14. As an example, a full range of AD conversion is 8 bits. In the case of the second embodiment (including not only the first example but also other examples), the reference signals Vslop_1 and Vslop_2 do not have to be stepwise even in the input section of the voltage comparing unit 252.

In the first example of the second embodiment, in the beginning of comparison processing, the voltage comparing unit 252 checks in which of a range of voltages equal to or larger than 0 IR and equal to or smaller than 128 IR and a range of voltages larger than 128 IR and equal to or smaller than 256 IR the pixel signal voltage Vx belongs, i.e., to which of an area of 0 LSB to 128 LSB and an area of 128 LSB to 256 LSB in the full range of AD conversion the pixel signal voltage Vx belongs. Thereafter, the voltage comparing unit 252 compares the reference signal Vslop (one of the reference signals Vslop_1 and Vslop_2) having a half range width, which changes (decreases) in a 1 LSB step, and the pixel signal voltage Vx and decides pixel data of the pixel signal voltage Vx to perform AD conversion for the pixel signal voltage Vx. Therefore, compared with the comparative example, it is possible to substantially reduce AD conversion time to a half.

First, before starting comparison processing, the voltage comparing unit 252 sets the comparison pulse COMP to the H level. Therefore, in the reference-signal control unit 25, the switch 310 in each of the pixel rows selects the reference signal Vslop_2 in the two kinds of reference signals Vslop_1 and Vslop_2 outputted from the DA converter 27a and transfers the reference signal Vslop_2 to the voltage comparing unit 252. At this point, an initial output value of the reference signal Vslop_1 (a value in a boundary with other ranges) is Vrmp (=0*IR), an initial output value of the reference signal Vslop_2 is Vrmp−($2^{(N-1)}$)IR, and a count value is "0". For example, in the case of 8 bits (N=8), the initial output value of the reference signal Vslop_1 is Vrmp (0IR) and the initial output value of the reference signal Vslop_2 is Vrmp-128IR.

The voltage comparing unit 252 in each of the pixel rows compares an initial value as a boundary of the reference signal Vslop_2 for a voltage level in the latter half (an area of 128 LSB to 256 LSB in the full range) with the other reference signal Vslop_1 (i.e., a ½ level of the full range) and the pixel signal voltage Vx. The voltage comparing unit 252 compares, in the beginning of comparison processing, the reference signal Vslop_2 (the initial value) and the pixel signal voltage Vx supplied from the vertical signal line 19 of the column corresponding thereto. Concerning columns in which the pixel signal voltage Vx is equal to or larger than the reference signal Vslop_2 (the initial value) (i.e., columns in which reference signal Vslop_2 (the initial value)≦pixel signal voltage Vx), the voltage comparing unit 252 set the comparison pulse COMP to the L level. On the other hand, concerning columns in which the pixel signal voltage Vx is smaller than the reference signal Vslop_2 (the initial value) (i.e., columns in which reference signal Vslop_2 (the initial value)>pixel signal voltage Vx), the voltage comparing unit 252 sets the comparison pulse COMP to the H level (maintains the H level).

In response, concerning columns in which the pixel signal voltage Vx (an analog value) is equal to or larger than the reference signal Vslop_2 (the initial value) (i.e., columns in which reference signal Vslop_2 (the initial value)≦pixel signal voltage Vx), the switch 310 selects the reference signal Vslop_1 and transfers the reference signal Vslop_1 to the voltage comparing unit 252. The voltage comparing unit 252 immediately switches the comparison pulse COMP from the L level to the H level. This is because reference signal Vslop_1 (the initial value)>pixel signal voltage Vx.

Thereafter, in each of the pixel rows, the voltage comparing unit 252 compares the reference signal Vslop_1 or the reference signal Vslop_2, which changes in a 1 LSB step, and the pixel signal voltage Vx. At a point when the pixel signal voltage Vx and the reference signal Vslop_1 or the reference signal Vslop_2 coincide with each other, the voltage comparing unit 252 switches the comparison pulse COMP from the H level to the L level. Information on the change in the comparison pulse COMP is transmitted to the counter unit 254. The counter unit 254 stores a count value T at this point with this change as a trigger. In other words, the counter unit 254 stores a count value T at timing when a magnitude relation between the pixel signal voltage Vx and the reference signal Vslop set as the comparison object is inverted.

For example, as shown in FIG. 14, when the pixel signal voltage Vx is a pixel signal voltage Vxa in the area of 0 LSB to 128 LSB, the reference signal Vslop_1 is used. The counter unit 254 in the pixel row that uses the reference signal Vslop_1 directly outputs a count value Ta stored as a final count value. On the other hand, when the pixel signal voltage Vx is a pixel signal voltage Vxb in the area of 128 LSB to 256 LSB, the reference signal Vslop_2 is used. The counter unit 254 in the pixel row that uses the reference signal Vslop_2 outputs "Tb+ΔT" as a final count value. ΔT is a count value equivalent to a half of N bits (=$2^{(N-1)}$ LSB=128 LSB). The reference signal Vslop_2 is used when the pixel signal voltage Vx is the latter half of the full range and is used because, in practice, there is an increase of a count value equivalent to the half of N bits (=$2^{(N-1)}$ LSB) with respect to the reference signal Vslop_1.

In the case of this example, during first comparison, "1" may be substituted in a most significant bit in a count value of a pixel row in which reference signal Vslop_2 (the initial value)>pixel signal voltage Vx. This makes it possible to add ΔT to a final count value in advance as described above.

Consequently, AD conversion processing in 1 LSB units is realized while the reference signals Vslop are controlled 1 LSB at a time. It is decided in advance whether the pixel signal voltage Vx exceeds ½ of the full range, i.e., to which of areas obtained by equally dividing the full range into two the pixel signal voltage Vx belongs. Pixel signal voltages belonging to areas in the two kinds of reference signals Vslop_1 and Vslop_2 shown in FIG. 14 and the pixel signal voltage Vx are compared. Therefore, there is an advantage that, even if frequencies of the count clock CK0 and the count clock CKdac are not increased, time necessary for AD conversion is substantially halved. Since the time necessary for AD conversion can be halved, it is possible to double speed of AD conversion processing while maintaining bit resolution and controlling an increase in power consumption in the counter unit 254. This is because, whereas it is necessary to change the reference signals Vslop in the full range in the comparative example, in the first example of the second embodiment, the reference signals Vslop only have to be moved by the half range.

In addition, it is decided in advance whether the pixel signal voltage Vx exceeds a half of the full range. Thereafter, pixel data can be specified by performing, only once, comparison processing for comparing the reference signal Vslop_1 or the reference signal Vslop_2 that changes in a 1 LSB step and the pixel signal voltage Vx to specify pixel data. Therefore, it is possible to solve the problem of time necessary for switching of the switch 310 in the reference-signal control unit 25 and a comparison operation in the voltage comparing unit 252 that occurs in the first example of the first embodiment.

Second Example of Second Embodiment

Figure 15:
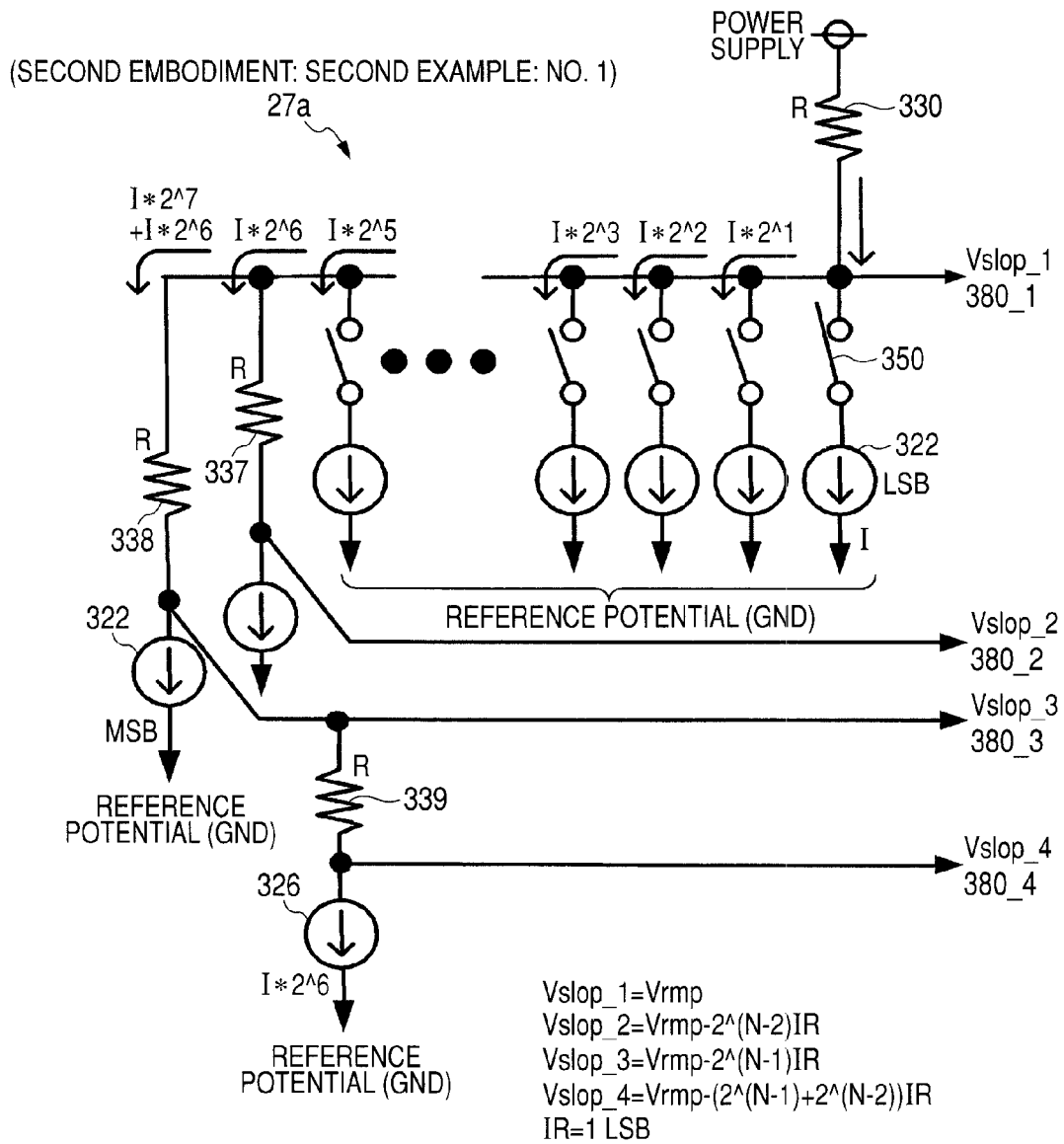
FIG. 15 is a functional block diagram for explaining details (No. 1) of a DA converter applied to AD conversion processing of a reference signal comparison type according to a second example of the second embodiment.
Figure 16:
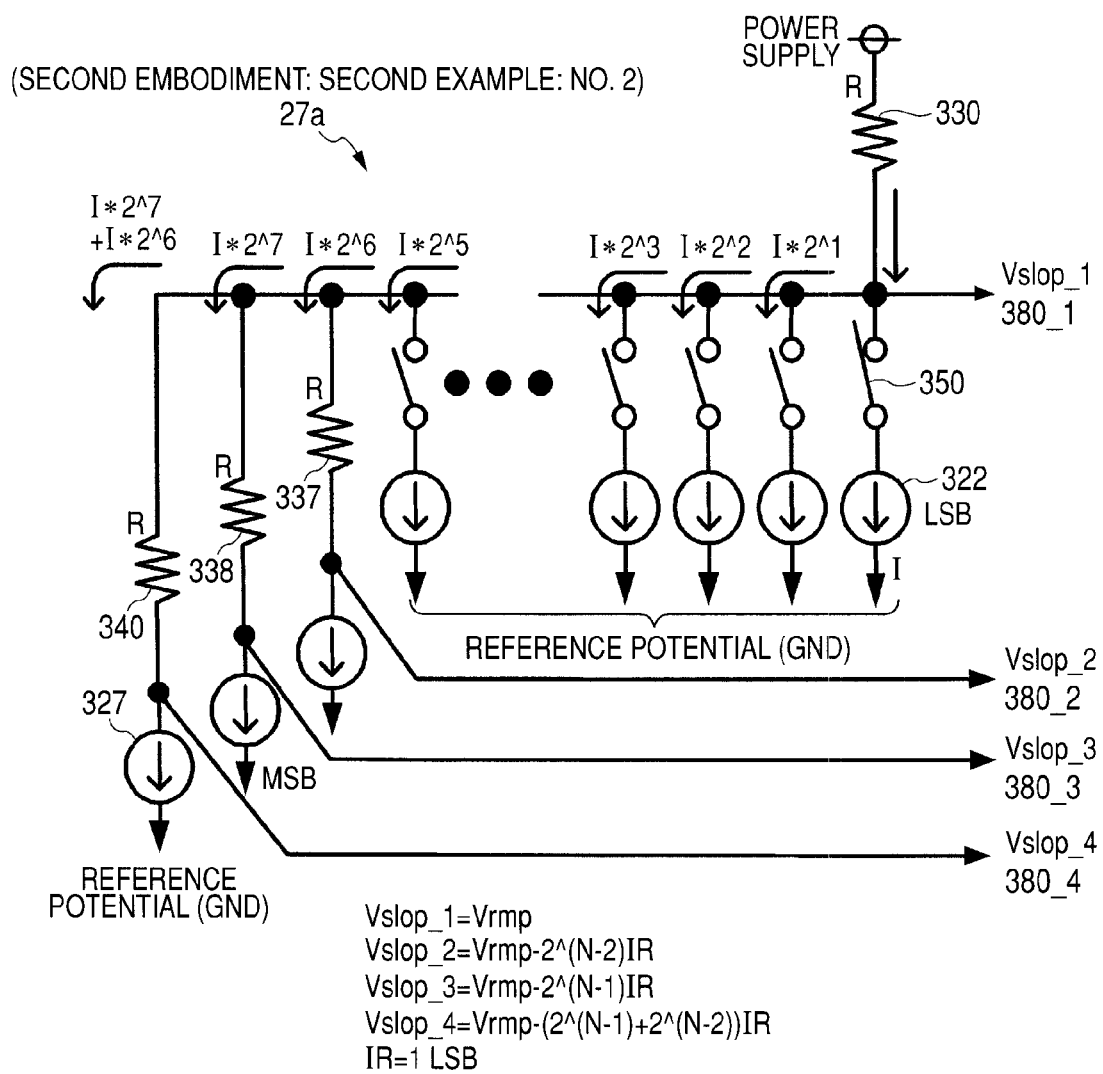
FIG. 16 is a functional block diagram for explaining details (No. 2) of the DA converter applied to the AD conversion processing of the reference signal comparison type according to the second example of the second embodiment.
Figure 17:
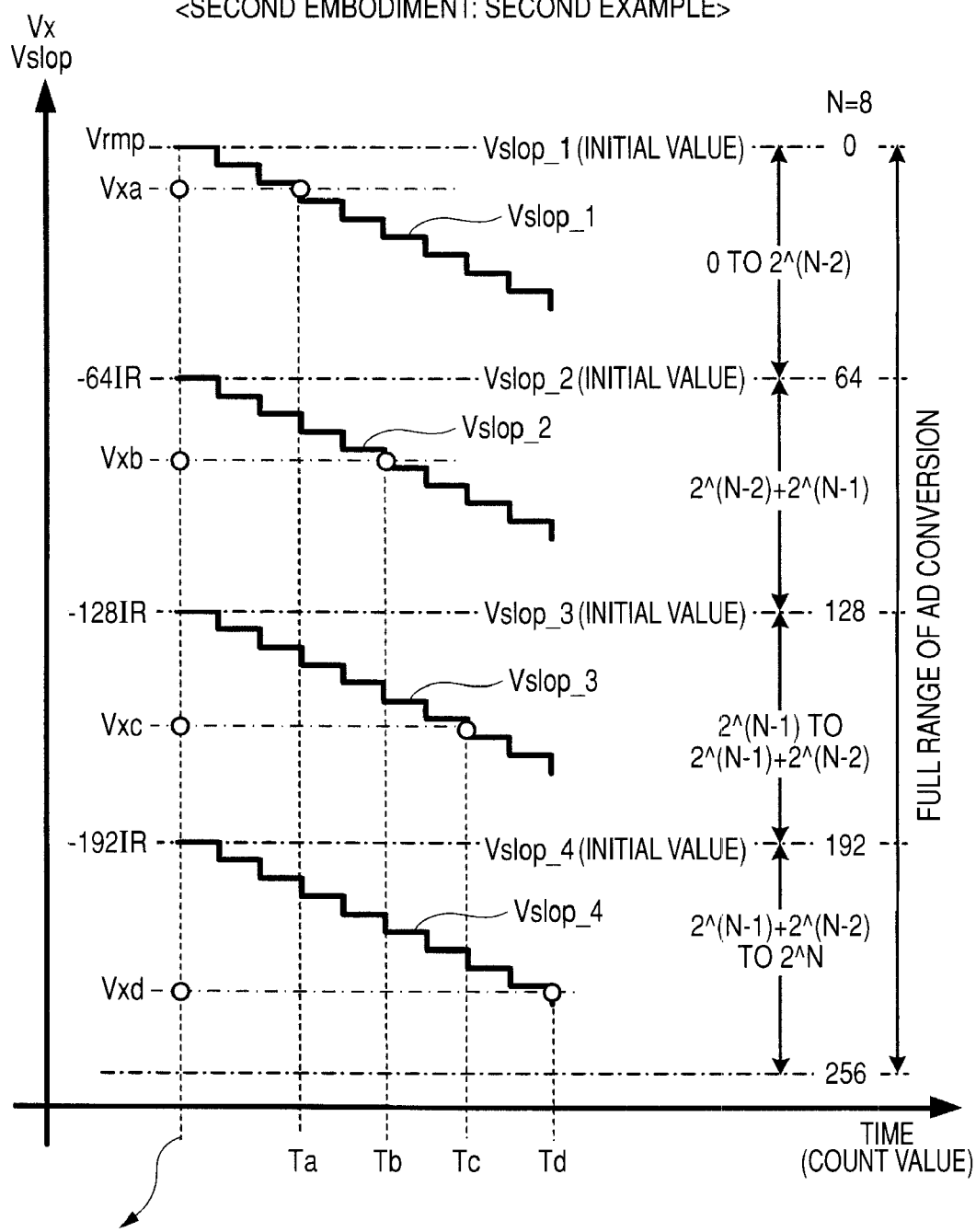
FIG. 17 is a diagram for explaining an operation principle of the AD conversion processing of the reference signal comparison type according to the second example of the second embodiment and shows a relation between four kinds of reference signals and a pixel signal voltage.

FIGS. 15 to 17 are diagrams for explaining AD conversion processing of a reference signal comparison type according to a second example of the second embodiment according to the present invention. FIG. 15 is a functional block diagram for explaining details (No. 1) of the DA converter 27*a* applied to the AD conversion processing of the reference signal comparison type according to the second example of the second embodiment. FIG. 16 is a functional block diagram for explaining details (No. 2) of the DA converter 27*a* applied to the AD conversion processing of the reference signal comparison type according to the second example of the second embodiment. FIG. 17 is a diagram for explaining an operation principle of the AD conversion processing of the reference signal comparison type according to the second example of the second embodiment and shows a relation between four kinds of reference signals Vslop_1, Vslop_2, Vslop_3, and Vslop_4 and the pixel signal voltage Vx.

In the first example of the second embodiment, time necessary for AD conversion is substantially halved compared with the comparative example by using the two kinds of reference signals Vslop_1 and Vslop_2 shifted by the half range. On the other hand, in the second example of the second embodiment, time necessary for AD conversion is substantially quartered compared with the comparative example by using the four kinds of reference signals Vslop_1, Vslop_2, Vslop_3, and Vslop_4 each shifted by a quarter range from an adjacent one.

Since a full range is equally divided into four and comparison processing for voltage levels in respective portions of the full range and the pixel signal voltage Vx is performed with the respective reference signals Vslop, an effect of a reduction in AD conversion processing time is the same as that in the third example of the first embodiment. The second example of the second embodiment is characterized in that the problem of time necessary for switching of the switch 310 in the reference-signal comparing unit 25 and a comparison operation in the voltage comparing unit 252 is solved by first specifying in which of the areas (the voltage levels), which are obtained by equally dividing the full range into four, the pixel signal voltage Vx is present and, then, using the reference signal corresponding to the voltage level of the pixel signal voltage Vx among the reference signals Vslop_1, Vslop_2, Vslop_3, and Vslop_4 corresponding to the equally divided four areas.

As the structure of the DA converter 27*a* according to the second example of the second embodiment that generates the four kinds of reference signals Vslop_1, Vslop_2, Vslop_3, and Vslop_4, the structure of respective current cells on the LSB side and a side one stage lower than the LSB are changed in the DA converter 27*a* according to the comparative example shown in FIG. 5B. Specifically, as in an example of the structure (No. 1) shown in FIG. 15, the output switch 350 is not provided for a most significant bit MSB and "MSB-1" one stage lower than the MSB (weighting of electric currents of the respective sync current sources 324 is not changed). Instead, a resistive element 337 is provided between the output node 380_1 for the reference signal Vslop_1 and the output node 380_2 for the reference signal Vslop_2 provided on the "MSB-1" side. An output of the sync current source 322 is connected to the resistive element 330 via the resistive element 337. A resistive element 338 is provided between the output node 380_1 for the reference signal Vslop_1 and the output node 380_3 for the reference signal Vslop_3 provided on the MSB side. The output of the sync current source 322 is connected to the resistive element 330 via the resistive element 338.

Moreover, a current cell formed by a series circuit of a sync current source 326 and a resistive element 339 having weighting same as that of the sync current source 324 of "MSB-1" is provided between the output node 380_3 for the reference signal Vslop_3 and the reference potential (GND). A connection point of the sync current source 326 and the resistive element 339 is set as the output node 380_4 for the reference signal Vslop_4. Resistance values of the resistive elements 330, 337, 338, and 339 are set to the same value R.

Consequently, in the output node 380_2 for the reference signal Vslop_2, a voltage value (for a quarter range with respect to the full range) corresponding to a product of a current value $2^{(N-2)}*I$ (N is a bit width of pixel data) of the sync current source 322 for "MSB-1" and a resistance value of the resistive element 337 is further reduced from the voltage value Vrmp of the reference signal Vslop_1. The voltage value is outputted from the output node 380_2 as the reference signal Vslop_2 as a DA conversion result. The reference signal Vslop_2 is typically lower than the reference signal Vslop_1 by the quarter range.

In the output node 380_3 for the reference signal Vslop_3, a voltage value (for a half range with respect to the full range) corresponding to a product of a current value $2^{(N-1)}*I$ (N is a bit width of pixel data) of the sync current source 322 for "MSB" and a resistance value of the resistive element 338 is further reduced from the voltage value Vrmp of the reference signal Vslop_1. The voltage value is outputted from the output node 380_3 as the reference signal Vslop_3 as a DA conversion result. The reference signal Vslop_3 is typically lower than the reference signal Vslop_1 by the half range.

In the output node 380_4 for the reference signal Vslop_4, a voltage value (for a quarter range with respect to the full range) corresponding to a product of a current value $2^{(N-2)}*I$ (N is a bit width of pixel data) of the sync current source 326 and a resistance value of the resistive element 339 is further reduced from the voltage value (Vrmp-½ range) of the reference signal Vslop_3. The voltage value is outputted from the output node 380_4 as the reference signal Vslop_4 as a DA conversion result. A current cell for a ¾ range is formed by the resistive element 338, the sync current source 322 of the MSB, the resistive element 339, and the sync current source 326. The reference signal Vslop_4 is typically lower than the reference signal Vslop_1 by the ¾ range. Adjacent ones of the four reference signals Vslop_1, Vslop_2, Vslop_3, and Vslop_4 have a voltage difference of the quarter range (64 LSB at the time of 8 bits).

Instead of providing the sync current source 326 and the resistive element 339, as in an example of the structure (No. 2) shown in FIG. 16, a current cell for the ¾ range formed by a series circuit of the sync current source 327 and the resistive element 340 having weighting for the ¾ range may be provided between the output node 380_1 for the reference signal Vslop_1 and the reference potential (GND). A connection point of the sync current source 327 and the resistive element 340 may be set as the output node 380_4 for the reference signal Vslop_4. Resistance values of the respective resistive elements 330, 337, 338, and 340 are set to the same value R.

In this case, in the output node 380_4 for the reference signal Vslop_4, a voltage value (for a ¾ range with respect to the full range) corresponding to a product of a current value (for the ¾ range) of the sync current source 327 and a resistance value of the resistive element 340 is further reduced from the voltage value Vrmp of the reference signal Vslop_1. The voltage value is outputted from the output node 380_4 as the reference signal Vslop_4 as a DA conversion result. The reference signal Vslop_4 is typically lower than the reference signal Vslop_1 by the ¾ range. In FIGS. 15 and 16, an example corresponding to 8 bits (N=8) is shown. Since the full range is 256, the reference signal Vslop_2 is "Vrmp-64IR", the reference signal Vslop_3 is "Vrmp-128IR", and the reference signal Vslop_4 is "Vrmp-192IR".

It is taken into account that R×I is equivalent to 1 LSB (a quantization unit of AD conversion) in the DA converter 27a according to the comparative example shown in FIG. 5B. Then, in the structure according to the first example of the second embodiment shown in FIGS. 15 and 16, in other words, it can be said that, as shown in FIG. 17, each of the four kinds of reference signals Vslop_1, Vslop_2, Vslop_3, and Vslop_4, potentials of adjacent ones of which are different by $2^{(N-2)}$ LSB (a quarter of the full range) (Vslop_1>Vslop_2>Vslop_3>Vslop_4), and that change at a step voltage of 1 LSB per count clock CKdac.

The DA converter 27a according to the second example of the second embodiment prepares the four kinds of reference signals Vslop_1, Vslop_2, Vslop_3, and Vslop_4. Therefore, although not shown in the figure, there are four wires for the reference signals Vslop that connect the DA converter 27a and the reference-signal control unit 25 as in the third example of the first embodiment shown in FIG. 9. The reference-signal control unit 25 includes the switch 312 of the four-input and one-output type that switches the four kinds of reference signals Vslop_1, Vslop_2, Vslop_3, and Vslop_4 and supplies the reference signals to the comparing unit 252 and the switching control unit 314 that controls the switch 312. In this regard, the second example of the second embodiment is the same as the third example of the first embodiment in which the four kinds of reference signals Vslop_1, Vslop_2, Vslop_3, and Vslop_4 are prepared.

The switching control unit 314 according to the second example of the second embodiment specifies, on the basis of a result of judgment in first comparison processing for the pixel signal voltage Vx and respective initial values of the four kinds of reference signals Vslop_1, Vslop_2, Vslop_3, and Vslop_4, the reference signal Vslop to be used after the comparison processing.

Processing Procedure According to the Second Example of the Second Embodiment

A basic example of an AD conversion processing procedure of the reference signal type according to the second example of the second embodiment is explained with reference to FIG. 17. As an example, a full range of AD conversion is 8 bits.

Before starting comparison processing for changing the reference signals Vslop by a 1 LSB step, the voltage comparing unit 252 sets the comparison pulse COMP to the H level. In response, in the reference-signal control unit 25, the switching control unit 314 causes the switch 312 in each of the pixel rows to select the reference signal Vslop_4 having a lowest voltage level among the four kinds of reference signals Vslop_1, Vslop_2, Vslop_3, and Vslop_4 outputted from the DA converter 27a and transfers the reference signal Vslop_4 to the voltage comparing unit 252.

In this case, an initial output value of the reference signal Vslop_1 (a value in a boundary with other ranges) is Vrmp (=0*IR), an initial output value of the reference signal Vslop_2 is Vrmp-$(2^{(N-2)})$IR, an initial output value of the reference signal Vslop_3 is Vrmp-$(2^{(N-1)})$IR, an initial output value of the reference signal Vslop_4 is Vrmp-$(2^{(N-1)}+2^{(N-2)})$IR, and a count value is "0". For example, in the case of 8 bits (N=8), the initial output value of the reference signal Vslop_1 is Vrmp (0IR), the initial output value of the reference signal Vslop_2 is Vrmp-64IR, the initial output value of the reference signal Vslop_3 is Vrmp-128IR, and the initial output value of the reference signal Vslop_4 is Vrmp-192IR.

In the second example of the second embodiment, in the beginning of comparison processing, the voltage comparing unit 25 checks to which of the areas of 0 LSB to 64 LSB, 64 LSB to 128 LSB, 128 LSB to 192 LSB, and 192 LSB to 256 LSB the pixel signal voltage Vx belongs. Thereafter, the voltage comparing unit 25 compares the reference signal Vslop (any one of the reference signals Vslop_1, Vslop_2, Vslop_3, and Vslop_4) having the quarter range width that decreases in a 1 LSB step and the pixel signal voltage Vx and decides pixel data of the pixel signal voltage Vx to perform AD conversion of the pixel signal voltage Vx. Therefore, it is possible to substantially reduce AD conversion time to a quarter compared with the comparative example.

For example, the switching control unit 314 switches the reference signal voltages in order of Vslop_3 and Vslop_2 when necessary with reference to the comparison pulse COMP of the voltage comparing unit 252. In response, the voltage comparing unit 252 compares respective initial values (i.e., respective levels of ¾, ½, and ¼ of the full range) of the reference signals Vslop_4, Vslop_3, and Vslop_2 and the pixel signal voltage Vx to specify the reference signal Vslop to be used after the comparison processing. Specifically, when pixel signal voltage Vxα<reference signal Vslop_4 (the initial value), the comparison pulse COMP is maintained at the H level. Therefore, it is specified that the pixel signal voltage Vxα belongs to the area of 192 LSB to 256 LSB. The voltage comparing unit 252 starts comparison processing using the reference signal Vslop_4.

When pixel signal voltage Vxα≧reference signal Vslop_4 (the initial value), the comparison pulse COMP is at the L level, the switching control unit 314 controls the switch 312 to select the reference signal Vslop_3 having a voltage level higher than that of the reference signal Vslop_4 by 64 LSB and transfers the reference signal Vslop_3 to the voltage comparing unit 252. At this point, if pixel signal voltage Vxα<reference signal Vslop_3 (the initial value), the comparison pulse COMP is at the H level. Therefore, it is specified that the pixel signal voltage Vxα belongs to the area of 128 LSB to 192 LSB. The voltage comparing unit 252 starts comparison processing using the reference signal Vslop_3.

When pixel signal voltage Vxα≧reference signal Vslop_3 (the initial value), the comparison pulse COMP is at the L level. Therefore, the switching control unit 314 controls the switch 312 to select the reference signal Vslop_2 having a voltage level higher than that of the reference signal Vslop_3 by 64 LSB and transfers the reference signal Vslop_2 to the voltage comparing unit 252. At this point, if pixel signal voltage Vxα<reference signal Vslop_2 (the initial value), the comparison pulse COMP is at the H level. Therefore, it is specified that the pixel signal voltage Vxα belongs to the area of 64 LSB to 128 LSB. The voltage comparing unit 252 starts comparison processing using the reference signal Vslop_2.

When pixel signal voltage Vxα≧reference signal Vslop_2 (the initial value), the comparison pulse COMP is at the L level. Therefore, the switching control unit 314 controls the switch 312 to select the reference signal Vslop_1 having a voltage level higher than that of the reference signal Vslop_2 by 64 LSB and transfers the reference signal Vslop_1 to the voltage comparing unit 252. At this point, pixel signal voltage Vxα<reference signal Vslop_2 (the initial value) and the comparison pulse COMP is at the H level. Therefore, it is specified that the pixel signal voltage Vxα belongs to the area of 0 LSB to 64 LSB. The voltage comparing unit 252 starts comparison processing using the reference signal Vslop_1.

In the reference-signal control unit 25, the switches 310 in the respective pixel rows select the reference signal Vslop_4 for the pixel row in which pixel signal voltage Vxα>192 IR, select the reference signal Vslop_2 for the pixel row in which 192 IR≧pixel signal voltage Vx>128 IR, select the reference signal Vslop_3 for the pixel row in which 128 IR≧pixel signal voltage Vx>64 IR, select the reference signal Vslop_4 for the pixel row in which 64 IR≧pixel signal voltage Vx, and supply the reference signals to the voltage comparing units 252, respectively. As a result, the voltage comparing units 252 in all the columns initially set the comparison pulse COMP to the H level and prepare for the next comparison processing.

Thereafter, in each of the pixel rows, the voltage comparing unit 252 compares any one of the reference signals Vslop_1, Vslop_2, Vslop_3, Vslop_4, which changes in a 1 LSB step, and the pixel signal voltage Vx. At a point when both the voltages coincide with each other, the voltage comparing unit 252 switches the comparison pulse COMP from the H level to the L level. Information on the change of the comparison pulse COMP is transferred to the counter unit 254. The counter unit 254 stores a count value T at this point with this change as a trigger.

The counter unit 254 in the pixel row that uses the reference signal Vslop_1 directly outputs the stored count value T as a final count value. The counter unit 254 in the pixel row that uses the reference signal Vslop_2 outputs "T+ΔT1" as a final count value. ΔT1 is a count value (=$2^{(N-2)}$ LSB) equivalent to a quarter of N bits.

The reference signal Vslop_2 is used when the pixel signal voltage Vx is in the area of 64 LSB to 128 LSB and is used because, in practice, there is an increase of a count value equivalent to $2^{(N-2)}$ LSB with respect to the reference signal Vslop_1. The counter unit 254 of the pixel row that uses the reference signal Vslop_3 outputs "T+ΔT2" as a final count value. ΔT2 is a count value (=$2^{(N-1)}$ LSB) equivalent to a half of N bits. The reference signal Vslop_3 is used when the pixel signal voltage Vx is in the area of 128 LSB to 192 LSB and is used because, in practice, there is an increase of $2^{(N-1)}$ LSB with respect to the reference signal Vslop_1.

The counter unit 254 in the pixel row that uses the reference signal Vslop_4 outputs "T+ΔT3" as a final count value. ΔT3 is a count value (=$3*2^{(N-2)}$ LSB) equivalent to ¾ of N bits. The reference signal Vslop_4 is used when the pixel signal voltage Vx is in the area of 192 LSB to 256 LSB and is used because, in practice, there is an increase of $3*2^{(N-2)}$ LSB with respect to the reference signal Vslop_1.

Consequently, AD conversion processing in 1 LSB units is realized while the reference signals Vslop are controlled 1 LSB at a time. It is decided in advance to which of areas obtained by equally dividing the full range into four the pixel signal voltage Vx belongs. Pixel signal voltages corresponding to an area to which the pixel signal voltage Vx belongs among in the four kinds of reference signals Vslop_1, Vslop_2, Vslop_3, and Vslop_4 shown in FIG. 17 and the pixel signal voltage Vx are compared. Therefore, there is an advantage that, even if frequencies of the count clock CK0 and the count clock CKdac are not increased, time necessary for AD conversion is substantially quartered. Since the time necessary for AD conversion can be quartered, it is possible to quadruple speed of AD conversion processing while maintaining bit resolution and controlling an increase in power consumption in the counter unit 254. This is because, whereas it is necessary to change the reference signals Vslop in the full range in the comparative example, in the second example of the second embodiment, the reference signals Vslop only have to be moved by the quarter range.

In addition, it is decided in advance to which of the areas obtained by equally dividing the full range into four the pixel signal voltage Vx belongs. Thereafter, pixel data can be specified by performing, only once, comparison processing for comparing any one of the reference signals Vslop_1, Vslop_2, Vslop_3, and Vslop_4 that change in a 1 LSB step and the pixel signal voltage Vx to specify pixel data.

Therefore, it is possible to solve the problem of time necessary for switching of the switch 310 in the reference-signal control unit 25 and a comparison operation in the voltage comparing unit 252 that occurs in the third example of the first embodiment.

Third Example of Second Embodiment;
Generalization

Figure 18:
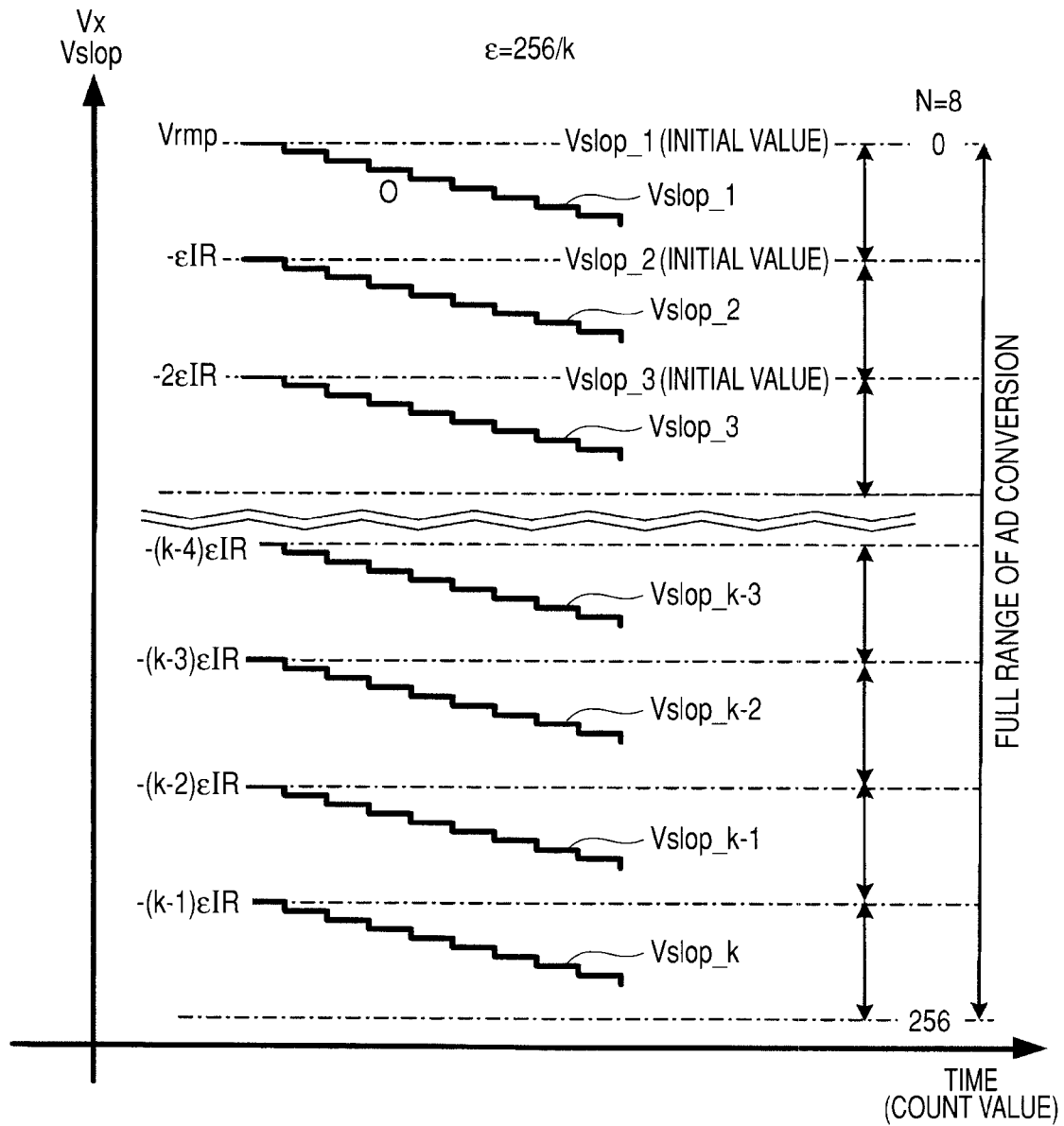
FIG. 18 is a diagram for explaining AD conversion processing of a reference signal comparison type according to a third example of the second embodiment and shows a relation between M kinds of reference signals and a pixel signal voltage.

FIG. 18 is a diagram for explaining AD conversion processing of a reference signal comparison type according to a third example of the second embodiment and shows a relation between M kinds of reference signals Vslop and the pixel signal voltage Vx.

In the first example of the second embodiment, the full range is equally divided into two areas and the reference signal Vslop corresponding to any one of the areas is compared with the pixel signal voltage Vx to reduce an AD conversion period to a half. In the second example of the second embodiment, the full range is equally divided into four and the reference signal Vslop corresponding to any one of the areas is compared with the pixel signal voltage Vx to reduce an AD conversion period into a quarter. By developing the forms of these examples, eventually, as a processing form of the second embodiment, an AD conversion period can be reduced to ½^n by equally dividing the full range into $2^n$ areas and comparing the reference signal Vslop, which changes stepwise at a rate of change of 1 LSB in any one of the areas corresponding to the pixel signal voltage Vx, with the pixel signal voltage Vx.

The full range is divided into "$2^n$" areas because, due to consistency with weighting of bits of digital data, it is easy to generate the respective reference signals Vslop and a circuit configuration is compact. However, it is not indispensable to divide the full range into "$2^n$" areas. As shown in FIG. 18, an AD conversion period can be reduced to 1/k by, as shown in FIG. 18, equally dividing the full range into k (k is a positive integer) areas and comparing the reference signal Vslop, which changes stepwise at a rate of change of 1 LSB in any one of the areas corresponding to the pixel signal voltage Vx, with the pixel signal voltage Vx.

In first comparison processing, the voltage comparing unit 252 specifies to which of equally divided k areas the pixel signal voltage Vx belongs and specifies a reference signal to be set as the reference signal Vslop for AD conversion by comparing the pixel signal voltage Vx and the respective reference signals Vslop present at intervals of full range×1/k in a range of full range×1/k to full range×(k−1)/k. In other words, the voltage comparing unit 252 performs comparison (specifically referred to as area specifying comparison) of the pixel signal voltage Vx and initial voltage values of the respective reference signals Vslop at intervals of full range× 1/k. Then, the voltage comparing unit 252 selects the reference signal Vslop to be set as the reference signal Vslop for AD conversion out of the reference signals Vslop on the basis of a result of this area specifying comparison processing.

Thereafter, the voltage comparing unit 252 compares any one of the reference signals Vslop corresponding to a result of area specifying comparison processing for the pixel signal voltage Vx that changes in a 1 LSB step (the reference signals Vslop, an initial value of which is any one of values at intervals of full range×1/k and a minimum step voltage of which is 1 LSB) and the pixel signal voltage Vx. The counter unit 254 stores a count value T at timing when a magnitude relation between the pixel signal voltage Vx and the reference signal Vslop set as a comparison object is inverted.

The counter unit 254 decides digital data of the pixel signal voltage Vx by increasing data by (m−1)*ϵ (correcting data) according to which of the areas obtained by equally dividing the full range into k the reference signal Vslop set as the comparison object belongs. Here, ϵ is a count value equivalent to 1/k of the count value of the full range of N bits and is a reference of the reference signal Vslop used for AD conversion of the pixel signal voltage Vx.

Third Embodiment

Figure 19:
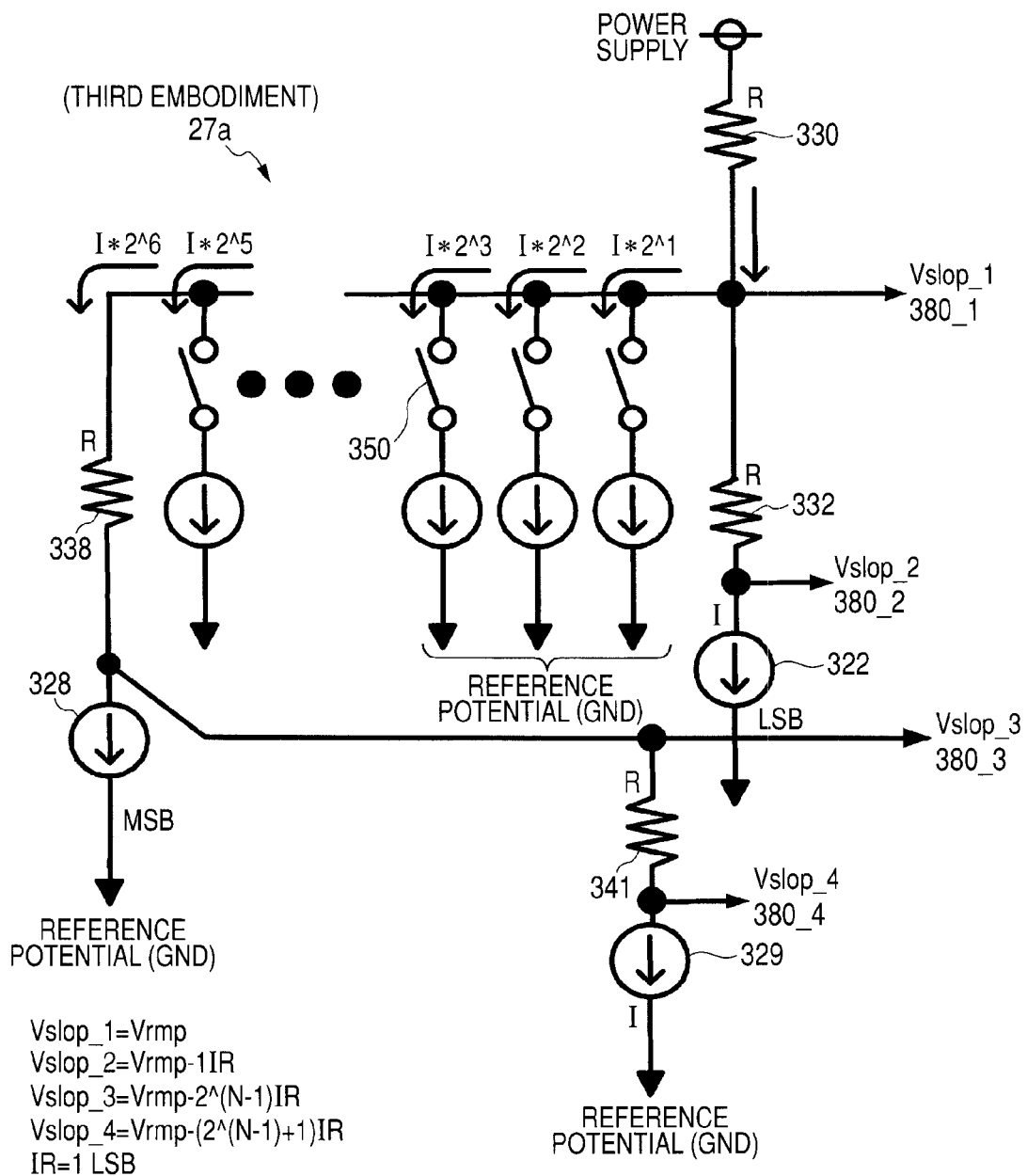
FIG. 19 is a functional block diagram for explaining details of a DA converter applied to AD conversion processing of a reference signal comparison type according to a third embodiment of the present invention.
Figure 20:
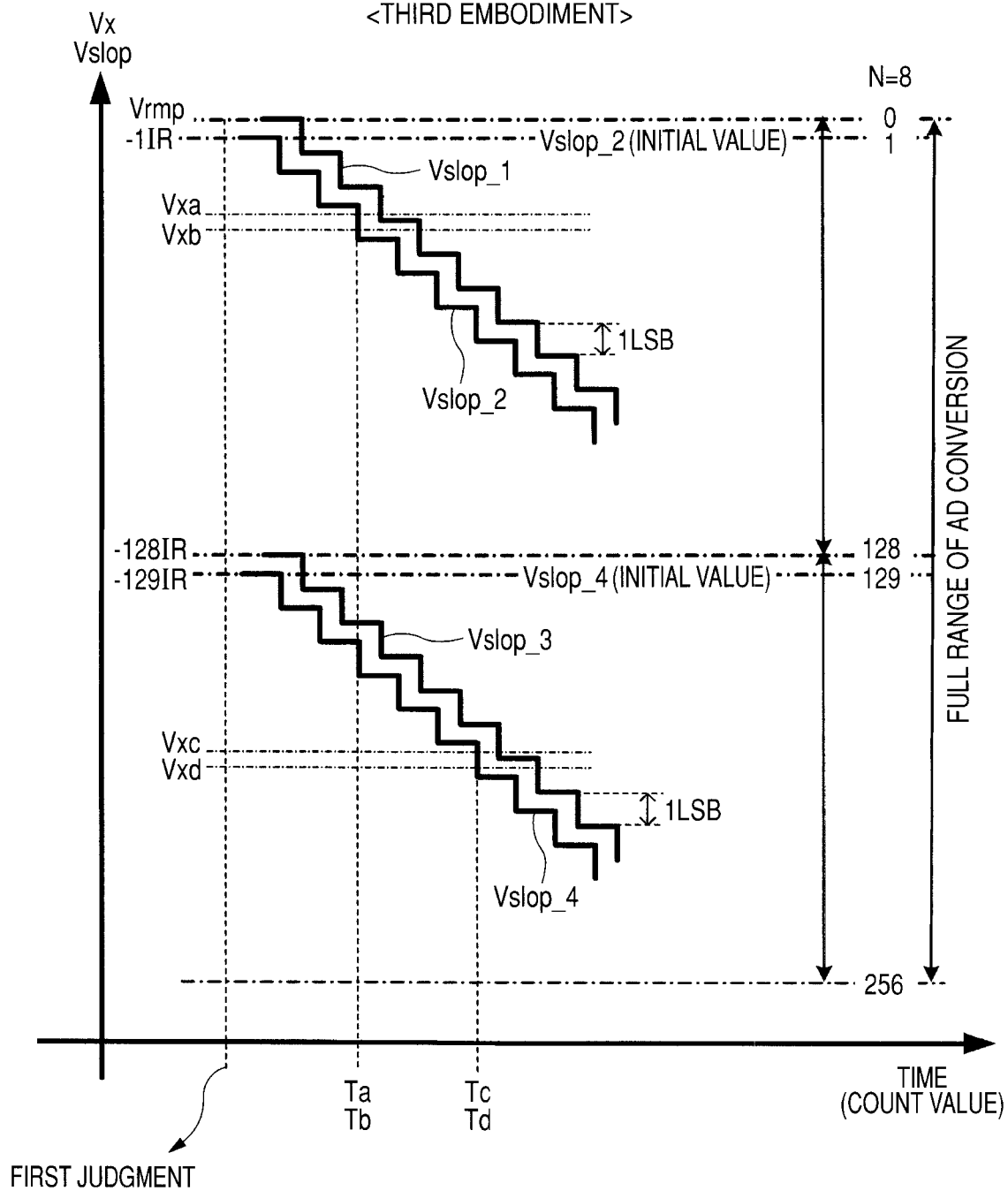
FIG. 20 is a diagram for explaining an operation principle of the AD conversion processing of the reference signal comparison type according to the third embodiment and shows a relation between four kinds of reference signals and a pixel signal voltage.
Figure 21:
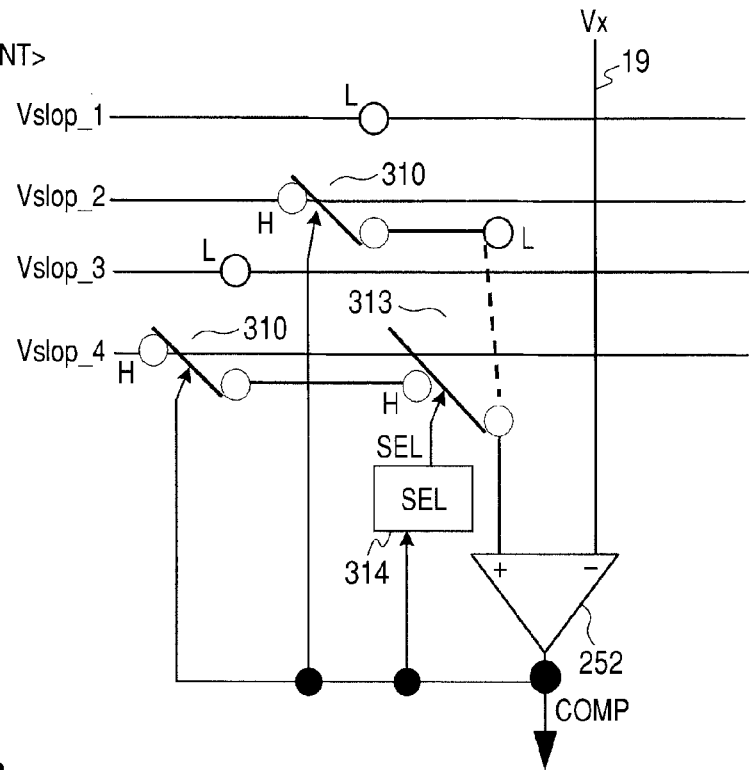
FIG. 21 is a diagram showing a reference-signal control unit for one pixel row applied to the AD conversion processing of the reference signal comparison type according to the third embodiment.

FIGS. 19 to 21 are diagrams for explaining AD conversion processing of a reference signal comparison type according to a third embodiment of the present invention. FIG. 19 is a functional block diagram for explaining details of the DA converter 27a applied to the AD conversion processing of the reference signal comparison type according to the third embodiment. FIG. 20 is a diagram for explaining an operation principle of the AD conversion processing of the reference signal comparison type according to the third embodiment and shows a relation between four kinds of reference signals Vslop and the pixel signal voltage Vx. FIG. 21 is a diagram showing the reference-signal control unit 25 for one pixel row applied to the AD conversion processing of the reference signal comparison type according to the third embodiment.

The third embodiment is a combination of the first embodiment and the second embodiment. In an example shown in the figure, the first example of the first embodiment in which the two kinds of reference signals Vslop, a voltage difference between which is 1 LSB with respect to the reference signal Vslop_1, are prepared and the first example of the second embodiment in which the two kinds of reference signals Vslop for equally dividing the full range into two are prepared are combined.

In the current cell of the MSB, the sync current source is changed to a sync current source 328, weighting of an electric current of which is I*127. This copes with the application of the first example of the first embodiment in which the two kinds of reference signals Vslop, a voltage difference between which is 1 LSB with respect to the reference signal Vslop_1, are prepared. Moreover, a current cell including a series circuit of a sync current source 329 having weighting same as that of the sync current source 322 of the LSB and a resistive element 341 is provided between the output node 380_3 for the reference signal Vslop_3 and the reference potential (GND). A connection point of the sync current source 329 and the resistive element 341 is set as the output node 380_4 for the reference signal Vslop_4. Resistance values of the respective resistive elements 330, 332, 338, and 341 are set to the same value R.

Consequently, as shown in FIG. 20, "Vrmp-1IR" further reduced by 1 LSB from the voltage value Vrmp of the reference signal Vslop_1 is outputted from the output node 380_2 (a connection point of the resistive element 332 and the sync current source 322 of the LSB) as the reference signal Vslop_2. "Vrmp-128IR" further reduced by a half range (128 IR) from the voltage value Vrmp of the reference signal Vslop_1 is outputted from the output node 380_3 (a connection point of the resistive element 338 and the sync current source 328) as the reference signal Vslop_3. "Vrmp-129IR" further reduced by the half range+1 LSB from the voltage value Vrmp of the reference signal Vslop_1 is outputted from the output node 380_4 (a connection point of the resistive element 341 and the sync current source 329) as the reference signal Vslop_4.

The DA converter 27a according to the third embodiment prepares the four kinds of reference signals Vslop_1, Vslop_2, Vslop_3, and Vslop_4. Therefore, there are four wires for the reference signals Vslop that connect the DA converter 27a and the reference-signal control unit 25 as in the third example of the first embodiment shown in FIG. 9. As shown in FIG. 21, the reference-signal control unit 25 includes, for each of lines of the reference-signal selecting unit 300, the switches 310 of the two-input and one-output type that switch the two kinds of reference signals Vslop_1 and Vslop_2 or Vslop_3 and Vslop_4. The reference-signal control unit 25 also includes the switching control unit 314 that controls the switch 314 and the switch 313 of the two-input and one-output type that further switch outputs of the respective switches 310 and supply the outputs to the comparing unit 252. The comparison pulse COMP from the voltage comparing unit 252 is supplied to control inputs of the respective switches 310 and the switching control unit 314.

The switching control unit 314 according to the third embodiment specifies, on the basis of a result of judgment in first comparison processing for the pixel signal voltage Vx and respective initial values of the two kinds of reference signals Vslop_2 and Vslop_4, a line of the reference signals Vslop_1 and Vslop_2 having a high voltage level and a line of the reference signals Vslop_3 and Vslop_4 having a low voltage level as the reference signal Vslop to be used after the comparison processing. Thereafter, the voltage comparing unit 252 starts pre-stage comparison processing for the reference signal Vslop_2 (or Vslop_4), which matches a range to which the pixel signal voltage Vx belongs, and the pixel voltage Vx. When the comparison pulse COMP is inverted to the L level, the switching control unit 314 switches the reference signal to the reference signal Vslop_1 (or Vslop_3) and performs post-stage comparison processing for the reference signal and the pixel signal voltage Vx.

Processing Procedure According to the Third Embodiment

A basic example of an AD conversion processing procedure of the reference signal type according to the third embodiment is explained with reference to FIG. 20. As an example, a full range of AD conversion is 8 bits.

First, the voltage comparing unit 252 specifies, by applying the processing procedure according to the first example of the second embodiment, to which of areas obtained by equally dividing the full range the pixel signal voltage Vx belongs using reference signals representing ranges, respectively.

Before starting comparison processing, the voltage comparing unit 252 sets the comparison pulse COMP to the H level. Therefore, in the reference-signal control unit 25, the switch 310 in each of the pixel rows selects the reference signal Vslop_2 and the reference signal Vslop_4, which have lower voltage levels in the two kinds of reference signals Vslop_1 and Vslop_2 and the two kinds of reference signals Vslop_3 and Vslop_4 outputted from the DA converter 27a, respectively, as reference signals representing the ranges and passes the reference signals to the switch 313. The switching control unit 314 selects the reference signal Vslop_4 having the lower voltage level when the comparison pulse COMP is at the H level and supplies the reference signal Vslop_4 to the voltage comparing unit 252. The voltage comparing unit 252 compares an initial value (i.e., a ½+1 LSB level of the full range) of the reference signal Vslop_4 and the pixel signal voltage Vx. Consequently, it is specified, for each of the pixel rows, to which of the areas of 0 LSB to 129 LSB and 129 LSB to 256 LSB the pixel signal voltage Vx belongs.

If a circuit configuration of the reference-signal selecting unit 300 is changed, the reference signal Vslop_1 and the reference signal Vslop_3 having higher voltage levels can be selected as reference signals representing the ranges. It is specified, for each of the pixel rows, to which of areas of 0 LSB to 128 LSB and 128 LSB to 256 LSB the pixel signal voltage Vx belongs.

In the reference-signal control unit 25, the switches 314 in the respective pixel rows select the reference signal Vslop_2 for the pixel rows in which pixel signal voltage Vx≧reference signal Vslop_4 (the initial value) (=129 LSB), selects the reference signal Vslop_4 for the pixel rows in which reference signal Vslop_4 (the initial value) (=129 LSB)>pixel signal voltage Vx, and supplies the reference signals Vslop_2 and Vslop_4 to the voltage comparing units 252. As a result, the voltage comparing units 252 in all the columns initially set the comparison pulse COMP to the H level and prepare for the next comparison processing.

By applying the processing procedure according to the first example of the first embodiment, the voltage comparing unit 252 in each of the pixel rows compares, in the beginning of comparison processing, the reference signal Vslop_2 (or Vslop_4) (the reference signal having a lower voltage level in each of the areas) and the pixel signal voltage Vx supplied from the vertical signal line 19 in the column. At a point when the pixel signal voltage Vx (an analog value) and the reference signal Vslop_2 (or Vslop_4) coincide with each other, the voltage comparing unit 252 switches the comparison pulse COMP from the H level to the L level.

In the reference-signal control unit 25, the switch 310 in each of the pixel rows switches, when the comparison pulse COMP from the voltage comparing unit 252 in the column is switched to the L level, the reference signal Vslop_2 (or Vslop_4) to the reference signal Vslop_1 (or Vslop_3) (i.e., the reference signal having a level 1 LSB higher). The voltage comparing unit 252 immediately compares the pixel signal voltage Vx and the reference signal Vslop_1 (or Vslop_3) again. The counter unit 254 stores a count value T at this point. In other words, the counter unit 254 stores a count value T at timing when a magnitude relation between the pixel signal voltage Vx and the reference signal Vslop_1 (or Vslop_3) is inverted.

The counter unit 254 decides pixel data of the pixel signal voltage Vx on the basis of to which of areas obtained by substantially equally dividing the full range into two the pixel signal voltage Vx corresponds and on the basis of a result of post-stage comparison processing. For example, when "pixel signal voltage Vxa>reference signal Vslop_1", the counter unit 254 outputs "2Ta−1" as a final count value. When "pixel reference signal Vslop_1>pixel signal voltage Vxb>reference signal Vslop_2", the counter unit 254 outputs 2Tb as a final count value. When "pixel signal voltage Vxc>reference signal Vslop_3", the counter unit 254 outputs "2Tc−1+128" obtained by adding a value of a half range to "2Tc−1" as a final count value. When "pixel reference signal Vslop_3>pixel signal voltage Vxd>reference signal Vslop_4", the counter unit 254 outputs "2Td+128" obtained by adding a value of a half range to 2Td as a final count value.

Consequently, as in the third example of the first embodiment and the second example of the second embodiment, an AD conversion period is substantially quartered. In the second example of the second embodiment, since the AD conversion period is quartered, a current cell for a ¾ range has to be prepared. Therefore, there is a disadvantage that power consumption increases. On the other hand, in the third embodiment, since it is unnecessary to prepare a current cell for a ¾ range, an effect of a reduction in power consumption can be expected.

During post-stage comparison processing for AD conversion, in the third example of the first embodiment, the three kinds of reference signals Vslop_3, Vslop_2, and Vslop_1 have to be switched and processed. On the other hand, in the third embodiment, only one kind of reference signal Vslop_1 (or Vslop_3) has to be processed. This is advantageous against "a processing delay incidental to switching of the switch 310, comparison operation in the voltage comparing unit 252, and the like" explained in the second example of the first embodiment.

First Example of Fourth Embodiment

Figure 22:
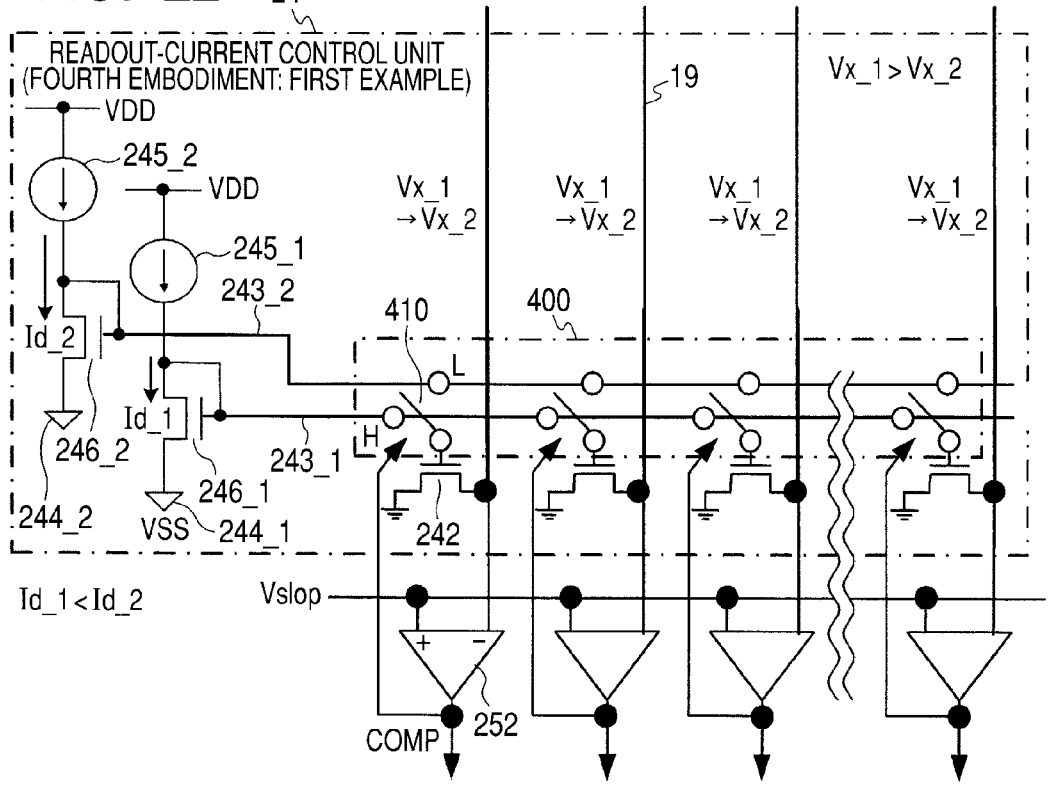
FIG. 22 is a circuit block diagram for explaining an example of the structure around a readout-current control unit applied to AD conversion processing of a reference signal comparison type according to a first example of a fourth embodiment of the present invention.
Figure 23:
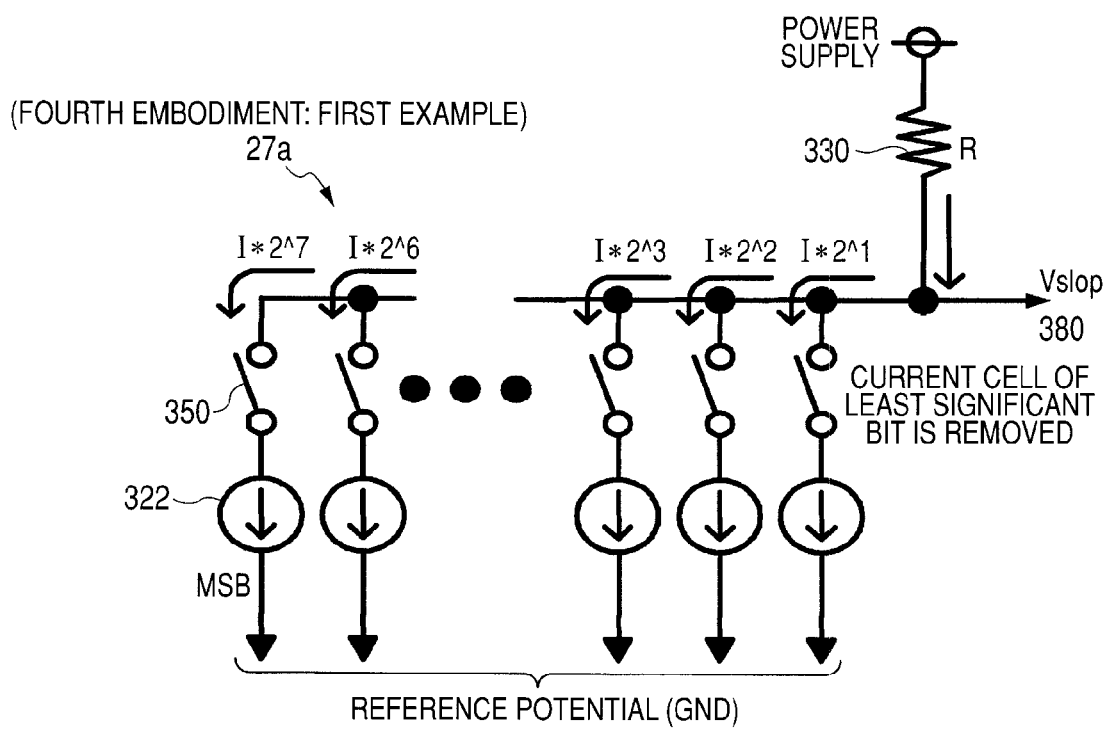
FIG. 23 is a functional block diagram for explaining details of a DA converter applied to the AD conversion processing of the reference signal comparison type according to the first example of the fourth embodiment.
Figure 24A:
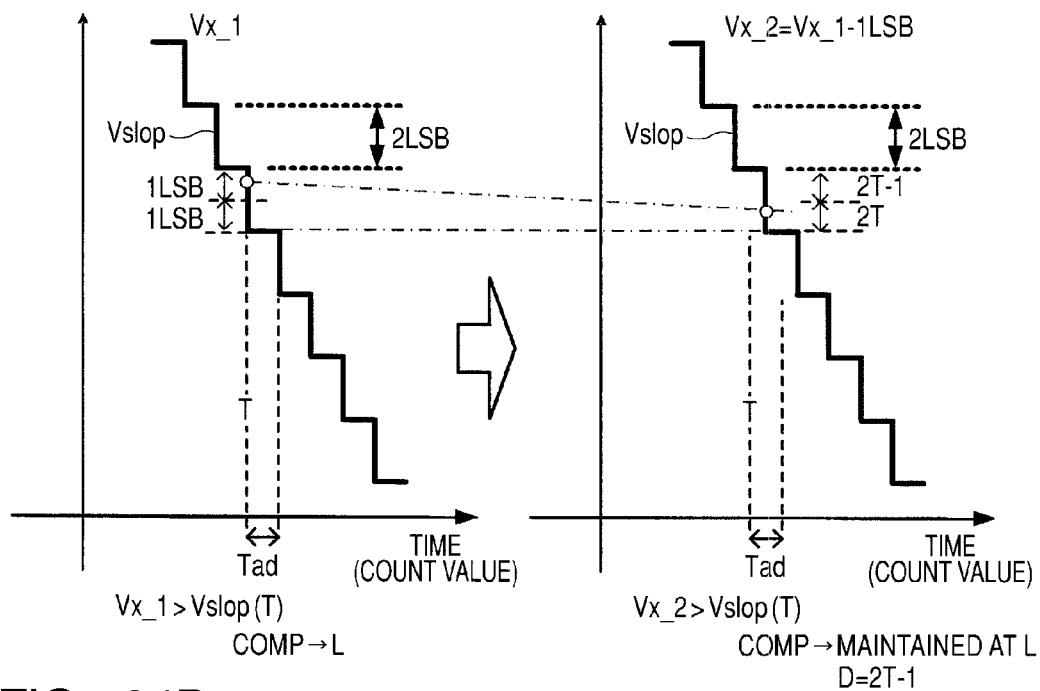
FIGS. 24A and 24B are diagrams for explaining an operation principle of the AD conversion processing of the reference signal comparison type according to the first example of the fourth embodiment and shows a relation between a reference signal and two kinds of pixel signal voltages.
Figure 24B:
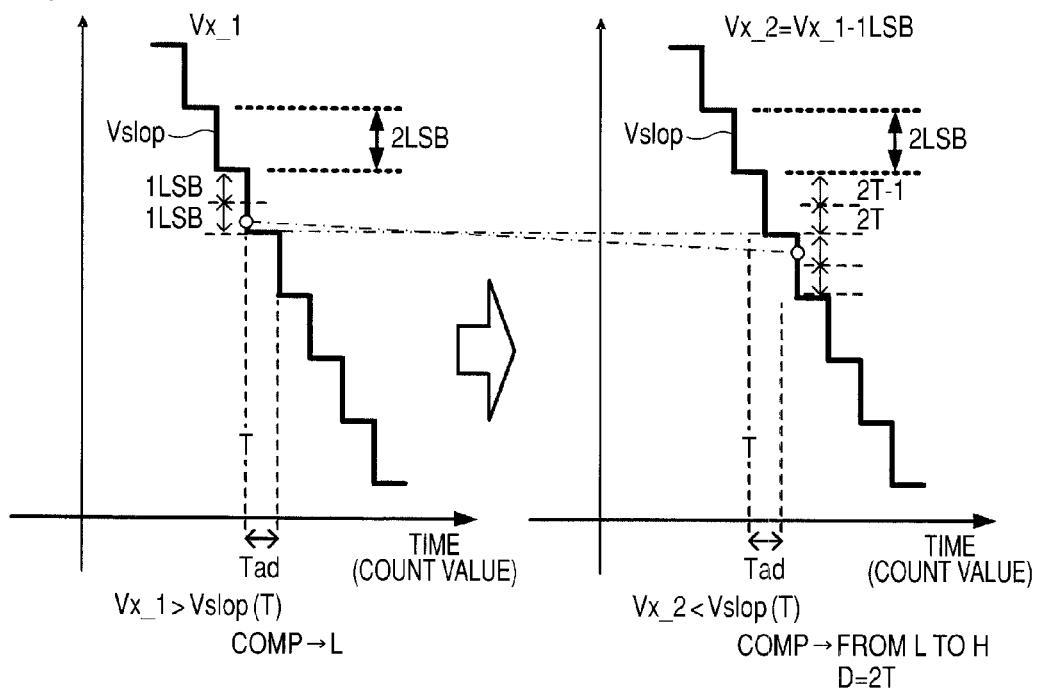

FIG. 22 to FIGS. 24A and 24B are diagrams for explaining AD conversion processing of a reference signal comparison type according to a first example of a fourth embodiment of the present invention. FIG. 22 is a circuit block diagram for explaining an example of the structure around the readout-current control unit 24 applied to the AD conversion processing of the reference signal comparison type according to the first example of the fourth embodiment. FIG. 23 is a functional block diagram for explaining details of the DA converter 27*a* applied to the AD conversion processing of the reference signal comparison type according to the first example of the fourth embodiment. FIGS. 24A and 24B are diagrams for explaining an operation principle of the AD conversion processing of the reference signal comparison type according to the first example of the fourth embodiment and show a relation between the reference signal Vslop and two kinds of pixel signal voltages Vx.

In the first to third embodiments, plural kinds of reference signals Vslop having different voltage levels are supplied to the reference-signal control unit 25 including the switch 310 provided for each of the pixel rows. The switch 310 switches, for each of the pixel rows, the reference signal Vslop that should be used. The voltage comparing unit 252 compares the reference signal Vslop and the pixel signal voltage Vx to convert (AD-convert) the pixel signal voltage Vx into digital data. On the other hand, the fourth embodiment is characterized in that a voltage level of the pixel signal voltage Vx is controlled independently for each of the pixel rows while using one kind of reference signal Vslop in common in all the pixel rows.

As shown in FIG. 22, as a circuit configuration, the readout-current control unit 24 includes an operation-current-switching control unit 400 having, for the respective pixel rows, switches 410 of a two-input and one-output type that switch two kinds of operation currents (readout currents) Id_1 and Id_2 for pixel signal readout and supply the operation currents to the respective vertical signal lines 19 of the pixel array unit 10. The operation-current-switching control unit 400 is an example of means for supplying different operation currents to the vertical signal lines 19, respectively, and relatively changing a level of the pixel signal voltage Vx to divide the pixel signal voltage Vx into plural kinds of pixel signal voltages Vx, a level difference between adjacent ones of which is fixed. The switches 410 are an example of pixel-signal selecting units that select plural (in this example, two) kinds of pixel signal voltages Vx. To cope with the plural kinds of pixel signal voltages Vx, reference current source units 244 include two kinds of current generating units 245_1 and 245_2 that generate two kinds of operation currents (readout currents) Id_1 and Id_2 and transistors 246_1 and 246_2 of an NMOS type connected to the respective current generating units 245_1 and 245_2.

Drains of load MOS transistors 242 are connected to the vertical signal lines 19 in the respective pixel rows and sources thereof are connected in common to a source line as a ground line. Gates of the load MOS transistors 242 in the respective vertical columns and gates of the transistors 246_1 and 246_2 of the reference current source units 244 are connected to each other to form a current mirror circuit and function as a current source for the vertical signal line 19.

A load control signal for outputting a predetermined current only when necessary is supplied to the respective current generating units 245_1 and 245_2 from a not-shown load control unit. During signal readout, when an active state of the load control signal is inputted to the current generating units 245, the current generating units 245 continue to feed a constant current determined in advance using the load MOS transistors 242 connected to respective amplification transistors 42. In other words, the load MOS transistors 242 form a source follower with the amplification transistors 42 in selected rows and supply a readout current to the amplification transistors 42 to cause the amplification transistors 42 to output signals to the vertical signal lines 19.

In the DA converter 27a according to the first example of the fourth embodiment corresponding to the readout-current control unit 24 having such structure, as shown in FIG. 23, the sync current source 322 and the output switch 350 forming the current cell of the LSB are removed from the DA converter 27a according to the comparative example shown in FIG. 5B. Consequently, the reference signal Vslop outputted from the output node 380 of the DA converter 27a according to the first example of the fourth embodiment changes at a step voltage of R×2I (2 LSB). Since all the pixel rows uses one kind of reference signal Vslop in common, the reference signal Vslop from the reference-signal generating unit 27 is directly supplied to the column processing unit 26 without the intervention of the reference-signal control unit 25.

As shown in FIG. 22, a gate and a drain of the transistor 246_1 of the NMOS type are connected to an output of the current generating unit 245_1 and connected in common to one input terminals of the switches 410 in the respective pixel rows as a gate line 243_1. A gate and a drain of the transistor 246_2 of the NMOS type are connected to an output of the current generating unit 245_2 and connected in common to the other input terminals of the switches 410 in the respective pixel rows as a gate line 243_2.

As shown in FIGS. 24A and 24B, a current difference between the operation current Id_1 generated by the current generating unit 245_1 and the operation current Id_2 (>Id_1) generated by the current generating unit 245_2 can set the pixel signal voltages Vx in the vertical signal lines 19 different by 1 LSB in AD conversion. A potential of the pixel signal voltages Vx falls as the operation currents Id are larger. Therefore, there is a relation of pixel signal voltage Vx_2=pixel signal voltage Vx_1−1LSB between the pixel signal voltage Vx_1 at the time of the operation current Id_1 and the pixel signal voltage Vx_2 at the time of the operation current Id_2.

For example, as a first method, the respective current generating units 245_1 and 245_2 are formed by a combination of current sources for respective bits according to the example of the structure of the DA converter 27a. Concerning a current source for the LSB, the current generating unit 245_1 for the operation current Id_1 that generates a large amount of operation currents is provided. However, it is advisable not to provide the current generating unit 245_2 for the operation current Id_2 that generates a small amount of operation currents.

Alternatively, as a second method, it is advisable to form the current generating units 245_1 and 245_2 as current generating units of a current mirror structure that adjust respective current mirror ratios m/n with the number of fingers of transistors or the number of transistors and give a difference of 1 LSB to the pixel signal voltages Vx by adjusting the number of fingers or the number of transistors. In the case of this example, it is advisable to prepare fingers or transistors for N bits for the current generating unit 245_1 for the operation current Id_1 that generates a large amount of operation currents and reduce one finger or transistor for the current generating unit 245_2 for the operation current Id_2 that generates a small amount of operation currents.

The comparison pulse COMP is supplied to the control input terminal of the switch 410 in each of the pixel rows from the voltage comparing unit 252 in the column. When the comparison pulse COMP is at the H level (i.e., when comparison processing is started), the switch 410 selects the gate line 243_1 corresponding to the operation current Id_1 and connects the gate line 243_1 to the gate of the load MOS transistor 242 in the column to transfer information on the operation current Id_1 to the load MOS transistor 242. Consequently, the pixel signal voltage Vx of the vertical signal line 19 in the pixel row changes to the pixel signal voltage Vx_1 LSB higher compared with that at the time of the operation current Id_2. On the other hand, at a point when the comparison pulse COMP is switched to the L level (i.e., at a point when the pixel signal voltage Vx_1 at the operation current Id_1 and the reference signal Vslop coincide with each other), the switch 410 selects the gate line 243_2 corresponding to the operation current Id_2 and connects the gate line 234_2 to the gate of the load MOS transistor 242 in the column to transfer information on the operation current Id_2 to the load MOS transistor 242. Consequently, the pixel signal voltage Vx of the vertical signal line 19 in the pixel row changes to the pixel signal voltage Vx_2 1 LSB lower compared with that at the time of the operation current Id_1.

In the readout-current control unit 24 according to the first example of the fourth embodiment, by also providing the switch 410 for each of the pixel rows, an output (the comparison pulse COMP) of the voltage comparing unit 252 in the column AD circuit 250 in each of the pixel rows is fed back to the switch 410 in the pixel row corresponding thereto. The switch 410 is switched at timing when the output of the voltage comparing unit 252 is inverted. The voltage comparing unit 252 controls the pixel signal voltage Vx compared with the reference signal Vslop independently for the respective pixel rows with a difference of 1 LSB.

Processing Principle According to the Fourth Embodiment

FIG. 25 is a diagram for explaining a principle of the AD conversion processing of the reference signal comparison type according to the fourth embodiment (including not only the first example but also other examples described later). In terms of a relation with pixel data D as an AD conversion result of a pixel signal voltage Vx_@, in comparison at the reference signal Vslop that changes in a γ LSB step, pixel data D at the time when the comparison pulse COMP is inverted at timing T of the count clock CK0 is specified. In the case of this example, it is taken into account that the comparison pulse COMP is inverted when the reference signal Vslop (T) falls below the pixel signal voltage Vx_@ and a count value at that point is stored and that Vx_@>Vx__@+1 and a difference between Vx_@ and Vx__@+1 is equivalent to 1 LSB.

The comparison pulse COMP is inverted at Vslop(T) with respect to the pixel signal voltage Vx_@. This means that, although Vslop(T−1)≧Vx_@>Vslop(T) and a difference between Vslop(T−1) and Vslop(T) is equivalent to γ LSB, by setting the reference signal Vslop stepwise even in the input section of the voltage comparing unit 252, the y LSB can be sectioned by 1 LSB with reference to results of comparison at Vx_@ each having a voltage difference of 1 LSB. When it is taken into account that Vx_@>Vx__@+1, a count value T at the time when the comparison pulse COMP is inverted in comparison at the pixel signal voltage Vx_1 having a highest voltage level and the reference signal Vslop is stored. The remaining pixel signal voltages Vx_2, ..., Vx_γ that decrease in a 1 LSB step with respect to the pixel signal voltage Vx_1 and the reference signal Vslop(T) are compared. Then, as shown in FIG. 25 (an example of γ=4), a result of comparison of the pixel signal voltages Vx_2, ..., Vx_γ and the reference signal Vslop(T) varies depending on at which level in the γ LSB the pixel signal voltage Vx_1 is present. Therefore, it is possible to specify at which level in the y LSB the pixel signal voltage Vx_1 is present with reference to the comparison result.

In FIG. 25, in the case of γ=4, the pixel signal voltage Vx_1 is present in a range of a highest voltage level in Vslop(T−1) to Vslop(T) (Vslop(T)+4LSB to Vslop(T)−3LSB) and is present in a range of a lowest voltage level (Vslop(T)+1LSB to Vslop(T)). From this figure and by inferring comparison results in other voltage level ranges not shown in the figure, when a comparison result obtained by comparing the pixel signal voltage Vx_@ and the reference signal Vslop(T) is a comparison pulse COMP_@, points described below are specified.

When the pixel signal voltage Vx is in a range of Vslop (T)+4LSB to Vslop(T)−3LSB, COMP_1=L, COMP_2=L, COMP3=L, and COMP_4=L. When the pixel signal voltage Vx is in a range of Vslop(T)+3LSB to Vslop(T)−2LSB, COMP_1=L, COMP_2=L, COMP_3=L, and COMP_4=H. When the pixel signal voltage Vx is in a range of Vslop(T)+ 2LSB to Vslop(T)−1LSB, COMP_1=L, COMP_2=L, COMP_3=H, and COMP_4=H. When the pixel signal voltage Vx is in a range of Vslop(T)+1LSB to Vslop(T), COMP_1=L, COMP_2=H, COMP_3=H, and COMP_4=H.

Consequently, it is possible to decide the pixel data D of the pixel signal voltage Vx with resolution of 1 LSB by referring to results of comparison at y kinds of pixel signal voltages Vx_@, a voltage difference of adjacent ones of which is 1 LSB, while changing the reference signal Vslop at a rate of change of γ LSB and stepwise even in the input section of the voltage comparing unit 252. A procedure of the processing is specifically explained below.

Processing Procedure According to the First Example of the Fourth Embodiment

An example of a procedure of the AD conversion processing of the reference signal comparison type according to the first example of the fourth embodiment is explained with reference to FIGS. 24A and 24B. In the first example, it is assumed that time necessary for switching of the switch 410 in the operation-current-switching control unit 400 of the readout-current control unit 24 and a comparison operation in the voltage comparing unit 252 is sufficiently short and is also sufficiently short compared with time (AD unit Tad) in which a potential of the reference signal Vslop changes 2 LSB. In other words, a period (a period of delay) until comparison processing at the pixel signal voltage Vx_2 is completed after comparison processing at the pixel signal voltage Vx_1 is smaller than one clock of the count clock CK0 (in this example, CKdac). For example, in FIGS. 24A and 24B, the delay period is about a half clock.

Before starting comparison processing, the voltage comparing unit 252 sets the comparison pulse COMP to the H level. Therefore, in the operation-current-switching control unit 400 of the readout-current control unit 24, the switch 410 in each of the pixel rows selects the gate line 243_1 corresponding to the operation current Id_1 in an initial state. Consequently, the pixel signal voltage Vx_1 having a voltage 1 LSB higher in the two kinds of pixel signal voltages Vx_1 and Vx_2, a voltage difference between which is 1 LSB, is supplied to the voltage comparing unit 252.

In other words, among k (in this example, k=2) kinds of pixel signal voltages Vx, the voltage comparing unit 252 selects, as a pre-stage pixel signal, the pixel signal voltage Vx_1 that coincides with the reference signal Vslop first in comparison of respective values at an identical count value and the reference signal Vslop.

When comparison processing for AD conversion using the pixel signal voltage Vx_1 as the pre-stage pixel signal is started, the voltage comparing unit 252 in each of the pixel rows compares the pixel signal voltage Vx_1 in the column and the reference signal Vslop, which changes in a 2 LSB step, from the DA converter 27a. As shown in FIGS. 24A and 24B, at a point T when the pixel signal voltage Vx_1 (an analog value) and the reference signal Vslop coincide with each other, the voltage comparing unit 252 switches the comparison pulse COMP from the H level to the L level. This comparison processing is referred to as pre-stage comparison processing for AD conversion.

In the operation-current-switching control unit 400 of the readout-current control unit 24, the switch 410 in each of the pixel rows selects, when the comparison pulse COMP from the voltage comparing unit 252 of the column is switched to the L level, the gate line 243_2 corresponding to the operation current Id_2. Consequently, as shown in FIGS. 24A and 24B, the pixel signal voltage Vx_2 having a voltage 1 LSB lower in the two kinds of pixel signal voltages Vx_1 and Vx_2, a voltage difference between which is 1 LSB, is supplied to the voltage comparing unit 252.

The voltage comparing unit 252 in each of the pixel rows immediately compares the pixel signal voltage Vx_2 in the column and the reference signal Vslop(T), which changes in a 2 LSB step, from the DA converter 27a again. This comparison processing is referred to as post-stage comparison processing for AD conversion. The counter unit 254 stores a count value T at this point. In other words, the counter unit 254 stores a count value T at timing when a magnitude relation between the pixel signal voltage Vx_1 and Vx_2 and the reference signal Vslop(T) is inverted.

As shown in FIG. 24A, when "pixel signal voltage Vx_2>reference signal Vslop(T)", the comparison pulse COMP is maintained at the L level but, when "pixel signal voltage Vx_2<reference signal Vslop_1(T)", the comparison pulse COMP is switched to the H level. A comparison result (the comparison pulse COMP) at this point is notified to the counter unit 254. When "pixel signal voltage Vx_2>reference signal Vslop(T)", the counter unit 254 outputs "2T−1" as a final count value.

This is because, as shown in FIG. 24A, during AD conversion processing in a 2 LSB step, the pixel signal voltage Vx_2 (=Vx_1−1LSB) is higher than a voltage value equivalent to "2T" of the reference signal Vslop(T) and, actually, the pixel signal voltage Vx_1 during pre-stage comparison processing has not reached a 2T level (a range of 2T+1 to 2T) and is in a range of "2T−2" to "2T−1". On the other hand, when "pixel signal voltage Vx_2<reference signal Vslop(T)", the counter unit 254 outputs 2T as a final count value. This is because, as shown in FIG. 24B, during AD conversion processing in the 2 LSB step, the pixel signal voltage Vx_2 is lower than a voltage value equivalent to 2T of the reference signal Vslop(T) and, actually, the pixel signal voltage Vx_1 during pre-stage comparison processing has reached the 2T level.

Consequently, in the first example of the fourth embodiment, compared with the case of the AD conversion processing of the reference signal comparison type performed by using the DA converter 27a according to the comparative example, AD conversion processing in 1 LSB units is realized by performing comparison at the two kinds of pixel signal voltages Vx_1 and Vx_2, a voltage difference between which is 1 LSB, in a predetermined order while controlling the reference signal Vslop in the 2 LSB step. There is an advantage that, even if frequencies of the count clock CK0 and the count clock CKdac are not increased, time necessary for AD conversion is substantially halved. Since the time necessary for AD conversion can be halved, it is possible to double speed of AD conversion processing while maintaining bit resolution and controlling an increase in power consumption in the counter unit 254.

Processing Procedure According to the Second Example of the Fourth Embodiment

Figure 26A:
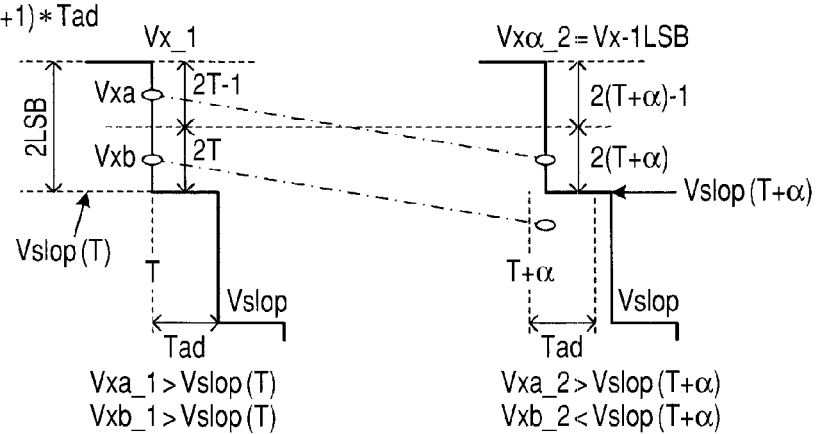
FIGS. 26A to 26C are diagrams for explaining an AD conversion processing procedure of a reference signal comparison type according to a second example of the fourth embodiment.
Figure 26B:
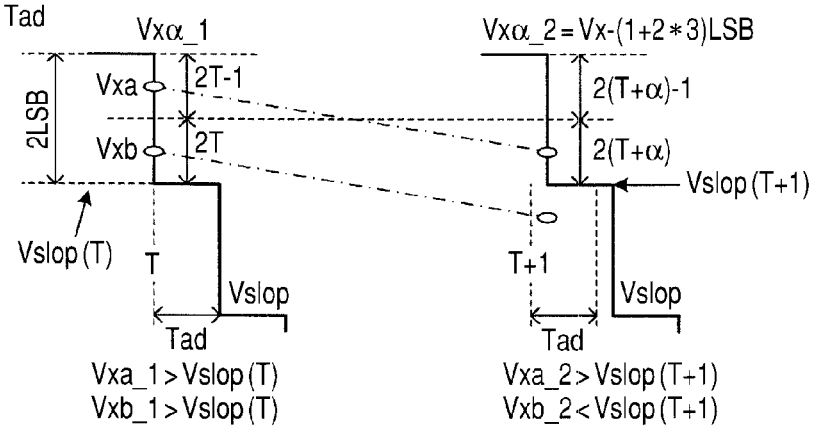
Figure 26C:
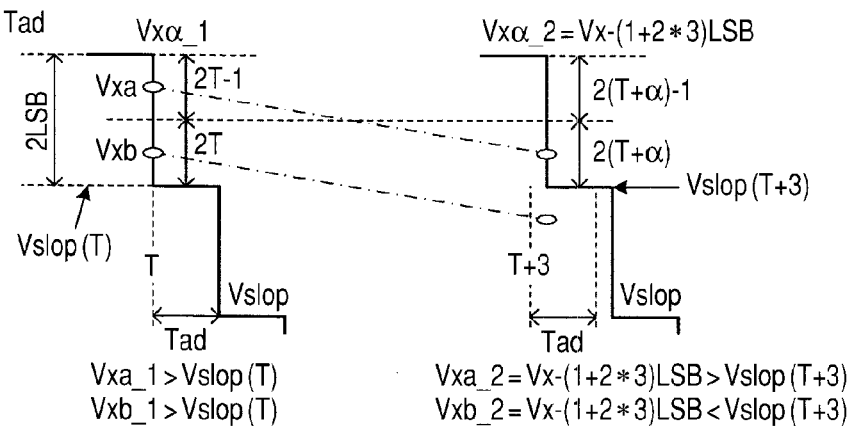

FIGS. 26A to 26C are diagrams for explaining an AD conversion processing procedure of the reference signal comparison type according to the second example of the fourth embodiment. In the first example, it is assumed that time necessary for switching of the switch 410 in the operation-current-switching control unit 400 of the readout-current control unit 24 and a comparison operation in the voltage comparing unit 252 is sufficiently short and is also sufficiently short compared with time (AD unit Tad) in which a potential of the reference signal Vslop changes 2 LSB. However, actually, in some case, the time is not short in this way.

For example, as shown in FIG. 26A, time equal to or longer than β clocks and shorter than "β+1" clocks of the count clock CKdac (β is referred to as processing delay clock width) is further necessary until comparison processing at the pixel signal voltage Vx_2 is completed after comparison processing at the pixel signal voltage Vx_1. In this case, in the processing in the first example, the counter unit 254 stores a count value "T+β". In processing for deciding pixel data, since the counter unit 254 outputs "2 (T+β)−1" or 2 (T+β) as a final count value, an error occurs. This is similar to the problem in the first example of the first embodiment.

To solve this problem, in the same manner as the measures taken in the second example of the first embodiment, it is sufficient to set, according to the processing delay clock width β, the pixel signal voltage Vx_2 "1+2β" LSB lower compared with the pixel signal voltage Vx_1 and perform an AD conversion operation in synchronization with a count operation in the counter unit 254 as described below.

Specifically, as in the first example, the voltage comparing unit 252 in each of the pixel rows compares, in the beginning of the comparison processing, the pixel signal voltage Vx_1 and the reference signal Vslop supplied from the vertical signal line 19 of the pixel row corresponding thereto. At a point when the pixel signal voltage Vx_1 (an analog value) and the reference signal Vslop coincide with each other, the voltage comparing unit 252 switches the comparison pulse COMP from the H level to the L level. The counter unit 254 stores a count value T at this point.

In the operation-current-switching control unit 400 of the readout-current control unit 24, the switch 410 in each of the pixel rows switches connection of a gate line to the load MOS transistor 242 from the gate line 243_1 corresponding to the operation current Id_1 to the gate line 243_2 corresponding to the operation current Id_2 when the comparison pulse COMP from the voltage comparing unit 252 in the column is switched to the L level.

Thereafter, the voltage comparing unit 252 starts comparison processing for the reference signal Vslop and the pixel signal voltage Vx_2. However, because of a problem of a circuit response, longer time is necessary for switching of the switch 410 in the readout-current control unit 24 and a comparison operation in the voltage comparing unit 252. Therefore, actual comparison in the voltage comparing unit 252 is performed (completed) at timing when the count clock CKdac increases by β clocks.

FIGS. 26B and 26C schematically show a state of the processing delay. A delay period Tdelay from an instruction for switching the pixel signal voltage Vx in pre-stage comparison processing until post-stage comparison processing is completed is β*Tdac≦Tdelay<β*Tdac (in FIG. 26B, β=1; in Fig. 26C, β=3). Conceptually, it can be considered that a result of comparison performed by the voltage comparing unit 252 using the pixel signal voltage Vx_2 is obtained at timing (T+β) when the count clock CKdac increases by β clocks. Therefore, as shown in FIGS. 26B and 26C, it can be considered that, in practice, the voltage comparing unit 252 performs comparison of the pixel signal voltage Vx_2 having a potential (1+β*2) LSB lower than the pixel signal voltage Vx_1 and the reference signal Vslop(T+β). Consequently, since a potential of the reference signal Vslop (T+β) as a comparison object falls lower than the reference signal Vslop (T) by (β*2) LSB. Therefore, it can be considered that comparison in a voltage relation same as that in the first example of the fourth embodiment is performed.

As shown in FIGS. 26B and 26C, if "pixel signal voltage Vxα_2>reference signal Vslop(T+β)" (α is a and b), the comparison pulse COMP is maintained at the L level. However, if "pixel signal voltage Vxα_2<reference signal Vslop (T+β)", the comparison pulse COMP is switched to the H level. A comparison result (the comparison pulse COMP) at this point is notified to the counter unit 254. When "pixel signal voltage Vxα_2>reference signal Vslop(T+β), the counter unit 254 outputs "2T−1" as a final count value. On the other hand, when "pixel signal voltage Vxα_2<reference signal Vslop(T+β)", the counter unit 254 outputs 2T as a final count value.

Even when there is a processing delay incidental to switching of the switch 410, a comparison operation in the voltage comparing unit 252, and the like, it is possible to gain switching time of the switch 410 in the readout-current control unit 24 and an operation time margin in the voltage comparing unit 252 by applying processing using the pixel signal voltage Vx_2 with the increased voltage level to the pixel signal voltage Vx_1 taking into account the processing delay. Consequently, even when time equal to or longer than β clocks and shorter than "β+1" clocks of the count clock CKdac is further necessary until comparison processing at the pixel signal voltage Vx_2 is completed after comparison processing at the pixel signal voltage Vx_1, it is possible to process the comparison without causing an error.

Third Example of Fourth Embodiment

Figure 27:
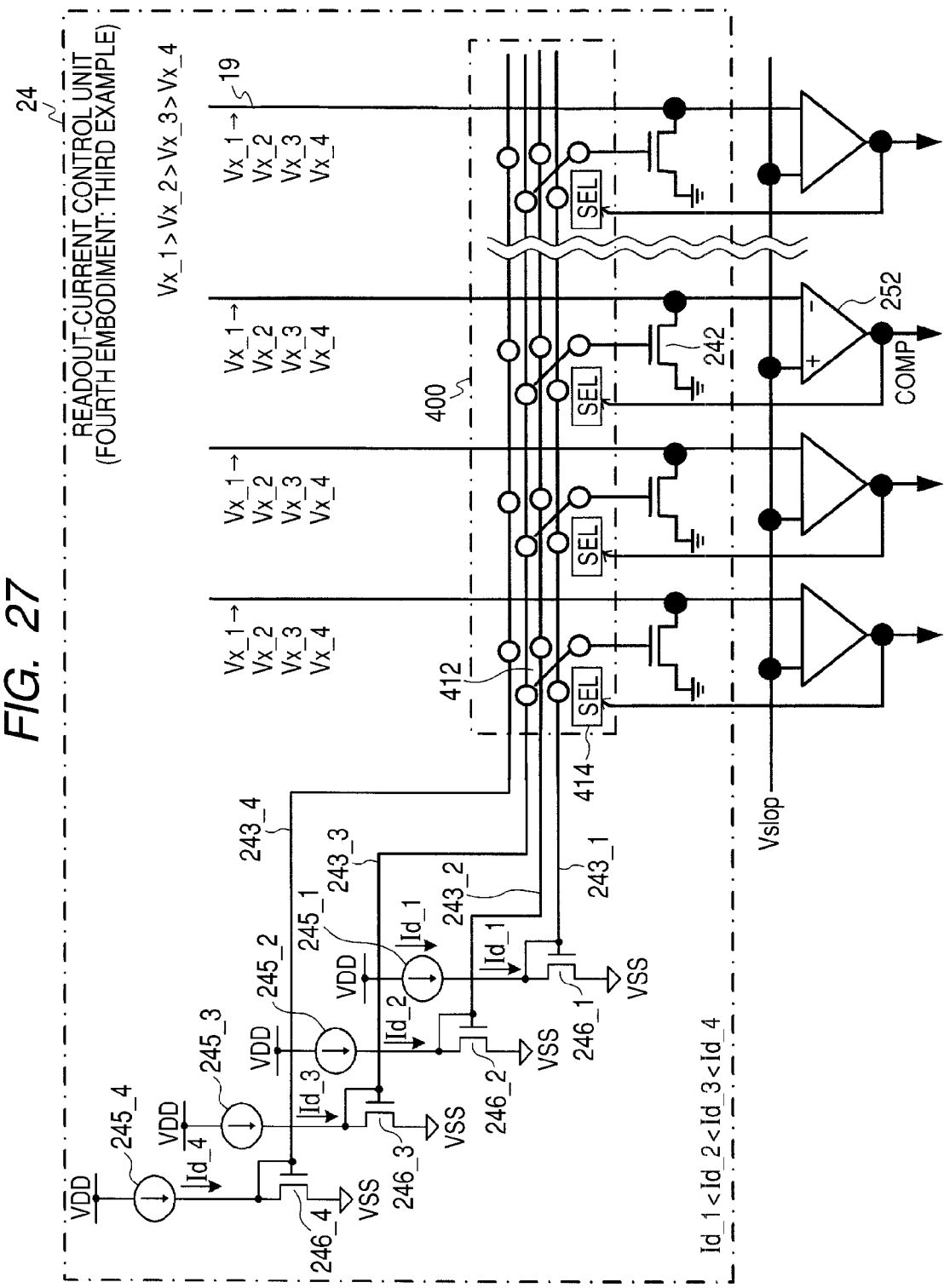
FIG. 27 is a circuit block diagram for explaining an example of the structure around a readout-current control unit applied to AD conversion processing of a reference signal comparison type according to a third example of the fourth embodiment.
Figure 28:
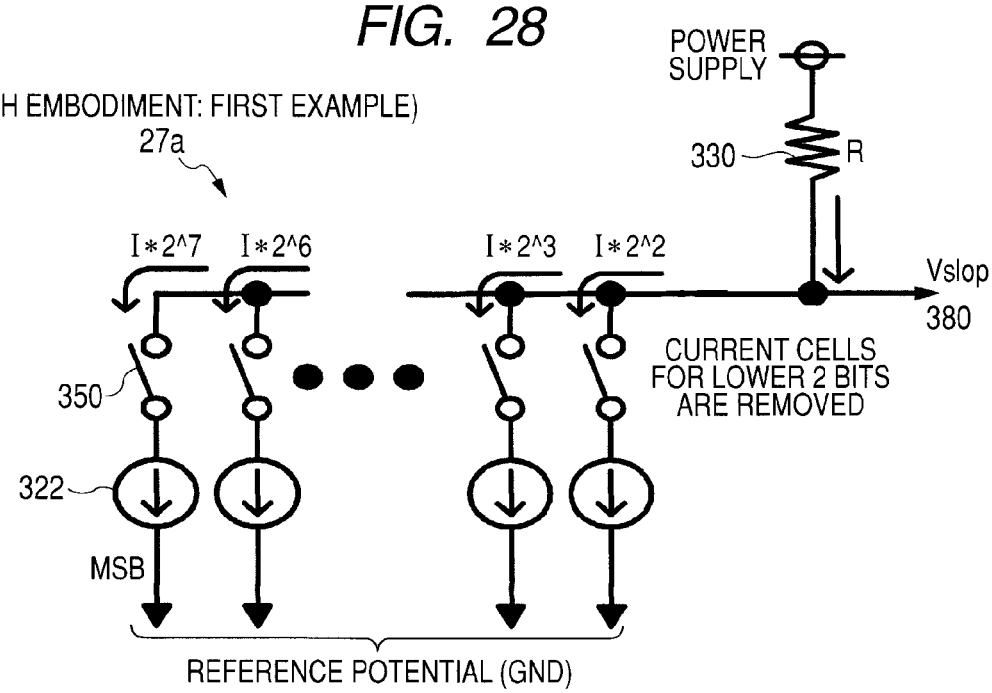
FIG. 28 is a functional block diagram for explaining details of a DA converter applied to the AD conversion processing of the reference signal comparison type according to the third example of the fourth embodiment.
Figures 29A, 29B, 29C, 29D:
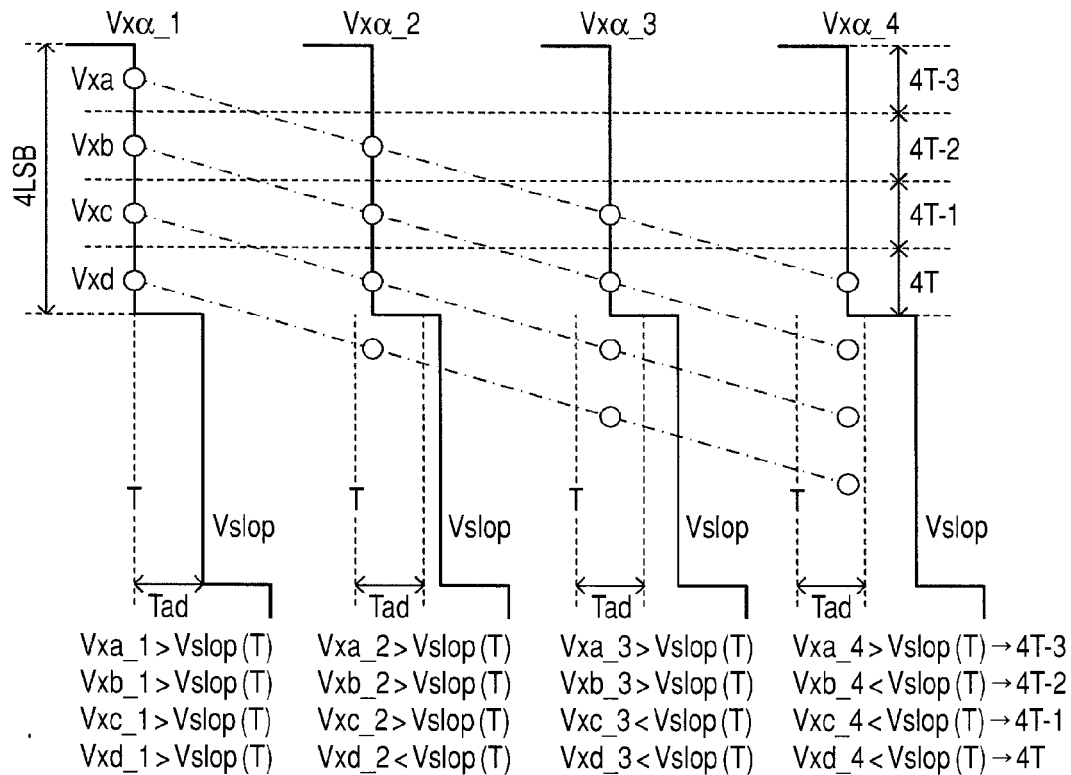
FIGS. 29A to 29D are diagrams for explaining an operation principle of the AD conversion processing of the reference signal comparison type according to the third example of the fourth embodiment and show a relation between a reference signal and four kinds of pixel signal voltages.

FIGS. 27 to 29 are diagrams for explaining AD conversion processing of a reference signal comparison type according to a third example of the fourth embodiment. FIG. 27 is a circuit block diagram for explaining an example of the structure around the readout-current control unit 24 applied to the AD conversion processing of the reference signal comparison type according to the third example of the fourth embodiment. FIG. 28 is a functional block diagram for explaining details of the DA converter 27a applied to the AD conversion processing of the reference signal comparison type according to the third example of the fourth embodiment. FIGS. 29A to 29D are diagrams for explaining an operation principle of the AD conversion processing of the reference signal comparison type according to the third example of the fourth embodiment and show a relation between the reference signal Vslop and four kinds of pixel signal voltages Vx.

In the first example, time necessary for AD conversion is substantially halved compared with that in the comparative example by switching and processing the two kinds of pixel signal voltages Vx_1 and Vx_2, a voltage difference between which is 1 LSB. On the other hand, in the third example, time necessary for AD conversion is substantially quartered compared with that in the comparative example by using four kinds of pixel signal voltages Vx_1, Vx_2, Vx_3, and Vx_4, a voltage difference between adjacent one of which is 1 LSB, first performing comparison processing at the pixel signal voltage Vx_1 having a highest voltage level and, after the pixel signal voltage Vx_1 and the reference signal Vslop coincide with each other, judging a magnitude relation between the reference signal Vslop and the pixel signal voltages Vx_2, Vx_3, and Vx_4 in order while switching the pixel signal voltages Vx_2, Vx_3, and Vx_4. A relation between the first example and the third example of the fourth embodiment is a relation same as the difference between the first example and the third example of the first embodiment.

As shown in FIG. 27, in the solid-state imaging device 1 to which the AD conversion processing of the reference signal comparison type according to the third example of the fourth embodiment is applied, the operation-current-switching control unit 400 of the readout-current control unit 24 can supply the four kinds of pixel signal voltages Vx_1, Vx_2, Vx_3, and Vx_4, a voltage difference between adjacent ones of which is 1 LSB, (Vx_1>Vx_2>Vx_3>Vx_4) to the voltage comparing unit 252.

As a circuit configuration for the above, the operation-current-switching control unit 400 of the readout-current control unit 24 includes, for the respective pixel rows, the switches 410 of a four-input and one-output type that switches four kinds of operation currents (readout currents) Id_1, Id_2, Id_3, and Id_4 for pixel signal readout supplied to the respective vertical signal lines 19 of the pixel array unit 10. To cope with the operation currents, the reference current source units 244 include four kinds of current generating units 245_1, 245_2, 245_3, and 245_4 that generate the four kinds of operation currents (readout currents) Id_1, Id_2, Id_3, and Id_4 and transistors 246_1, 246_2, 246_3, and 246_4 of an NMOS type connected to the respective current generating units 245_1, 245_2, 245_3, and 245_4.

In the DA converter 27a according to the third example of the fourth embodiment corresponding to the readout-current control unit 24 having such structure, as shown in FIG. 28, the sync current sources 322 and the output switches 350 forming the current cells for lower-order 2 bits (the LSB and the bit above the LSB) are removed from the DA converter 27a according to the comparative example shown in FIG. 5B. Consequently, the reference signal Vslop outputted from the output node 380 of the DA converter 27a according to the third example of the fourth embodiment changes at step voltage of R×4I (4LSB). Since all the pixel rows use one kind of reference signal Vslop in common, the reference signal Vslop from the reference-signal generating unit 27 is directly supplied to the column processing unit 26 without the intervention of the reference-signal control unit 25.

As shown in FIG. 27, a gate and a drain of the transistors 246_1, 246_2, 246_3, and 246_4 of the NMOS type are connected to outputs of the current generating unit 245_1, 245_2, 245_3, and 245_4 corresponding thereto and connected in common to input terminals of the switches 410 in the respective pixel rows as gate lines 243_1, 243_2, 243_3, and 243_4 corresponding thereto.

As shown in FIGS. 29A to 29D, current differences among the operation currents Id_1, Id_2, Id_3, and Id_4 (Id_1>Id_2>Id_3>Id_4) generated by the respective current generating units 245_1, 245_2, 245_3, and 245_4 can set the pixel signal voltages Vx in the vertical signal lines 19 different by 1 LSB, respectively, in AD conversion. A potential of the pixel signal voltages Vx falls as the operation currents Id are larger. Therefore, there is a relation of Vx_2=Vx_1−1LSB, Vx_3=Vx_1−2LSB, and Vx_4=Vx_1−3LSB among the pixel signal voltages Vx_1, Vx_2, Vx_3, and Vx_4 at the time of the respective operation currents Id_1, Id_2, Id_3, and Id_4.

The comparison pulse COMP is supplied to a control input terminal of the switch 410 in each of the pixel rows from the voltage comparing unit 252 in the column. The switch 410 selects the gate line 243_1 corresponding to the operation current Id_1 when the comparison pulse COMP is at the H level (i.e., when comparison processing is started) and connects the gate line 243_1 to the gate of the load MOS transistor 242 in the column to transfer information on the operation current Id_1 to the load MOS transistor 242.

In the readout-current control unit 24 according to the third example of the fourth embodiment, since the switch 410 is also provided for each of the pixel rows, outputs (the comparison pulses COMP) of the voltage comparing units 252 in the column AD circuits 250 in the respective pixel rows are fed back to the switches 410 in the pixel rows corresponding thereto. The switches 410 are switched at timing when the outputs of the voltage comparing units 252 are inverted. The readout-current control unit 24 controls the four kinds of pixel signal voltages Vx_1, Vx_2, Vx_3, and Vx_4, which are compared with the reference signal Vslop by the voltage comparing units 252, with a difference of 1 LSB independently for the respective pixel rows.

Processing Procedure According to the Third Example of the Fourth Embodiment

FIGS. 29A to 29D are diagrams for explaining an AD conversion processing procedure of the reference signal comparison type according to the third example of the third embodiment. The AD conversion processing procedure is explained with reference to FIGS. 29A to 29D. In the third example, it is also assumed that time necessary for switching of the switch 410 in the operation-current-switching control unit 400 of the readout-current control unit 24 and a comparison operation in the voltage comparing unit 252 is sufficiently short and is also sufficiently short compared with time (AD unit Tad) in which a potential of the reference signal Vslop changes 2 LSB. Differences from the first example are mainly explained.

When the comparison pulse COMP in each of the pixel rows is switched to the L level by pre-state comparison processing performed by using the pixel signal voltage Vx_1 having a highest voltage level at the time of the operation current Id_1 when the operation current I_d is the lowest, the switch 410 in the pixel row selects the gate lines 243_2, 243_3, and 243_4 corresponding to the remaining operation currents Id_2, Id_3, and Id_4 excluding the operation current Id_1 in order (order of the selection is arbitrary). Consequently, as shown in FIGS. 29B to 29D, three kinds of pixel signal voltages Vx_2, Vx_3, and Vx_4 reduced by 1 LSB, 2 LSB, and 3 LSB from the pixel signal voltage Vx_1, respectively, are supplied to the voltage comparing unit 252 in order.

In post-stage comparison processing for AD conversion, the voltage comparing unit 252 in each of the pixel rows compares the respective pixel signal voltages Vx_2, Vx_3, and Vx_4 and the reference signal Vslop(T), which changes in a 4 LSB step, from the DA converter 27a in order again. The counter unit 254 stores a count value T at this point. In other words, the counter unit 254 stores a count value T at timing when a magnitude relation between the pixel signal voltages Vx_1, Vx_2, Vx_3, and Vx_4 and the reference signal Vslop (T) is inverted.

As shown in FIGS. 29B to 29D, during comparison at the respective pixel signal voltages Vxα_2, Vxα_3, and Vxα_4 (α is a, b, c, and d), when "reference signal Vslop(T)<pixel signal voltage Vxα_@: @ is 2 to 4", the comparison pulse COMP is at the L level. However, when "reference signal Vslop(T)>pixel signal voltage Vxα_@", the comparison pulse COMP is at the H level. Respective comparison results (the comparison pulses COMP) at this point are notified to the counter unit 254. The counter unit 254 decides pixel data D as described below on the basis of the respective comparison results.

For example, in the case of the pixel signal voltage Vxd that satisfies "reference signal Vslop(T)>pixel signal voltage Vxα_2, Vxα_3, and Vxα_4", the counter unit 254 outputs "4T" as a final count value. In the case of the pixel signal voltage Vxc that satisfies "reference signal Vslop(T)≦pixel signal voltage Vxα_2" and "reference signal Vslop(T)>pixel signal voltages Vxα_3 and Vxα_4", the counter unit 254 outputs "4T−1" as a final count value.

In the case of the pixel signal voltage Vxb that satisfies "reference signal Vslop(T)≦pixel signal voltages Vxα_2 and Vxα_3" and "reference signal Vslop(T)≧pixel signal voltage Vxα_4", the counter unit 254 outputs "4T−2" as a final count value. In the case of the pixel signal voltage Vxα that satisfies "reference signal Vslop(T)≦pixel signal voltages Vxα_2, Vxα_3, and Vxα_4", the counter unit 254 outputs "4T−3" as a final count value.

Fourth Example of Fourth Embodiment

Generalization

In the first example, the reference signal Vslop is compared with the two kinds of pixel signal voltages Vx, a voltage difference between which is 1 LSB, while changing the reference signal Vslop in a 2 LSB step to reduce an AD conversion period to a half. In the third example, the reference signal Vslop is compared with the four kinds of pixel signal voltages Vx, a voltage difference between adjacent ones of which is 1 LSB, while changing the reference signal Vslop in a 4 LSB step to reduce an AD conversion period in to a quarter. By developing the forms of these examples, eventually, as a processing form of the fourth embodiment, an AD conversion period can be reduced to ½^n by comparing the reference signal Vslop with 2^n kinds of pixel signal voltages Vx, a voltage difference between adjacent ones of which is 1 LSB, and that change stepwise, while setting a minimum step width of the reference signal Vslop to 2^n LSB (n is a positive integer).

The minimum step width is 2^n LSB because, due to consistency with weighting of bits of digital data, it is easy to set the minimum step width and a circuit configuration is compact. However, it is not indispensable to set the minimum step width to 2^n LSB. It is possible to reduce an AD conversion period to 1/k by setting the minimum step width to k LSB (k is a positive integer). To cope with the minimum step width, the readout-current control unit 24 can switch and supply the k kinds of pixel signal voltages Vx, a voltage difference between adjacent ones of which is 1 LSB, to the voltage comparing unit 252.

However, when a level difference between adjacent ones of the k kinds of pixel signal voltages Vx is set to 1 LSB, respectively, it is necessary to complete comparison of all the k pixel signal voltages Vx and the reference signal Vslop within an AD unit Tad. Therefore, a processing delay is more often a problem as the number of pixel signal voltages Vx is increased. When the processing delay is a problem, as in the second example, it is sufficient to increase (decrease) the level difference between adjacent ones of the k kinds of pixel signal voltages Vx to "1+2β" LSB rather than 1 LSB according to the processing delay clock number β and perform an AD conversion operation in synchronization with a count operation in the counter unit 254. During comparison processing for the respective pixel signal voltages Vx, the respective pixel signal voltages Vx are switched with a timing difference of a count step of the counter unit 254.

Imaging Apparatus

Figure 30:
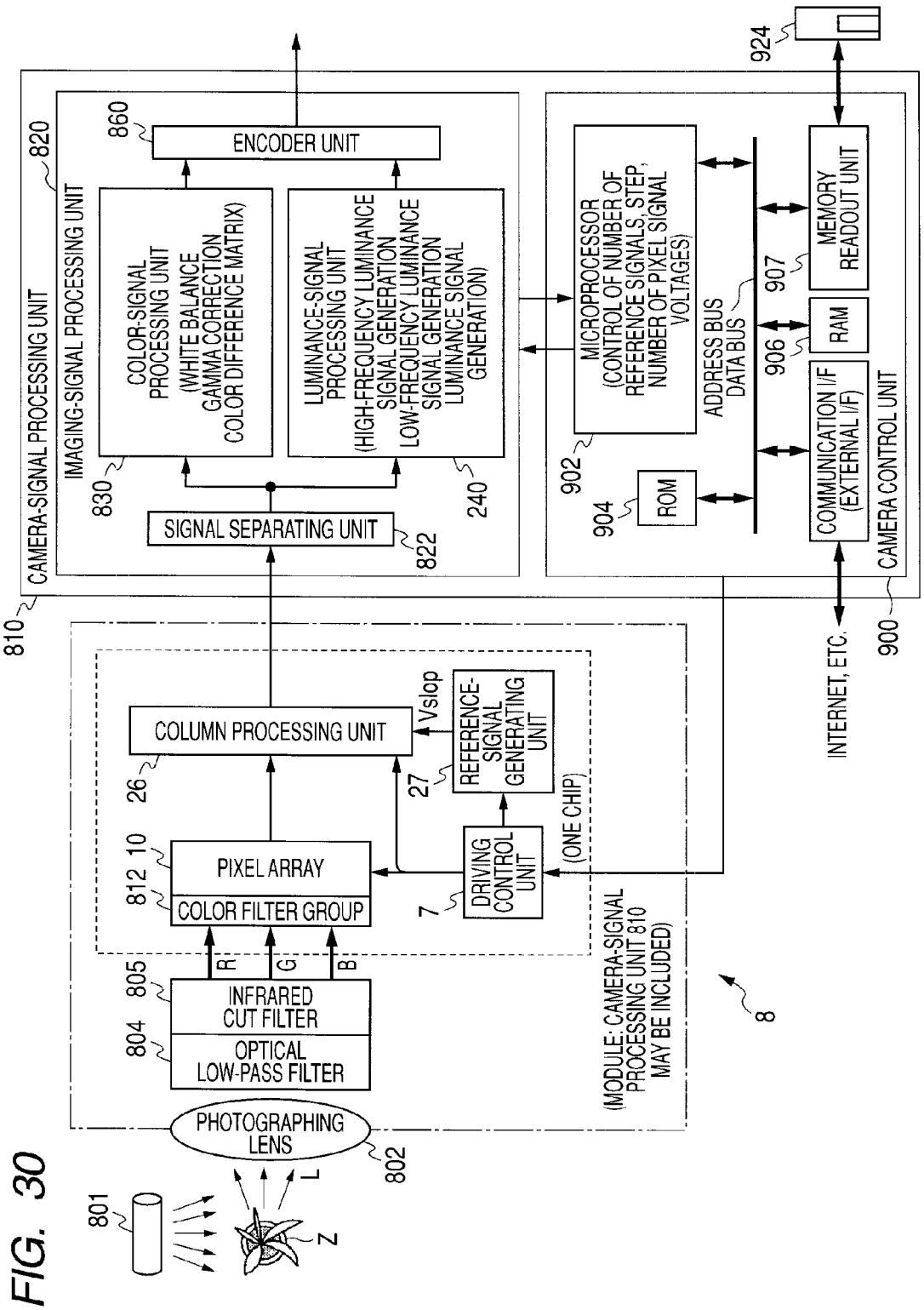
FIG. 30 is a diagram showing the schematic structure of an imaging apparatus that is an example of a physical information acquiring apparatus employing a mechanism same as that of a solid-state imaging device 1.

FIG. 30 is a diagram showing the schematic structure of an imaging apparatus that is an example of a physical information acquiring apparatus employing a mechanism same as that of the solid-state imaging device 1. This imaging apparatus 8 is configured as an imaging apparatus for obtaining a visible light color image.

The mechanism of the solid-state imaging device 1 described above is applicable not only to a solid-state imaging device but also to an imaging apparatus. In this case, when the imaging apparatus adopts an AD conversion system of a reference signal comparison type, it is possible to realize a mechanism that can realize an increase in speed of AD conversion processing and a reduction in power consumption by reducing time necessary for comparison processing in a comparing unit while controlling an increase in a circuit area.

In this case, for control of the number of generated reference signals Vslop or pixel signal voltages Vx for executing AD conversion of the reference signal comparison type or control of a tilt (the number of LSB steps per one count) of the reference signal Vslop, a main control unit on the outside can arbitrarily designate, through data setting in the communication and timing control unit 20, a mode switching instruction.

Specifically, an imaging apparatus 8 includes a photographing lens 802 that guides light L, which bears an image of a subject Z present below an illumination device 801 such as a fluorescent lamp, to the imaging apparatus side and focuses the light L, an optical low-pass filter 804, a group of color filers 812 in which color filters of, for example, R, G, and B are arranged in a Bayer array, the pixel array unit 10, the driving control unit 7 that drives the pixel array unit 10, the readout-current control unit 24 that controls an operation current of a pixel signal outputted from the pixel array unit 10, the column processing unit 26 that applies CDS processing, AD conversion processing, and the like to the pixel signal outputted from the pixel array unit 10, the reference-signal generating unit 27 that supplies the reference signal Vslop to the column processing unit 26, and a camera-signal processing unit 810 that processes an imaging signal outputted from the column processing unit 26.

The optical low-pass filter 804 is a filter for blocking a high-frequency component equal to or higher than the Nyquist frequency in order to prevent aliasing. As indicated by a dotted line in the figure, it is also possible to provide, together with the optical low-pass filter 804, an infrared cut filter 805 that reduces an infrared component. In this regard, the imaging apparatus 8 is the same as a general imaging apparatus.

The camera-signal processing unit 810 provided at a post stage of the column processing unit 26 includes an imaging-signal processing unit 820 and a camera control unit 900 that functions as a main control unit that controls the entire imaging apparatus 8.

The imaging-signal processing unit 820 includes a signal separating unit 822 that has a primary color separation function for separating, when a filter other than a primary color filter is used as a color filter, a digital imaging signal supplied from an AD conversion function unit of the column processing unit 26 into primary color signals of R (red), G (green), and B (blue) and a color-signal processing unit 830 that performs signal processing for a color signal C on the basis of the primary color signals R, G, and B separated by the signal separating unit 822.

The imaging-signal processing unit 820 includes a luminance-signal processing unit 840 that performs signal processing for a luminance signal Y on the basis of the primary color signals R, G, and B separated by the signal separating unit 822 and an encoder unit 860 that generates a video signal VD on the basis of the luminance signal Y and the color signal C.

Although not shown in the figure, the color-signal processing unit 830 includes, for example, a white balance amplifier, a gamma correction unit, and a color difference matrix unit. The white balance amplifier adjusts, on the basis of a gain signal supplied from a not-shown white balance controller, a gain of a primary color signal supplied from a primary color separation function unit of the signal separating unit 822 (white balance adjustment) and supplies the primary color signal to the gamma correction unit and the luminance-signal processing unit 840.

The gamma correction unit performs gamma ($\gamma$) correction for faithful color reproduction on the basis of the primary color signal, a white balance of which is adjusted, and inputs output signals R, G, and B for the respective colors subjected to gamma correction to the color difference matrix unit. The color difference matrix unit inputs color difference signals R-Y and B-Y obtained by performing color difference matrix processing to the encoder unit 860.

Although not shown in the figure, the luminance-signal processing unit 840 includes, for example, a high-frequency luminance-signal generating unit that generates a luminance signal YH including a relatively high frequency component on the basis of a primary color signal supplied from the primary color separation function unit of the signal separating unit 822, a low-frequency luminance-signal generating unit that generates a luminance signal YL including only a relatively low frequency component on the basis of a primary color signal, white balance of which is adjusted, supplied from the white balance amplifier, and a luminance-signal generating unit that generates a luminance signal Y on the basis of the two kinds of luminance signals YH and YL and supplies the luminance signal Y to the encoder unit 860.

After subjecting the color difference signals R-Y and B-Y to digital modulation with a digital signal corresponding to a color signal sub-carrier wave, the encoder unit 860 combines the color difference signals R-Y and B-Y with the luminance signal Y generated by the luminance-signal processing unit 840 and converts the combined signal into a digital video signal VD (=Y+S+C; S is a synchronization signal and C is a chroma signal).

The digital video signal VD outputted from the encoder unit 860 is supplied to a not-shown camera-signal output unit further at a post stage and served for monitor output, data recording in a recording medium, and the like. In this case, when necessary, the digital video signal VD is converted into an analog video signal V by DA conversion.

The camera control unit 900 according to this embodiment includes a microprocessor 902 in the center of a computer represented by a CPU (Central Processing Unit) in which functions of arithmetic operations and control performed by a computer are integrated in an integrated circuit, a ROM (Read Only Memory) 904 as a read-only storing unit, a RAM (Random Access Memory) 906 that is an example of a random access and volatile storing unit, and not-shown other peripheral members. The microprocessor 902, the ROM 904, and the RAM 906 are collectively referred to as a microcomputer.

In the above description, "volatile storing unit" means a storing unit of a form that deletes stored content when a power supply of the apparatus is turned off. On the other hand, "nonvolatile storing unit" means a storing unit of a form that continues to store stored content even when a main power supply of the apparatus is turned off. The storing unit only has to be capable of continuing to store stored content and is not limited to a storing unit in which a memory element itself made of semiconductor has nonvolatility. The storing unit may be a storing unit in which a volatile memory element is given "nonvolatility" by a backup power supply.

The storing unit is not limited to be formed by the memory element made of semiconductor and may be formed by using media such as a magnetic disk and an optical disk. For example, a hard disk device can be used as the nonvolatile storing unit. A storing unit that reads out information from a storage medium such as a CD-ROM can also be used as the nonvolatile storing unit.

The camera control unit 900 controls the entire system. In particular, in a relation with a reduction in comparison processing time in adopting the AD conversion system of the reference signal comparison type, the camera control unit 900 has a function of adjusting ON/OFF timing of various control pulses and setting values for control of the number of generated reference signals Vslop or pixel signal voltages Vx or control of a tilt (the number of LSB steps per one count) of the reference signal Vslop.

A control program for the camera control unit 900 and the like are stored in the ROM 904. In particular, in this example, a program for setting ON/OFF timing of various control pulses with the camera control unit 900 is stored in the ROM 904.

Data and the like with which the camera control unit 900 performs various kinds of processing are stored in the RAM 906.

A recording medium 924 such as a memory card is detachably insertable into the camera control unit 900. The camera control unit 900 can be connected to a communication network such as the Internet. For example, the camera control unit 900 includes a memory readout unit 907 and a communication I/F (interface) 908 other than the microprocessor 902, the ROM 904, and the RAM 906.

The recording medium 924 is used for, for example, registering program data for causing the microprocessor 902 to perform software processing and data such as various setting values including a converging range of photometry data DL based on a luminance signal from the luminance-signal processing unit 840 and ON/OFF timing of various control pulses and setting values for exposure control processing (including electronic shutter control) and a reduction in comparison processing time in adopting the AD conversion system of the reference signal comparison type.

The memory readout unit 907 stores data read out from the recording medium 924 in the RAM 906. The communication I/F 908 mediates exchange of communication data between a communication network such as the Internet and the apparatus.

In such an imaging apparatus 8, the driving control unit 7 and the column processing unit 26 are shown as a module separately from the pixel array unit 10. However, as described about the solid-state imaging device 1, it goes without saying that the solid-state imaging device 1 as one chip in which these units are integrally formed on a semiconductor substrate identical with a semiconductor substrate on which the pixel array unit 10 is formed may be used.

In the figure, the imaging apparatus 8 is shown in a state including optical systems such as the photographing lens 802, the optical low-pass filter 804, and the infrared cut filter 805 other than the pixel array unit 10, the driving control unit 7, the column processing unit 26, the reference-signal generating unit 27, and the camera-signal processing unit 810. This form is suitable when a module-like form having an imaging function in which these units are collectively packaged is adopted.

In a relation with the module in the solid-state imaging device 1, as shown in the figure, the solid-state imaging device 1 is provided in a module-like form that has an imaging function in a state in which the pixel array unit 10 (the imaging unit) and signal processing units (excluding the camera-signal processing unit at the post stage of the column processing unit 26) closely related to the pixel array unit 10 side such as the column processing unit 26 having an AD conversion function and a difference (CDS) processing function are collectively packaged. The entire imaging apparatus 8 may be configured by providing the camera-signal processing unit 810, which is the remaining signal processing unit, at the post stage of the solid-state imaging device 1 provided in the module-like form.

Alternatively, although not shown in the figure, the solid-state imaging device 1 is provided in a module-like form that has an imaging function in a state in which the pixel array unit 10 and the optical systems such as the photographing lens 802 are collectively packaged. The entire imaging apparatus 8 may be configured by providing the camera-signal processing unit 810 in the module in addition to the solid-state imaging device 1 provided in the module-like form.

As a form of the module in the solid-state imaging device 1, the camera-signal processing unit 810 equivalent to the camera-signal processing unit 200 may be included. In this case, in practice, the solid-state imaging device 1 and the imaging apparatus 8 can be regarded identical.

Such an imaging apparatus 8 is provided as a portable apparatus for performing "imaging" that has, for example, a camera and an imaging function. "Imaging" includes not only capturing of an image during normal camera photographing but also fingerprint detection and the like in a broader sense.

The imaging apparatus 8 having such structure includes all the functions of the solid-state imaging device 1. Basic components and operations can be the same as those of the solid-state imaging device 1. When the AD conversion system of the reference signal comparison type is adopted, it is possible to realize a mechanism that can realize an increase in speed of AD conversion processing and a reduction in power consumption by reducing time necessary for comparison processing in the comparing unit while controlling an increase in a circuit area.

For example, a program for causing a computer to execute the processing described above is distributed through the recording medium 924 including a nonvolatile memory card such as a flash memory, an IC card, or a miniature card. Moreover, the program may be downloaded from a server or the like through a communication network such as the Internet and acquired or updated.

In the semiconductor memory such as the IC card or the miniature card as an example of the recording medium 924, it is possible to store a part or all of the functions of the processing in the solid-state imaging device 1 (in particular, the functions related to a reduction in comparison processing time in adopting the AD conversion system of the reference signal comparison type) explained in the embodiments.

Therefore, it is possible to provide a program and a storage medium having the program stored therein. For example, a program for AD conversion speed increasing processing for performing control associated with the number of generated reference signals Vslop or pixel signal voltages Vx or setting of a tilt (the number of LSB steps per one count) of the reference signal Vslop, i.e., software installed in the RAM 906 or the like includes, as software, a function of setting a control pulse and other setting values for realizing an increase in speed of AD conversion processing in the same manner as the AD conversion speed increasing processing explained about the solid-state imaging device 1.

The software is readout to the RAM 906 and, then, realized by the microprocessor 902. For example, the microprocessor 902 executes setting processing on the basis of the program stored in the ROM 904 and the RAM 906 as examples of the recording medium and performs control associated with the number of generated reference signals Vslop or pixel signal voltages Vx or setting of a tilt (the number of LSB steps per one count) of the reference signal Vslop. Consequently, when the AD conversion system of the reference signal comparison type is adopted, it is possible to realize, in terms of software, a function of reducing time necessary for comparison processing in the comparing unit and realizing an increase in speed of AD conversion processing and a reduction in power consumption while controlling an increase in a circuit area.

The present invention has been explained with reference to the embodiments. However, the technical scope of the present invention is not limited to the range described in the embodiments. It is possible to apply various modifications or improvements to the embodiments without departing from the spirit of the present invention. Forms applied with such modifications or improvements are also included in the present invention.

The embodiments do not limit to the inventions according to claims. All combinations of the characteristics explained in the embodiments are not always indispensable for means for resolution of the present invention. Inventions at various stages are included in the embodiments. Various inventions can be extracted according to appropriate combinations of the disclosed plural elements. As long as the effects can be obtained even if several elements are deleted from all the elements described in the embodiments, a configuration in which the several elements are deleted can be extracted as an invention.

For example, in the embodiments, the reference signal Vslop gradually falls to match the unit pixels 3 in which the pixel signal voltage Vx falls as the signal level Ssig is larger. However, polarities of these elements may be inverted, unit pixels in which the pixel signal voltage Vx increases as the signal level Ssig is larger can be formed, and a reference signal may gradually increase to match the unit pixels. In this case, for example, a sync current source only has to be changed to a source current source.

It should be understood by those skilled in the art that various modifications, combinations, sub-combinations, and alterations may occur depending on design requirements and other factors insofar as they are within the scope of the appended claims or the equivalents thereof.

What is claimed is:

1. A solid-state imaging device comprising:
   a reference-signal generating unit that generates a plurality of reference signals, a level difference between adjacent reference signals being fixed, and the plurality of reference signals having the same voltage waveform;

a reference-signal selecting unit that selects any one of the plurality of reference signals generated by the reference-signal generating unit;

a comparing unit that performs a comparison processing in which a pixel signal and a reference signal selected by the reference-signal selecting unit are compared with each other; and a count unit that performs count processing in parallel with the comparison processing in the comparing unit and stores a count value at a point when the comparison processing is completed, wherein
the count unit generates digital data relating to the pixel signal in a 1 LSB step by (a) storing the count value at a point when the comparison processing by the comparing unit is completed for one of the reference signals selected by the reference-signal selecting unit and (b) correcting the stored count value based on results of further comparison processing by the comparing unit for each of the respective remaining reference signals subsequently selected by the reference-signal selecting unit.

2. The solid-state imaging device of claim 1, wherein:
the reference-signal generating unit generates two or more ("M") kinds of reference signals that each change stepwise at a rate of change M times as high as 1 LSB, which is a resolution of a least significant bit of the digital data, and a level difference between adjacent reference signals is 1 LSB, and the one reference signal first selected by the reference-signal selecting unit is a pre-stage reference signal selected during a pre-stage comparison processing and the remaining reference signals are selected during a post-stage comparison processing.

3. The solid-state imaging device of claim 2, wherein the pre-stage reference signal is a reference signal among the M kinds of reference signals that first coincides with the pixel signal at an identical count value.

4. The solid-state imaging device of claim 2, wherein the reference-signal generating unit generates the M kinds of reference signals that change in a step of M LSB, where $M=2^n$ and where "n" is a positive integer.

5. A solid-state imaging device comprising:
a reference-signal generating unit that generates a plurality of reference signals, a level difference between adjacent reference signals being fixed, and the plurality of reference signals having the same voltage waveform;

a reference-signal selecting unit that selects any one of the plurality of reference signals generated by the reference-signal generating unit;

a comparing unit that performs a comparison processing in which a pixel signal and a reference signal selected by the reference-signal selecting unit are compared with each other; and a count unit that performs count processing in parallel with the comparison processing in the comparing unit and stores a count value at a point when the comparison processing is completed, wherein
the count unit generates digital data relating to the pixel signal in a 1 LSB step by (a) storing the count value at a point when the comparison processing by the comparing unit is completed for one of the reference signals selected by the reference-signal selecting unit and (b) correcting the stored count value based on results of further comparison processing by the comparing unit for each of the respective remaining reference signals subsequently selected by the reference-signal selecting unit, and the level difference between the adjacent reference signals is "$1+2\beta$" LSB, where $\beta$ is a processing delay clock width, and wherein the reference-signal selecting unit selects any one of the remaining reference signals when the comparison processing is completed for the one reference signal first selected by the reference-signal selecting unit, and thereafter, selects other remaining reference signals in order with a timing difference of a count step of the count unit.

6. A solid-state imaging device comprising:
a reference-signal generating unit that generates two or more ("k") kinds of reference signals having the same voltage waveform that (i) correspond to respective k ranges obtained by dividing a full range of digital data into the k ranges and (ii) that change at a rate of change of 1 LSB;

a reference-signal selecting unit that switches the k kinds of reference signals;

a comparing unit that compares, while the reference-signal selecting unit switches the k kinds of reference signals, initial output values of respective reference signals to determine a reference signal corresponding to a range to which the pixel signal belongs, and thereafter performs comparison processing in which the pixel signal and the reference signal corresponding to the range are compared with each other; and a count unit that performs count processing in parallel with the comparison processing in the comparing unit and stores a count value at a point when the comparison processing is completed, wherein
the count unit generates digital data relating to the pixel signal in a 1 LSB step by (a) storing the count value at a point when the comparison processing by the comparing unit performed by using the reference signal corresponding to the range is completed and (b) correcting the stored count value based on the range to which the pixel signal belongs.

* * * * *